(12) United States Patent
Wei et al.

(10) Patent No.: US 12,207,296 B2
(45) Date of Patent: Jan. 21, 2025

(54) NON-TRANSPARENT INBAND RELAY NODE IN A SINGLE FREQUENCY NETWORK

(71) Applicant: Qualcomm Incorporated, San Diego, CA (US)

(72) Inventors: Chao Wei, Beijing (CN); Alberto Rico Alvarino, San Diego, CA (US); Wanshi Chen, San Diego, CA (US); Le Liu, San Jose, CA (US); Ayan Sengupta, San Diego, CA (US); Umesh Phuyal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 315 days.

(21) Appl. No.: 17/637,498

(22) PCT Filed: Aug. 27, 2020

(86) PCT No.: PCT/CN2020/111787
§ 371 (c)(1),
(2) Date: Feb. 23, 2022

(87) PCT Pub. No.: WO2021/037151
PCT Pub. Date: Mar. 4, 2021

(65) Prior Publication Data
US 2022/0295544 A1 Sep. 15, 2022

(30) Foreign Application Priority Data

Aug. 27, 2019 (WO) ................ PCT/CN2019/102732

(51) Int. Cl.
*H04W 74/04* (2009.01)
*H04W 74/00* (2009.01)
*H04W 84/04* (2009.01)

(52) U.S. Cl.
CPC ......... *H04W 74/04* (2013.01); *H04W 74/006* (2013.01); *H04W 84/047* (2013.01)

(58) Field of Classification Search
None
See application file for complete search history.

(56) References Cited

U.S. PATENT DOCUMENTS 11,882,541 B2 *  1/2024  Khoryaev ........... H04W 64/003
2010/0195607 A1    8/2010  Lee et al.
(Continued)

FOREIGN PATENT DOCUMENTS

CN      101127551 A    2/2008
CN      102143594 A    8/2011
(Continued)

OTHER PUBLICATIONS

Huawei: "RN Synchronization Method" 3GPP TSG-RAN WG4 Meeting Ad Hoc 2010 #4, R4-103608, Oct. 15, 2010 (Oct. 15, 2010), the whole document, pp. 1-5.
(Continued)

*Primary Examiner* — Anh Vu H Ly
(74) *Attorney, Agent, or Firm* — Holland & Hart LLP

(57) ABSTRACT

Methods, systems, and devices for wireless communications are described. A user equipment (UE) may receive, for a base station, a configuration message indicating a set of random access resources associated with monitoring by a relay node. The UE may transmit a random access message using the random access resources to the relay node and a timing advance associated with uplink data transmissions by the UE. The UE may then communicate with the base station via the relay node based on the random access message. In some examples, a UE may monitor for a relay reference signal from a relay node. The UE may determine a signal strength and a timing of the relay reference signal. The UE
(Continued)

may determine whether an RSRP satisfies a threshold receive power, and may determine whether the timing of the relay reference signal is less than a timing threshold. The UE may transmit a downlink relay request to the base station to initiate relay communications.

30 Claims, 33 Drawing Sheets

(56) References Cited

U.S. PATENT DOCUMENTS

| | | | | |
|---|---|---|---|---|
| 2013/0279435 | A1* | 10/2013 | Dinan | H04W 52/40 |
| | | | | 370/329 |
| 2014/0161024 | A1* | 6/2014 | Speight | H04B 7/204 |
| | | | | 370/315 |
| 2014/0198716 | A1* | 7/2014 | Speight | H04W 72/04 |
| | | | | 370/315 |
| 2014/0241235 | A1* | 8/2014 | Speight | H04W 52/50 |
| | | | | 370/315 |
| 2014/0241237 | A1* | 8/2014 | Speight | H04W 74/0833 |
| | | | | 370/315 |
| 2017/0135112 | A1 | 5/2017 | Speight et al. | |
| 2017/0181182 | A1 | 6/2017 | Patel et al. | |
| 2017/0353976 | A1 | 12/2017 | Yerramalli et al. | |
| 2018/0063768 | A1 | 3/2018 | Martin | |
| 2019/0261407 | A1* | 8/2019 | Irukulapati | H04W 74/008 |
| 2020/0068580 | A1* | 2/2020 | Tang | H04W 76/14 |
| 2020/0344708 | A1* | 10/2020 | Liao | H04W 72/02 |
| 2021/0168880 | A1* | 6/2021 | Ohara | H04W 74/008 |
| 2022/0110155 | A1* | 4/2022 | Chou | H04W 74/085 |

FOREIGN PATENT DOCUMENTS

| | | |
|---|---|---|
| EP | 2302965 A1 | 3/2011 |
| WO | 2010071713 A1 | 6/2010 |
| WO | WO-2013027014 A1 | 2/2013 |
| WO | WO-2013151746 A2 | 10/2013 |
| WO | WO-2016106676 A1 | 7/2016 |
| WO | WO-2018059528 A1 | 4/2018 |
| WO | 2018172842 A2 | 9/2018 |

OTHER PUBLICATIONS

International Search Report and Written Opinion—PCT/CN2020/111787—ISA/EPO—Nov. 27, 2020.
International Search Report and Written Opinion—PCT/CN2019/102732—ISA/EPO—May 26, 2020.
Supplementary European Search Report—EP20858507—Search Authority—Munich—Aug. 28, 2023.
Supplementary Partial European Search Report—EP20858507—Search Authority—Munich—May 26, 2023.
European Search Report—EP24160223—Search Authority—Munich—Jun. 12, 2024.

* cited by examiner

Subframe Set 0

Subframe Set 1

Subframe Set 2

Not used

NON-TRANSPARENT INBAND RELAY NODE IN A SINGLE FREQUENCY NETWORK

CROSS-REFERENCE TO RELATED APPLICATIONS

The present Application is a 371 national stage filing of International PCT Application No. PCT/CN2020/111787 by Wei et al., entitled "NON-TRANSPARENT INBAND RELAY NODE IN A SINGLE FREQUENCY NETWORK," filed Aug. 27, 2020; and claims priority to International PCT Application No. PCT/CN2019/102732 by Wei et al., entitled "NON-TRANSPARENT INBAND RELAY NODE IN A SINGLE FREQUENCY NETWORK," filed Aug. 27, 2019, each of which is assigned to the assignee hereof, and each of which is expressly incorporated by reference in its entirety herein.

TECHNICAL FIELD

The following relates generally to wireless communications, and more specifically to a non-transparent inband relay node in a single frequency network.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE). In some examples, a relay node may enhance throughput or provide coverage to some geographic areas. Relay nodes may perform transparent or non-transparent relay services between a base station and one or more user equipments (UEs).

SUMMARY

The described techniques relate to improved methods, systems, devices, and apparatuses that support non-transparent inband relay nodes in a single frequency network. Generally, a user equipment (UE) may receive, from a base station, a configuration message indicating a set of random access resources associated with monitoring by a relay node. The UE may transmit a random access message for monitoring by a relay node using the random access resources and a timing advance associated with uplink data transmissions by the UE. The UE may then communicate with the base station via the relay node based on the random access message. In some examples, a UE may monitor for a relay reference signal from a relay node. The UE may determine a signal strength of the relay reference signal and a timing of the relay reference signal. The UE may determine whether a reference signal receive power (RSRP) satisfies a threshold receive power, and may determine whether the timing of the relay reference signal is less than a timing threshold. The UE may determine whether it can be relayed (e.g., whether it qualifies to participate in relay communication procedures) based on the signal strength and the timing, and may transmit a downlink relay request to the base station to initiate relay communications. In some cases, the UE may identify sets of independent transmission time intervals (TTIs) that are allocated for downlink transmissions, relay transmissions, or both, and may perform channel estimation for the different sets of TTIs.

A method of wireless communications at a UE is described. The method may include receiving from a base station, a configuration message indicating a set of random access resources associated with monitoring by a relay node, transmitting, based on the configuration, a random access message using the random access resources associated with monitoring by the relay node, where the random access message uses a timing advance associated with uplink data transmissions by the UE, and communicating with the base station via the relay node based on the random access message.

An apparatus for wireless communications at a UE is described. The apparatus may include a processor, memory coupled (e.g., operatively, communicatively, functionally, electronically, or electrically) to the processor, and instructions stored in the memory. The instructions may be executable by the processor to cause the apparatus to receive from a base station, a configuration message indicating a set of random access resources associated with monitoring by a relay node, transmit, based on the configuration, a random access message using the random access resources associated with monitoring by the relay node, where the random access message uses a timing advance associated with uplink data transmissions by the UE, and communicate with the base station via the relay node based on the random access message.

Another apparatus for wireless communications at a UE is described. The apparatus may include means for receiving from a base station, a configuration message indicating a set of random access resources associated with monitoring by a relay node, transmitting, based on the configuration, a random access message using the random access resources associated with monitoring by the relay node, where the random access message uses a timing advance associated with uplink data transmissions by the UE, and communicating with the base station via the relay node based on the random access message.

A non-transitory computer-readable medium storing code for wireless communications at a UE is described. The code may include instructions executable by a processor to receive from a base station, a configuration message indicating a set of random access resources associated with monitoring by a relay node, transmit, based on the configuration, a random access message using the random access resources associated with monitoring by the relay node, where the random access message uses a timing advance associated with uplink data transmissions by the UE, and communicate with the base station via the relay node based on the random access message.

Some examples of the method, apparatuses, and non-transitory computer-readable medium described herein may further include operations, features, means, or instructions for determining an uplink timing advance value based on a transmission timing of a physical uplink shared channel (PUSCH), and applying the uplink timing advance value to the random access message, where transmitting the random access message may be according to the uplink timing advance value.

In some examples of the method, apparatuses, and non-transitory computer-readable medium described herein, the configuration message includes a control message indicating that the random access message may be to be transmitted according to a timing advance value.

In some examples of the method, apparatuses, and non-transitory computer-readable medium described herein, the control message includes downlink control information for triggering contention free random access (CFRA) transmission, the downlink control information including a one-bit indicator.

A method of wireless communications at a base station is described. The method may include transmitting, to a UE, a configuration message indicating a set of random access resources associated with monitoring by a relay node, monitoring for an uplink relay request from a relay node, receiving, based on the monitoring, the uplink relay request includes an indication of a UE, and communicating with the UE via the relay node based on the uplink relay request.

An apparatus for wireless communications at a base station is described. The apparatus may include a processor, memory coupled (e.g., operatively, communicatively, functionally, electronically, or electrically) to the processor, and instructions stored in the memory. The instructions may be executable by the processor to cause the apparatus to transmit, to a UE, a configuration message indicating a set of random access resources associated with monitoring by a relay node, monitor for an uplink relay request from a relay node, receive, based on the monitoring, the uplink relay request includes an indication of a UE, and communicate with the UE via the relay node based on the uplink relay request.

Another apparatus for wireless communications at a base station is described. The apparatus may include means for transmitting, to a UE, a configuration message indicating a set of random access resources associated with monitoring by a relay node, monitoring for an uplink relay request from a relay node, receiving, based on the monitoring, the uplink relay request includes an indication of a UE, and communicating with the UE via the relay node based on the uplink relay request.

A non-transitory computer-readable medium storing code for wireless communications at a base station is described. The code may include instructions executable by a processor to transmit, to a UE, a configuration message indicating a set of random access resources associated with monitoring by a relay node, monitor for an uplink relay request from a relay node, receive, based on the monitoring, the uplink relay request includes an indication of a UE, and communicate with the UE via the relay node based on the uplink relay request.

In some examples of the method, apparatuses, and non-transitory computer-readable medium described herein, the configuration message includes a control message indicating that the random access message may be to be transmitted according to a timing advance value.

In some examples of the method, apparatuses, and non-transitory computer-readable medium described herein, the control message includes a one-bit indicator included in downlink control information for triggering CFRA transmission.

A method of wireless communications at a relay node is described. The method may include monitoring a set of one or more random access resources for a random access message from a UE, receiving, based on the monitoring, a random access message over the set of random access resources, where the random access message uses a timing advance associated with uplink data transmissions by the UE, and performing relay operations to facilitate communication between the UE and the base station based on receiving the random access message.

An apparatus for wireless communications at a relay node is described. The apparatus may include a processor, memory coupled (e.g., operatively, communicatively, functionally, electronically, or electrically) to the processor, and instructions stored in the memory. The instructions may be executable by the processor to cause the apparatus to monitor a set of one or more random access resources for a random access message from a UE, receive, based on the monitoring, a random access message over the set of random access resources, where the random access message uses a timing advance associated with uplink data transmissions by the UE, and perform relay operations to facilitate communication between the UE and the base station based on receiving the random access message.

Another apparatus for wireless communications at a relay node is described. The apparatus may include means for monitoring a set of one or more random access resources for a random access message from a UE, receiving, based on the monitoring, a random access message over the set of random access resources, where the random access message uses a timing advance associated with uplink data transmissions by the UE, and performing relay operations to facilitate communication between the UE and the base station based on receiving the random access message.

A non-transitory computer-readable medium storing code for wireless communications at a relay node is described. The code may include instructions executable by a processor to monitor a set of one or more random access resources for a random access message from a UE, receive, based on the monitoring, a random access message over the set of random access resources, where the random access message uses a timing advance associated with uplink data transmissions by the UE, and perform relay operations to facilitate communication between the UE and the base station based on receiving the random access message.

Some examples of the method, apparatuses, and non-transitory computer-readable medium described herein may further include operations, features, means, or instructions for measuring a timing of the random access message, comparing the measured timing of the random access message to a timing threshold, and determining, based on comparing, whether the UE can be relayed by the relay node.

A method of wireless communications at a UE is described. The method may include monitoring a relay reference signal from a relay node, determining a signal strength of the relay reference signal and a timing of the relay reference signal based on the monitoring, and transmitting, to a base station, a downlink relay request based on the determining.

An apparatus for wireless communications at a UE is described. The apparatus may include a processor, memory coupled (e.g., operatively, communicatively, functionally, electronically, or electrically) to the processor, and instructions stored in the memory. The instructions may be executable by the processor to cause the apparatus to monitor a relay reference signal from a relay node, determine a signal strength of the relay reference signal and a timing of the relay reference signal based on the monitoring, and transmit, to a base station, a downlink relay request based on the determining.

Another apparatus for wireless communications at a UE is described. The apparatus may include means for monitoring a relay reference signal from a relay node, determining a signal strength of the relay reference signal and a timing of the relay reference signal based on the monitoring, and transmitting, to a base station, a downlink relay request based on the determining.

A non-transitory computer-readable medium storing code for wireless communications at a UE is described. The code may include instructions executable by a processor to monitor a relay reference signal from a relay node, determine a signal strength of the relay reference signal and a timing of the relay reference signal based on the monitoring, and transmit, to a base station, a downlink relay request based on the determining.

In some examples of the method, apparatuses, and non-transitory computer-readable medium described herein, determining a signal strength of the relay reference signal may include operations, features, means, or instructions for receiving, based on the monitoring, the relay reference signal from the relay node, performing one or more measurements on the relay reference signal, and determining, based on the one or more measurements, whether a RSRP of the relay reference signal satisfies a power threshold, where transmitting the downlink relay request may be based on determining that the RSRP of the reference signal satisfies the power threshold.

In some examples of the method, apparatuses, and non-transitory computer-readable medium described herein, determining the timing of the relay reference signal may include operations, features, means, or instructions for receiving, based on the monitoring, the relay reference signal from the relay node, comparing the timing of the relay reference signal to a threshold timing value, and determining, based on the comparing, whether the timing of the relay reference signal satisfies the threshold timing value, where transmitting the downlink relay request may be based on determining that the timing of the relay reference signal satisfies the threshold timing value.

In some examples of the method, apparatuses, and non-transitory computer-readable medium described herein, the downlink relay request includes an indication of the relay node.

In some examples of the method, apparatuses, and non-transitory computer-readable medium described herein, the relay reference signal may be a channel state information reference signal (CSI-RS).

In some examples of the method, apparatuses, and non-transitory computer-readable medium described herein, the relay reference signal may be a synchronization signal block (SSB) not on the sync raster.

Some examples of the method, apparatuses, and non-transitory computer-readable medium described herein may further include operations, features, means, or instructions for receiving a first configuration message indicating a first set of transmission time intervals (TTIs) allocated for receiving downlink relay transmissions from the relay node, receiving a second configuration message indicating a second set of TTIs allocated for receiving downlink transmissions from the base station, identifying, based on the first set of TTIs and the second set of TTIs, a third set of TTIs allocated for receiving downlink relay transmissions from the relay node, downlink transmissions from the base station, or both, and performing a cross-TTI channel estimation based on the identifying.

Some examples of the method, apparatuses, and non-transitory computer-readable medium described herein may further include operations, features, means, or instructions for identifying a first receive beam, where receiving the first configuration message includes receiving the first configuration message via the first receive beam, and identifying a second receive beam, where receiving the second configuration message includes receiving the second configuration message via the second receive beam.

Some examples of the method, apparatuses, and non-transitory computer-readable medium described herein may further include operations, features, means, or instructions for monitoring one or more of the first set of TTIs, the second set of TTIs, and the third set of TTIs, based on the identifying, and receiving, based on the monitoring, downlink relay transmissions from the relay node during the first set of TTIs, the third set of TTIs, or both, or downlink transmissions from the base station during the second set of TTIs, the third set of TTIs, or both, or a combination thereof.

Some examples of the method, apparatuses, and non-transitory computer-readable medium described herein may further include operations, features, means, or instructions for receiving, during the third set of TTIs, a downlink transmission from the base station and a downlink relay transmission from the relay node, where the downlink transmission and the downlink relay transmission may be frequency division multiplexed.

In some examples of the method, apparatuses, and non-transitory computer-readable medium described herein, performing the cross-TTI channel estimation may include operations, features, means, or instructions for performing a first cross-TTI channel estimation for the first set of TTIs, a second cross-TTI channel estimation for the second TTIs, a third cross-TTI channel estimation for the third set of TTIs, or a combination thereof.

Some examples of the method, apparatuses, and non-transitory computer-readable medium described herein may further include operations, features, means, or instructions for reporting, to the relay node, first channel state information corresponding to the first set of TTIs, the third set of TTIs, or both, and reporting, to the base station, second channel state information corresponding to the second set of TTIs, the third set of TTIs, or both.

Some examples of the method, apparatuses, and non-transitory computer-readable medium described herein may further include operations, features, means, or instructions for generating a beam report for subsequent communications, and incorporating the beam report in the first channel state information, the second channel state information, or both.

DETAILED DESCRIPTION

Figure 1:
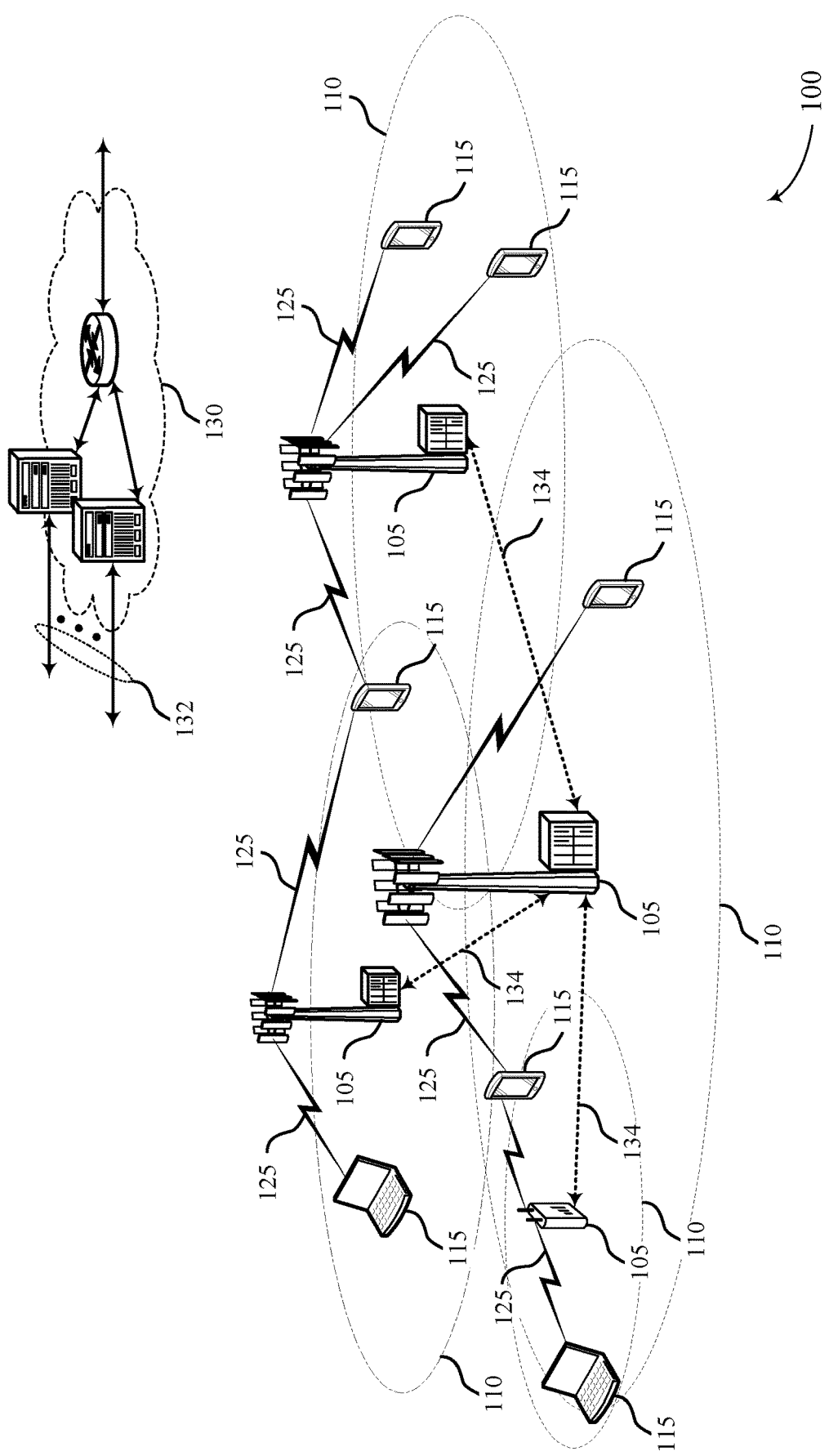
FIG. 1 illustrates an example of a system for wireless communications that supports a non-transparent inband relay node in a single frequency network in accordance with aspects of the present disclosure.

In some examples of wireless communication, a relay node may enable relay communication procedures, which may provide coverage, enhance throughput, or both, for a geographic area. For example, in a network based relay, a base station may communicate with a relay node via a backhaul link, and the relay node may communicate with a remote user equipment (UE) via an access link (e.g., a bidirectional wireless link). In an outband relay scenario, the access link and the backhaul link may operate in different carrier frequencies, and the relay node may simultaneously transmit and receive. However, in an inband relay node scenario, the backhaul link and the access link may be time division multiplexed (TDM) on the same carrier frequency.

In some examples, relay communication procedures may result in some constraints on communication. For instance, in some wireless communications systems (e.g., narrowband internet of things (NB-IoT), machine type communications (MTC), evolved MTC (eMTC), or the like), a UE may perform cross-subframe channel estimation for demodulation of downlink signals. However, when a relay node or a remote UE initiate or terminate relay transmissions on a channel, channel parameters may change suddenly and performance of some UEs may be affected based on poor channel estimation. To address cross-subframe channel estimation issues that arise when performing relay communications, a base station may configure a remote UE with a set of valid transmission time intervals (e.g., subframes) for downlink transmissions from the base station, and a relay node may configure the same remote UE with a set of valid TTIs (e.g., subframes) for relay transmissions from the relay node. The UE may thus determine a first set of TTIs for receiving downlink transmissions, a second set of TTIs for receiving relay transmissions, and a third set of subframes for receiving a downlink transmission that is multiplexed (e.g., via frequency division multiplexing (FDM)) with a relay transmission. Similarly, independent subframe sets may be allocated for uplink transmissions.

In some cases, if uplink synchronization is based on base station timing, then uplink signals from two UEs with uplink relaying may not be synchronized for arrival at the relay node. In such cases, uplink performance may be degraded (e.g., if a timing error is larger than the cyclic prefix). Thus, if a remote UE is close enough to the relay node with a small timing error, then the UE may be relayed (e.g., may participate in relay procedures). But, if a remote UE is too far away from the relay node and the large timing error degrades relay communications, then the UE may not be relayed (e.g., may not participate in relay procedures). A relay node may not be able to determine whether a remote UE is geographically located close enough to the relay node to perform relay communications. In such examples, the base station may configure the remote UE to transmit a random access transmission with an uplink timing advance value, so that the relay node can identify a transmission timing of the remote UE and determine whether the remote UE can be relayed. In some examples, the relay node may transmit a relay reference signal (e.g., a channel state information reference signal (CSI-RS)) or a synchronization signal not on the sync raster) to the remote UE for relay discovery. The remote UE may measure the reference signal receive power (RSRP) of the relay reference signal and may identify an estimated timing for the reference signal. If the estimated timing satisfies a timing threshold (e.g., is less than a cyclic prefix length) and if the RSRP satisfies a power threshold, then the UE may report to the base station that it is capable of relay procedures with the relay node, and may request downlink relaying via the relay node.

Aspects of the disclosure are initially described in the context of a wireless communications system. Aspects of the disclosure are further illustrated by and described with reference to timing schemes, transmission mode switching schemes, subframe allocations, and process flows. Aspects of the disclosure are further illustrated by and described with reference to apparatus diagrams, system diagrams, and flowcharts that relate to a non-transparent inband relay node in a single frequency network.

FIG. 1 illustrates an example of a wireless communications system 100 that supports a non-transparent inband relay node in a single frequency network in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a multimedia/entertainment device (e.g., a radio, a MP3 player, a video device, etc.), a camera, a gaming device, a navigation/positioning device (e.g., GNSS (global navigation satellite system) devices based on, for example, GPS (global positioning system), Beidou, GLONASS, or Galileo, a terrestrial-based device, etc., a tablet computer, a laptop computer, a personal computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In an aspect, techniques disclosed herein may be applicable to MTC or IoT UEs. MTC or IoT UEs may include MTC/enhanced MTC (eMTC, also referred to as CAT-M, Cat M1) UEs, NB-IoT (also referred to as CAT NB1) UEs, as well as other types of UEs. eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some examples, a UE 115 may receive from a base station, a configuration message indicating a set of random access resources associated with monitoring by a relay node, transmit, based on the configuration, a random access message using the random access resources associated with monitoring by the relay node, where the random access message uses a timing advance associated with uplink data transmissions by the UE 115, and communicate with the base station via the relay node based on the random access message. The relay node may determine, based on the random access transmission and the timing advance value thereof, whether the UE 115 can be relayed. An advantage of such techniques may include improved throughput, improved system efficiency, extended coverage, support of low power transmissions, and improved user experience.

A UE 115 may monitor for a relay reference signal from a relay node, determine a signal strength of the relay reference signal and a timing of the relay reference signal based on the monitoring, and transmit, to a base station, a downlink relay request based on the determining. The UE may determine whether the UE 115 can be relayed. An advantage of such techniques may include improved throughput, improved system efficiency, extended coverage, support of low power transmissions, and improved user experience.

A UE may receive a first configuration message indicating a first set of transmission time intervals (TTIs) allocated for receiving downlink relay transmissions from the relay node, receive a second configuration message indicating a second set of TTIs allocated for receiving downlink transmissions from the base station, identify, based on the first set of TTIs and the second set of TTIs, a third set of TTIs allocated for receiving downlink relay transmissions from the relay node, downlink transmissions from the base station, or both, and perform a cross-TTI channel estimation based on the identifying. An advantage of such techniques may include improved channel estimation during cross-TTI channel estimation procedures, and improved user experience based thereon.

Figure 2:
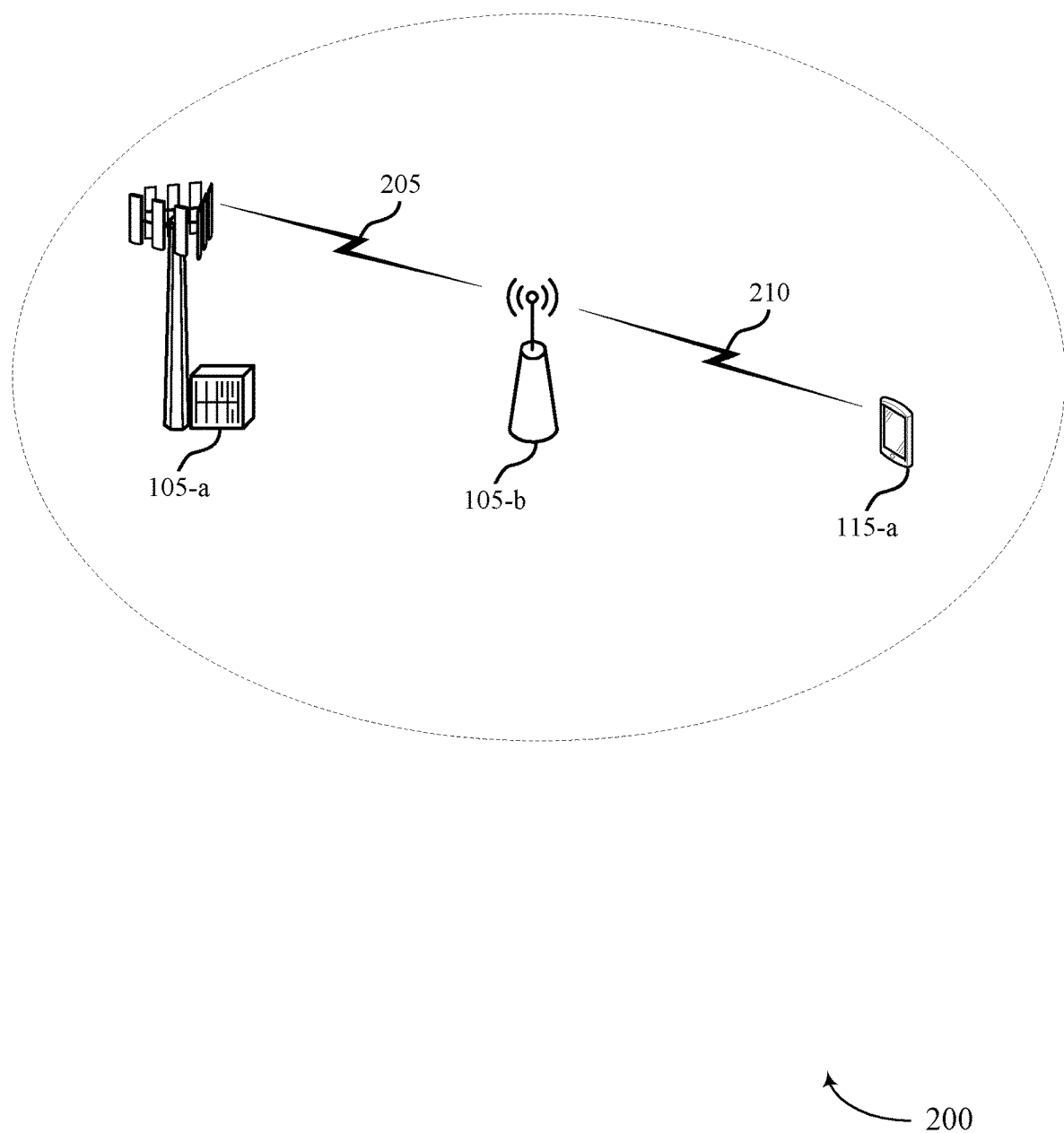
FIG. 2 illustrates an example of a wireless communications system that supports a non-transparent inband relay node in a single frequency network in accordance with aspects of the present disclosure.

FIG. 2 illustrates an example of a wireless communications system 200 that supports a non-transparent inband relay node in a single frequency network in accordance with aspects of the present disclosure. In some examples, wireless communications system 200 may implement aspects of wireless communications systems 100 and 200.

In some examples, a base station 105-a may serve one or more UEs 115. Base station 105-a may also perform relay communications with UE 115-a via relay node 105-b. Relay procedures may provide coverage, enhanced throughput, or both, in some geographic areas. For instance, UE 115-a may be too far away from base station 105-a to consistently receive downlink signals or send uplink signals, and base station 105-a may communicate with UE 115-a using relay procedures via relay node 105-b. Or, base station 105-a or UE 115-a may initiate relay procedures when throughput to UE 115-a is deficient.

Network-based relay procedures (e.g., static relay procedures) may be implemented in outband relay procedures or inband relay node procedures. In some examples of outband relay procedures, access links and backhaul links may be on different carrier frequencies. For instance, a backhaul link 205 between a donor base station 105-a and a relay node 105-b may occur on a first frequency carrier (e.g., F1), and an access link 210 between relay node 105-b and UE 115-a may occur on a second frequency carrier (e.g., F2). In some examples of inband relay node procedures, backhaul links and relay links may be time division multiplexed (TDM). For example, backhaul link 205 may occur on a first frequency carrier (e.g., F1) and access link 210 may occur on the same first frequency carrier (e.g., F1). Relay node 105-b may, in an inband relay node, create a separate cell distinct from the cell of the donor base station 105-a, which may be referred to as inband non-single frequency network (SFN). Or in an inband relay node, relay node 105-b may be part of the cell of the donor base station 105-a, having the same physical cell identifier (PCI) as the donor base station 105-a, which may be referred to as inband SFN relay.

Inband SFN relay may be used in various wireless communications systems, including narrowband internet of things (NB-IoT), machine type communications (MTC), evolved MTC (eMTC), or the like. In such examples, the relay procedures may be transparent (e.g., to support legacy UEs 115). However, transparent relay procedures may experience some constraints. For instance, for downlink communications, devices in some systems (e.g., NB-IoT, eMTC, etc.) may use cross-subframe channel estimation for demodulation. However, when a relay node 105-b or a remote UE 115-a initiate or terminate relay transmissions, channel parameters may change suddenly, and performance of some UEs may be negatively affected based on poor channel estimation. If uplink synchronization is based on a timing of base station 105-a, then uplink signals from two UEs 115 performing uplink relay procedures may not be synchronized upon arrival at the relay node. This may result in uplink performance degradation (e.g., if the timing error for one or both of the UEs 115 is greater than a cyclic prefix length). Some implementations may mitigate these constraints (e.g., relay procedures may only be enabled for DMRS based transmissions, which may address downlink issues). However, such mitigating implementations may not apply to some systems (e.g., NB-IoT systems, eMTC systems, or the like).

Base station 105-a and UE 115-a may perform relay communications via relay node 105-b in some examples, (e.g., non-transparent inband relay node procedures). To address cross-subframe channel estimation issues that arise when performing relay communications, base station 105-a may configure remote UE 115-a with a set of valid transmission time intervals (e.g., subframes) for downlink transmissions from the base station, and relay node 105-b may configure the same remote UE 115-a with a set of valid TTIs (e.g., subframes) for relay transmissions from relay node 105-b. UE 115-a may thus determine a first set of TTIs for receiving downlink transmissions, a second set of TTIs for receiving relay transmissions, and a third set of subframes for receiving both (e.g., for receiving downlink transmissions that are multiplexed (e.g., via FDM) with relay transmission). Similarly, TTI allocations may be configured for uplink transmissions. Subframe allocations supporting these techniques are described in greater detail with respect to FIGS. 13 and 16.

In some cases, if uplink synchronization for UE 115-a is based on base station 105-a timing, then uplink signals from two UEs 115 using uplink relay procedures may not be synchronized for arrival at relay node 105-b. Relay node 105-b may not be able to determine whether remote UE 115-b is geographically located close enough to relay node 105-b to perform relay communications. In such examples, base station 105-a may configure remote UE 115-a to transmit a random access transmission with an uplink timing advance value, so that relay node 105-b can identify a transmission timing of remote UE 115-a and determine whether remote UE 115-a can be relayed, as described in greater detail with respect to FIGS. 11 and 13. In some examples, relay node 105-b may transmit a relay reference signal (e.g., CSI-RS) to remote UE 115-a for relay discovery. Remote UE 115-a may measure the reference signal receive power (RSRP) of the relay reference signal and may identify an estimated timing for the reference signal. If the estimated timing satisfies a timing threshold (e.g., is less than a cyclic prefix length) and if the RSRP satisfies a power threshold, then UE 115-a may report to base station 105-a that it is capable of relay procedures with relay node 105-b, and may request downlink relaying from base station 105-a via relay node 105-b, as described in greater detail with respect to FIGS. 12 and 14.

Figure 3:
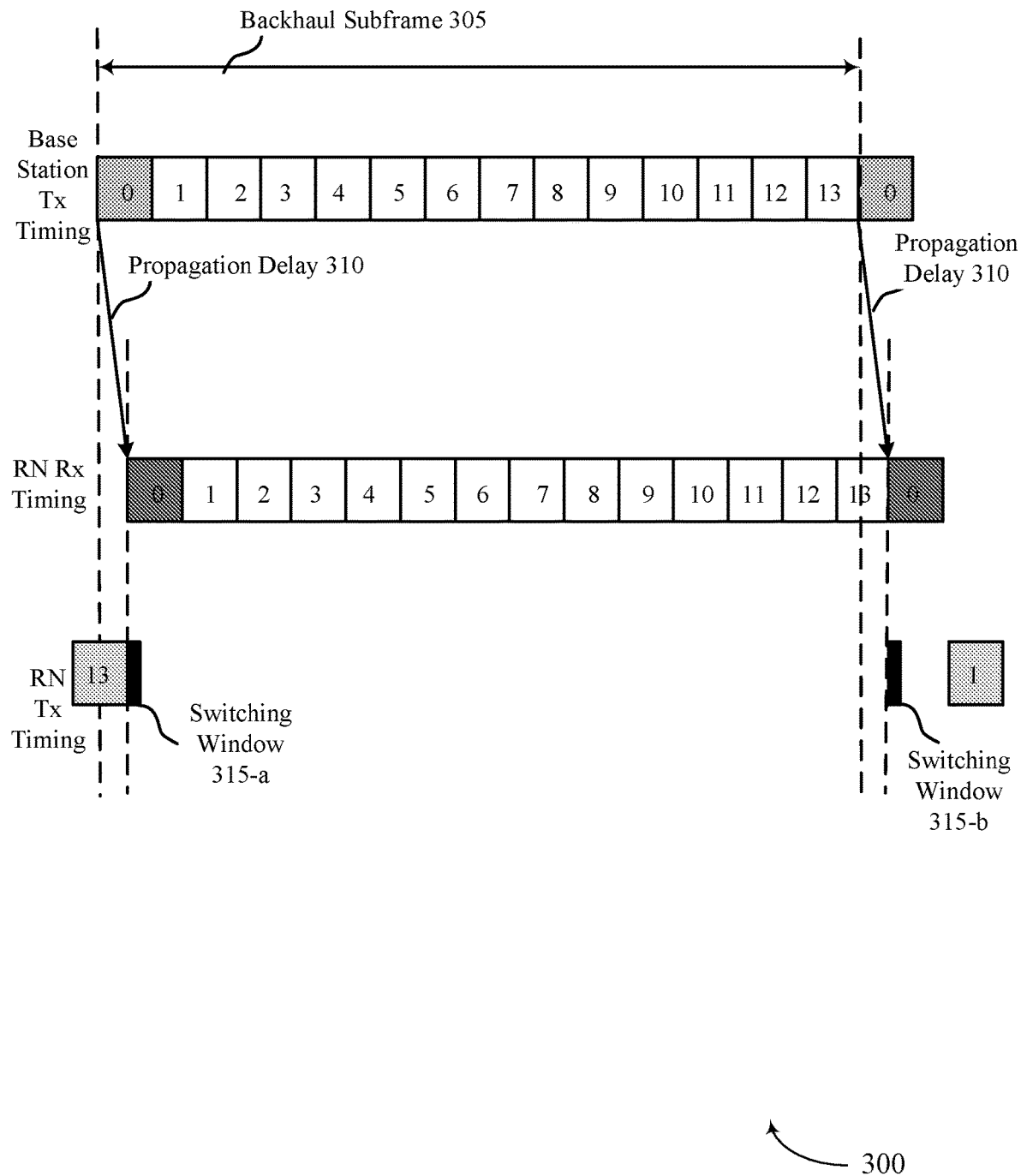
FIG. 3 illustrates an example of a transmission mode switching scheme that supports a non-transparent inband relay node in a single frequency network in accordance with aspects of the present disclosure.

FIG. 3 illustrates an example of a transmission mode switching scheme 300 that supports a non-transparent inband relay node in a single frequency network in accordance with aspects of the present disclosure. In some examples, transmission mode switching scheme 300 may implement aspects of wireless communications systems 100 and 200.

In some examples, a relay node 105 may perform downlink synchronization during inband SFN relay procedures (e.g., for LTE, MTC, NB-IoT systems, or the like). A base station 105 may transmit a backhaul subframe 305 to a relay node, according to base station transmission timing. Backhaul subframe 305 may include 14 symbols (e.g., symbols 0-13). Backhaul subframe 305 may experience a propagation delay 310. A relay node 105 may receive the backhaul subframe 305 after the propagation delay 310 according to the relay node receive timing. The relay node 105 may set its downlink timing to be equal to the measured downlink timing from the base station 105, as measured at the relay node 105. In some examples, the relay node 105 may not transmit a cell-specific reference signal (CRS). Backhaul subframe 305 may include a control region and CRS in the first symbol (e.g., symbol 0). Thus, instead of receiving a control region and CRS during the first symbol of backhaul subframe 305, the relay node 105 may perform transmit/receive switching during the first symbol (e.g., symbol 0). For instance, the relay node 105 may receive a previous backhaul subframe, prior to backhaul subframe 305, according to the measured timing of downlink signaling from the base station 105 (e.g., offset from the base station transmit timing by the propagation delay 310). The relay node 105 may relay the previous backhaul subframe, including symbol 13 of the previous backhaul subframe. Then, during symbol zero of the backhaul subframe 305, during switching window 315-a, the relay node 105 may switch from transmit mode to receive mode. The relay node 105 may then receive all of the data symbols of backhaul subframe 305 (e.g., symbols 1-13). During the first symbol (e.g., symbol 0) of the next subframe (e.g., during switching window 315-b), the relay node 105 may switch from receive mode to transmit mode. Relay node 105 may then transmit, beginning with the first data symbol of backhaul subframe 305 (e.g., symbol 1) all of the received data symbols of backhaul subframe 305 according to relay node transmit timing. Because a remote UE 115 will receive all of the data symbols relayed by relay node 105, UE 115 may remain unaffected by the mode switching performed during the first symbol of backhaul subframe 305.

Figure 4:
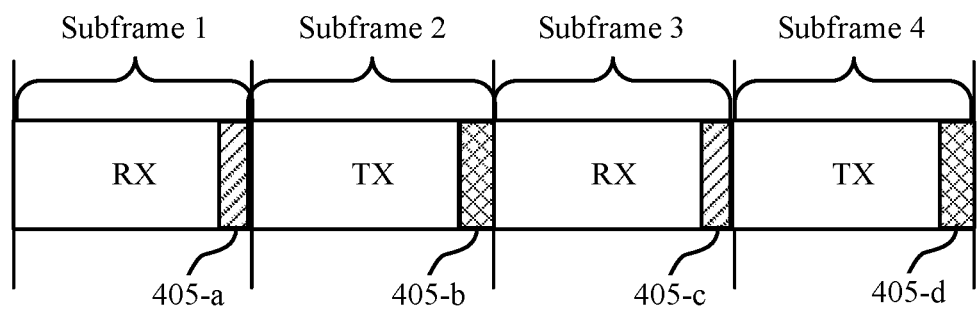
FIG. 4 illustrates an example of a transmission mode switching scheme that supports a non-transparent inband relay node in a single frequency network in accordance with aspects of the present disclosure.

FIG. 4 illustrates an example of a transmission mode switching scheme 400 that supports a non-transparent inband relay node in a single frequency network in accordance with aspects of the present disclosure. In some examples, transmission mode switching scheme 400 may implement aspects of wireless communications systems 100 and 200.

In some examples, a relay node 1405 and a UE 115 may perform uplink synchronization during inband SFN relay procedures (e.g., for LTE, MTC, NB-IoT systems, or the like). The relay node 105 may set its uplink timing to be equal to the uplink timing for a physical uplink shared channel (PUSCH) based on a timing advance offset received from the base station 105.

In such examples, a relay node 105 may switch between transmission mode and receive mode during the last symbol of a transmit subframe or receive subframe. For instance, the relay node 105 may receive transmissions from remote UE 115 during subframe 1, and during the final symbol 405-*a* of subframe 1, the relay node 105 may switch from receive mode to transmit mode. During subframe 2, the relay node 105 may transmit the data symbols received during subframe 1 from the remote UE 115 to the donor base station 105. During the final symbol 405-*b* of subframe 2, the relay node 105 may switch from transmit mode to receive mode. During subframe 3, the relay node 105 may receive transmissions from the remote UE 115, and during the final symbol 405-*c* of subframe 3 the relay node 105 may switch from receive mode to transmit mode. During subframe 4, base station 105 may relay the transmission receive during subframe 3 from the remote UE 115 to the donor base station 105. During final symbol 405-*d* of subframe 4, the relay node 105 may switch from transmit mode to receive mode.

Figure 5:
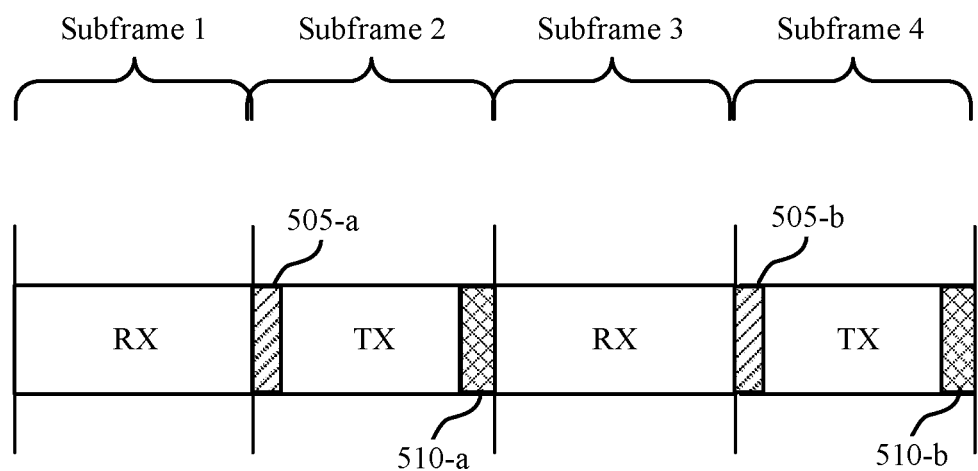
FIG. 5 illustrates an example of a transmission mode switching scheme that supports a non-transparent inband relay node in a single frequency network in accordance with aspects of the present disclosure.

FIG. 5 illustrates an example of a transmission mode switching scheme 500 that supports a non-transparent inband relay node in a single frequency network in accordance with aspects of the present disclosure. In some examples, transmission mode switching scheme 500 may implement aspects of wireless communications systems 100 and 200.

In some examples, a relay node 105 and a UE 115 may perform uplink synchronization during inband SFN relay procedures (e.g., for LTE, MTC, NB-IoT systems, or the like). The relay node 105 may set its uplink timing to be equal to the uplink timing for a physical uplink shared channel (PUSCH) based on a timing advance offset received from the base station 105.

In such examples, a relay node 105 may switch between transmit mode and receive mode during the first symbol and the last symbol, respectively, of each uplink transmission subframe of relay transmission to the donor base station 105. For instance, during subframe 1, the relay node 105 may receive uplink relay transmissions from a remote UE 115. During the first symbol 505-*a* of subframe 2, the relay node 105 may switch from receive mode to transmit mode. The relay node 105 may transmit the uplink relay message received during subframe 1 to the donor base station 105 during subframe 2. During the final symbol 510-*a* of subframe 2, the relay node 105 may switch from transmit mode back to receive mode to receive uplink relay messages from the remote UE 115 during subframe 3. During the first symbol of subframe 4, the relay node 105 may switch from receive mode to transmit mode and may transmit the received uplink relay messages from subframe 3 to the donor base station 105. During the final symbol 510-*b*, the relay node 05 may switch back to receive mode.

Figure 6:
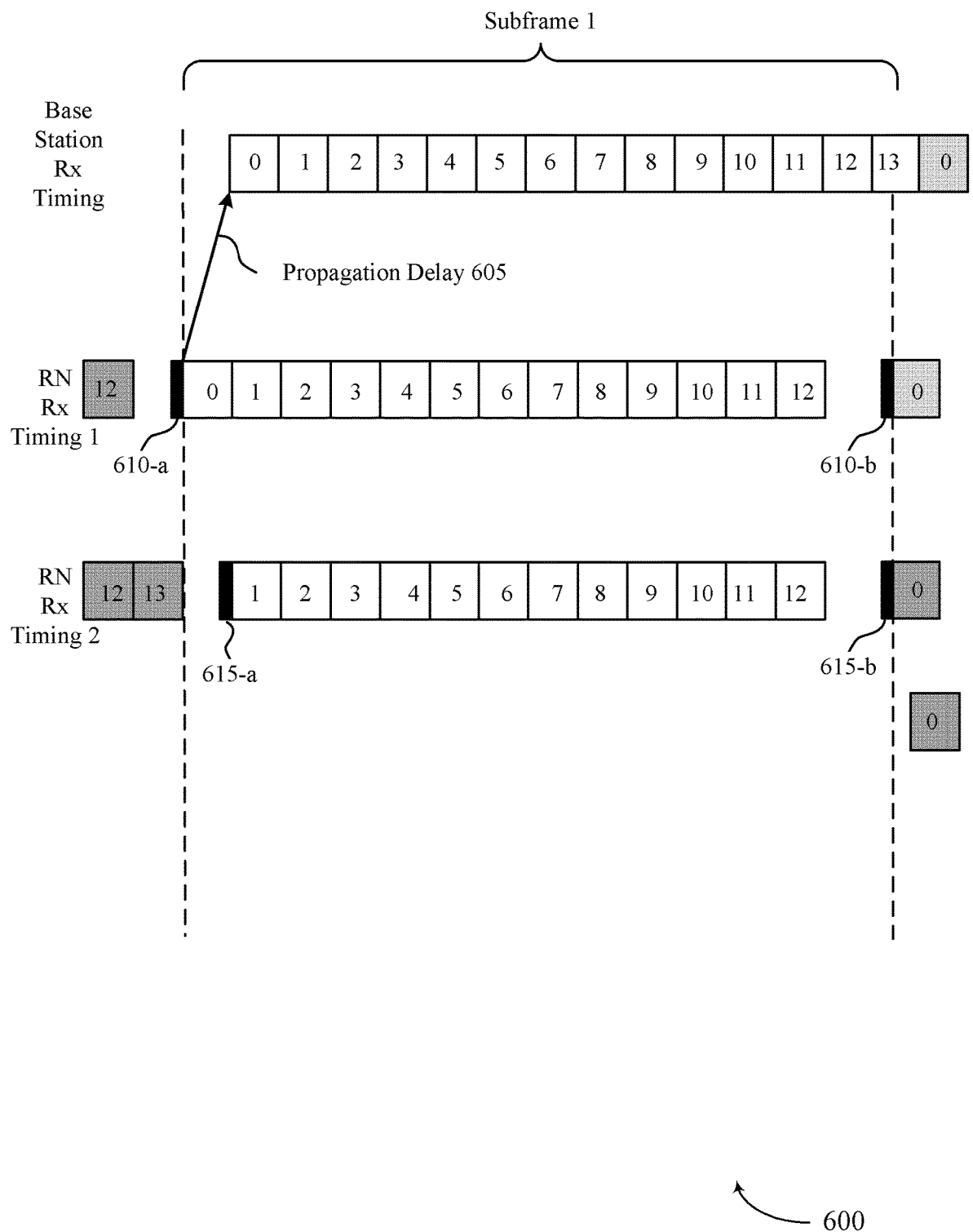
FIG. 6 illustrates an example of a transmission mode switching scheme that supports a non-transparent inband relay node in a single frequency network in accordance with aspects of the present disclosure.

FIG. 6 illustrates an example of a transmission mode switching scheme 600 that supports a non-transparent inband relay node in a single frequency network in accordance with aspects of the present disclosure. In some examples, transmission mode switching scheme 600 may implement aspects of wireless communications systems 100 and 200.

In some examples, a relay node 105 and a UE 115 may perform uplink synchronization during inband SFN relay procedures (e.g., for LTE, MTC, NB-IoT systems, or the like). The relay node 105 may set its uplink timing to be equal to the uplink timing for a physical uplink shared channel (PUSCH) based on a timing advance offset received from the base station 105.

In some examples, the relay node 105 may perform uplink synchronization according to relay node receive timing 1, as described with respect to FIG. 4. That is, the relay node 105 may switch between transmit mode and receive mode during the final symbol of each subframe. Thus, the relay node may receive an uplink relay message from a UE. During symbol 13 of the uplink message of the previous subframe (e.g., during switching window 610-*a*), the relay node may switch from receive mode to transmit mode. The relay node may then transmit data symbols 0-12 to the donor base station 105 during the first thirteen symbols of subframe 1. The donor base station 105 may receive the subframe transmitted during subframe 1 after propagation delay 605. During the final symbol 13 of subframe 1, the relay node may switch from transmit mode to receive mode (e.g., during switching window 610-*b*), and may begging receiving symbol zero of the subsequent uplink relay message from the remote UE 115.

In a second example, the relay node 105 may perform uplink synchronization according to relay node receive timing 2, as described with respect to FIG. 5. That is, the relay node 105 That is, the relay node 105 may switch between transmit mode and receive mode during the first symbol and the final symbol of each uplink subframe for relay transmissions to the donor base station 105. Thus, the relay node may receive an uplink relay message from a UE during a subframe prior to subframe 1. During the first symbol (symbol 0) of subframe 1 (e.g., during switching window 615-*a*), the relay node may switch from receive mode to transmit mode. The relay node may then transmit data symbols 1-12 to the donor base station 105 during the symbols 1-12. During the final symbol (symbol 13) of subframe 1 (e.g., during switching window 615-*b*), the relay node may switch from transmit mode to receive mode. The donor base station 105 may receive the subframe transmitted during subframe 1 after propagation delay 605. For the entirety of a subframe subsequent to subframe 1, the relay node 105 may receive a subsequent uplink relay message from the remote UE 115.

Figure 7:
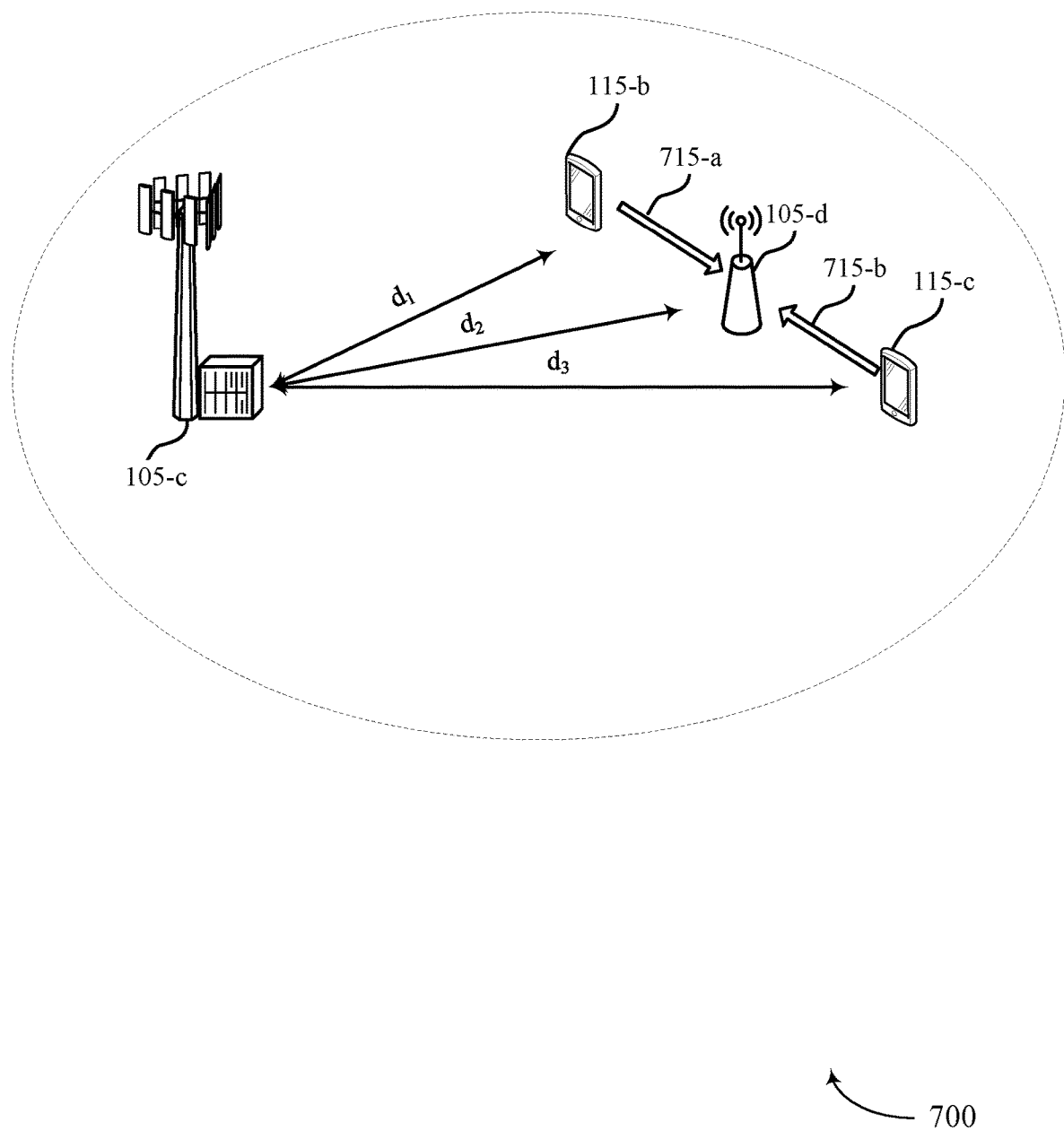
FIG. 7 illustrates an example of a wireless communications system that supports a non-transparent inband relay node in a single frequency network in accordance with aspects of the present disclosure.

FIG. 7 illustrates an example of a wireless communications system 700 that supports a non-transparent inband relay node in a single frequency network in accordance with aspects of the present disclosure. In some examples, wireless communications system 700 may implement aspects of wireless communications system 100. In some examples, base station 105-*b* may communicate with one or more UEs 115 (e.g., UE 115-*b*, and UE 115-*c*). Base station 105-*c* may also communicate with relay node 105-*d*, and may perform relay communications with one or more of UE 115-*b* and IE 115-*c* via relay node 105-*d*.

Relay node 105-*d* may set its uplink receive timing (e.g., the timing at which it expects to receive uplink relay communications from a remote UE 115) equal to its uplink transmit timing (e.g., the timing at which relay node 105-*d* sends uplink relay transmissions to base station 105-*c*). However, UE 115-*b* and UE 115-*c* may be timing advanced for uplink synchronization at base station 105-*c* and not at relay node 105-d. That is, UE 115-b may be configured with a first timing advance value to offset the propagation delay resulting from being geographically located distance 1 ($d_1$) from base station 105-c. UE 115-c may be configured with a second timing advance value to offset the propagation delay resulting from being geographically located distance 3 ($d_3$) from base station 105-c. Relay node 105-d may be geographically located distance 2 ($d_2$) from base station 105-c.

Although UE 115-b and UE 115-c are timing advanced for uplink synchronization with respect to base station 105-c, they may not be uplink synchronized with respect to relay node 105-d. Thus, because the first timing advance value for UE 115-b is smaller than the second timing advance value for UE 115-c, an uplink relay transmission 705-a from UE 115-b may arrive at relay node 105-d sooner than an uplink relay transmission 705-b from UE 115-c. In some examples, the timing error (e.g., the amount of time by which uplink relay transmission 715 is off from the uplink receive timing at relay node 105-d) may be within a timing error threshold, and a UE 115 may be relayed (e.g., may be able to participate in relay communications with base station 105-c via relay node 105-d because the timing error is not so great as to degrade communications). Such scenarios as described in greater detail with respect to FIG. 9. However, in some examples, the timing error may not be within a timing error threshold (e.g., may be greater than a cyclic prefix length), and the UE 115 may not be relayed. Such scenarios are described in greater detail with respect to FIG. 8. However, relay node 105-b may be unaware of which UEs 115 can be relayed and which UEs 115 cannot be relayed (e.g., because relay node 105 may be unaware of timing advance values for each UE 115, and UEs 115 may be mobile and their positions and timing advance values may change). Various approaches for determining which UEs 115 can be relayed are described with respect to FIGS. 10-16.

Figure 8:
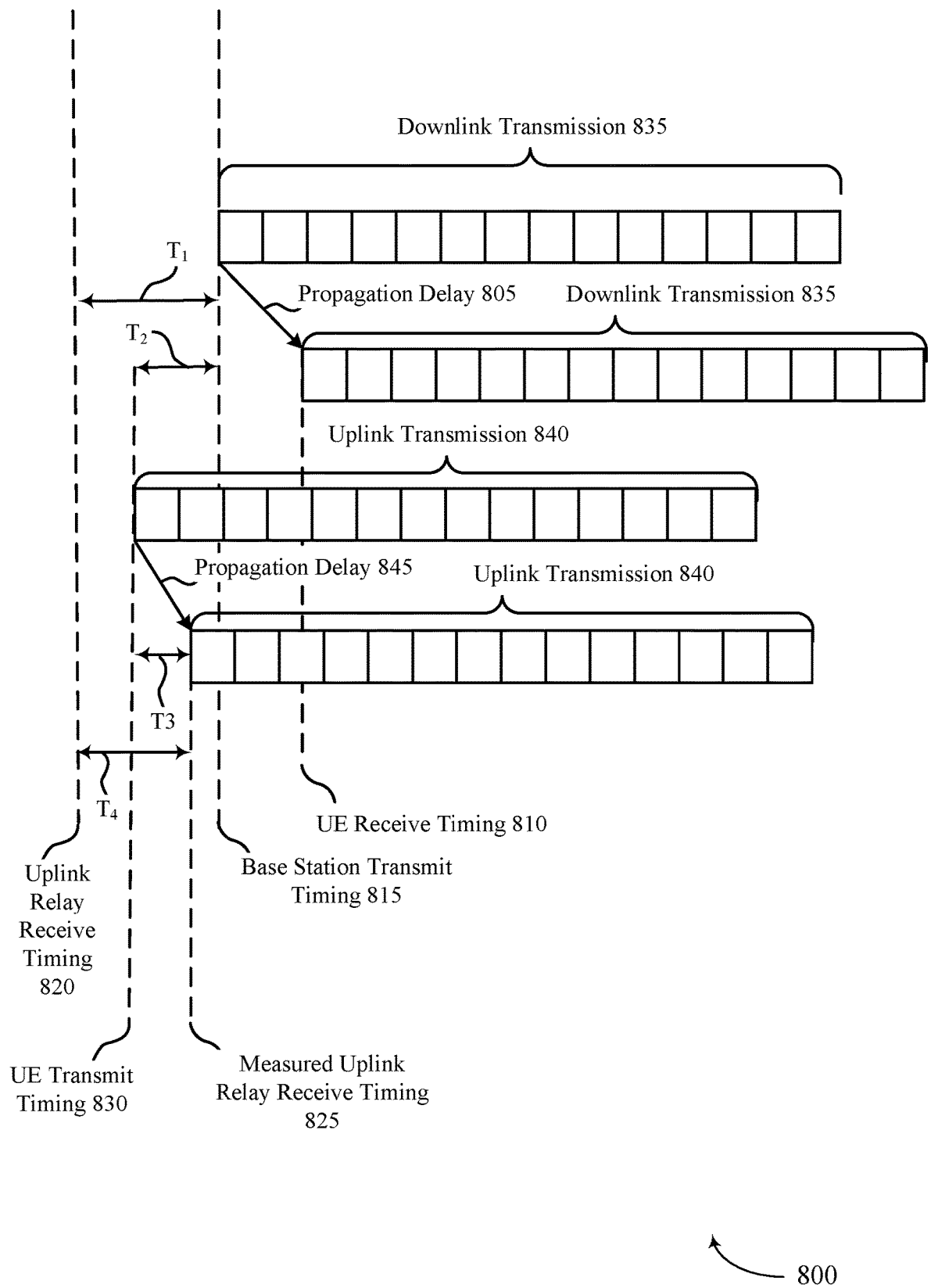
FIG. 8 illustrates an example of a timing scheme that supports a non-transparent inband relay node in a single frequency network in accordance with aspects of the present disclosure.

FIG. 8 illustrates an example of a timing scheme 800 that supports a non-transparent inband relay node in a single frequency network in accordance with aspects of the present disclosure. In some examples, timing scheme 800 may implement aspects of wireless communications systems 100 and 700. In some examples, a UE 115 (e.g., 115-b) may transmit signals that, because of the geographic position of UE 115-b, may exceed a timing error threshold, and UE 115-c may not be relayed.

A base station (e.g., base station 105-c) may send downlink transmissions 835 to UE 115-b. UE 115-b may receive downlink transmission 835 after propagation delay 805. UE 115-b may send uplink transmission 840 with a timing advance ($T_2$). That is, UE 115-b may transmit uplink transmission 840 with timing advance $T_2$ at UE transmit timing 830 prior to base station transmit timing 815 to offset propagation delay 805 (so that uplink transmission 840 arrives at base station 105-c aligned with base station receive timing which may equal base station transmit timing 815). However, because base station 105-c and relay node 105-d are not located at the same place, (e.g., relay node 105-d may be closer to UE 115-b than base station 105-c), relay node 105-d may receive uplink transmission 840 at measured uplink relay receive timing 825 based on propagation delay 845. That is, UE 115-b may not be timing advanced for uplink synchronization at relay node 105-d. UE 115-b may transmit uplink transmission 840 according to timing advance value $T_2$, which may arrive at relay node 105-d at measured uplink relay receive timing 825, which may be offset from expected uplink relay receive timing 820 by $T_4$.

The timing difference $T_4$ may be defined as $T_4=T_3-T_2+T_3$. If the starting time of uplink transmission 840 is later than the relay uplink relay receive timing 820 (e.g., the timing advance for UE 115-b is less than the timing advance value for relay node 105-d) then the uplink transmission 840 from UE 115-b may be out of a receiver FFT window (e.g., $T_4$ is greater than the length of a cyclic prefix). In such examples, UE 115-b may not be relayed. However, relay node 105-d may be unaware of whether UE 115-b can be relayed. In some examples, a UE 115 may be geographically located such that it can be relayed, as described in greater detail with respect to FIG. 9.

Figure 9:
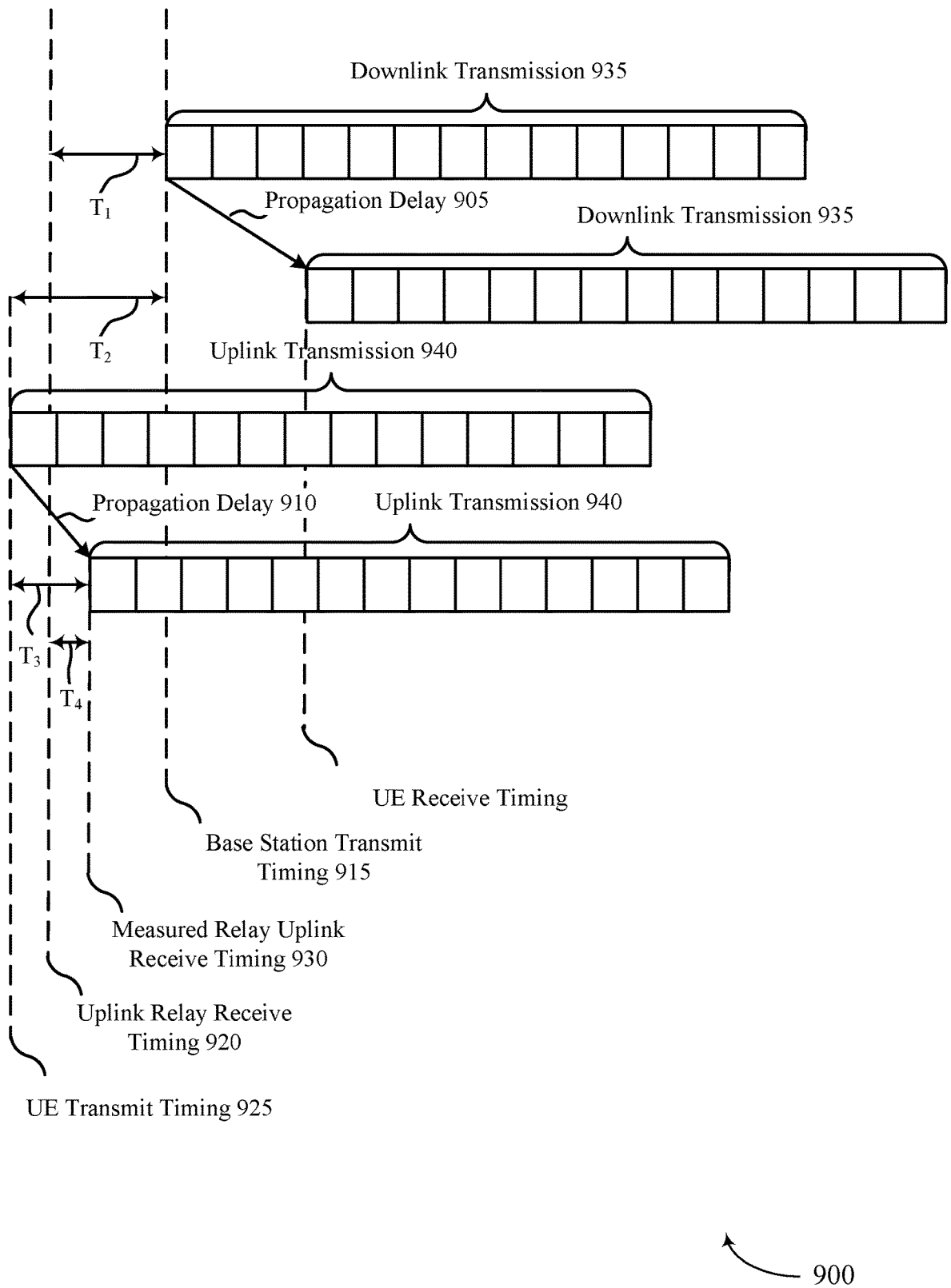
FIG. 9 illustrates an example of a timing scheme that supports a non-transparent inband relay node in a single frequency network in accordance with aspects of the present disclosure.

FIG. 9 illustrates an example of a timing scheme 900 that supports a non-transparent inband relay node in a single frequency network in accordance with aspects of the present disclosure. In some examples, timing scheme 900 may implement aspects of wireless communications systems 100 and 700.

In some examples, a UE 115 (e.g., 115-c) may transmit signals that, because of the geographic position of UE 115-c, may be inside of a timing error threshold, and UE 115-c can be relayed.

A base station (e.g., base station 105-c) may send downlink transmissions 935 to UE 115-c. Base station transmit timing 915 may be different than an expected uplink relay receive timing 920 by time $T_1$. UE 115-c may receive downlink transmission 935 after propagation delay 905. UE 115-c may send uplink transmission 940 with a timing advance ($T_2$). That is, UE 115-c may transmit uplink transmission 940 with timing advance $T_2$ at UE transmit timing 925 prior to base station transmit timing 915 to offset propagation delay 905 (so that uplink transmission 940 arrives at base station 105-c aligned with base station receive timing which may equal base station transmit timing 915). However, because base station 105-c and relay node 105-d are not located at the same place, (e.g., relay node 105-d may be closer to UE 115-c than base station 105-c), relay node 105-d may receive uplink transmission 940 at measured uplink relay receive timing 930, which may be later, based on propagation delay 910. That is, UE 115-c may not be timing advanced for uplink synchronization at relay node 105-d. UE 115-c may transmit uplink transmission 940 according to timing advance value $T_2$, which may arrive at relay node 105-d at measured uplink relay receive timing 930 (which may be offset from expected uplink relay receive timing 820 by $T_4$).

The timing difference $T_4$ may be defined as $T_4=T_3-T_2+T_3$. The starting time of uplink transmission 940 is later than the uplink relay receive timing 920. In some cases, the timing advance for UE 115-c is greater than the timing advance value for relay node 105-d. In such cases, the uplink transmission 940 from UE 115-b may be within a receiver FFT window (e.g., $T_4$ is less than the length of a cyclic prefix). In such examples, UE 115-c may be relayed. However, relay node 105-d may be unaware of whether UE 115-c can be relayed. Techniques for determining whether a remote UE 115 can be relayed are described with respect to FIGS. 10-15.

Figure 10:
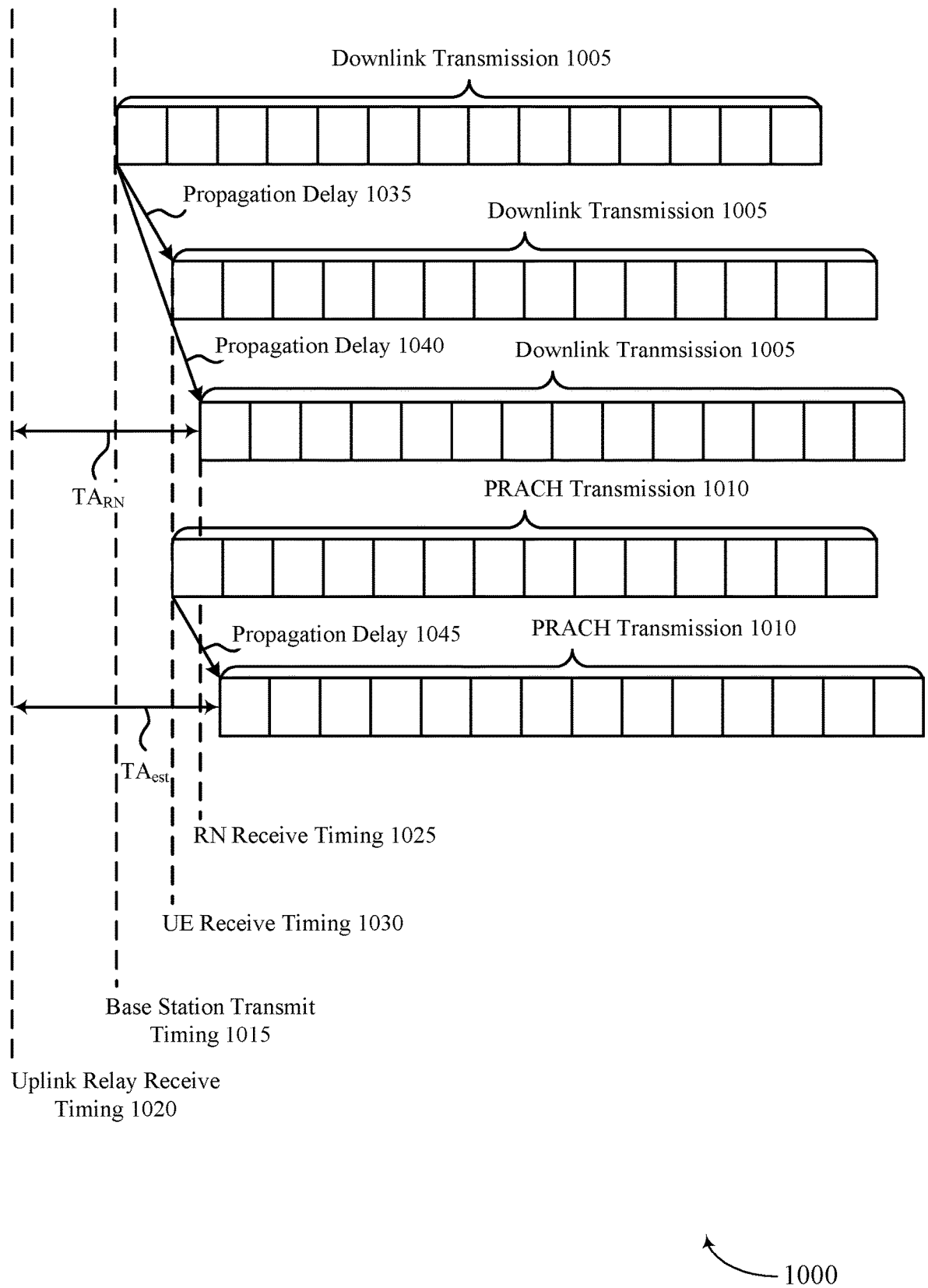
FIG. 10 illustrates an example of a timing scheme that supports a non-transparent inband relay node in a single frequency network in accordance with aspects of the present disclosure.

FIG. 10 illustrates an example of a timing scheme 1000 that supports a non-transparent inband relay node in a single frequency network in accordance with aspects of the present disclosure. In some examples, timing scheme 1000 may implement aspects of wireless communications systems 100 and 700.

In some examples, a relay node 105-*d* may have no information regarding the geographic location of a UE 115, and whether the UE 115 is located close enough to be relayed.

Base station 105-*c* may transmit a downlink transmission 1005 according to base station transmit timing 1015. A UE 115 (e.g., UE 115-*b*) may be located closer to base station 105-*c* than relay node 105-*d*, and may receive downlink transmission 1005 at UE receive timing 930 after propagation delay 1035, before downlink transmission 1005 is received at relay node 105-*d*. After propagation delay 1040, relay node 105-*d* may receive downlink transmission 1005 at relay node receive timing 1025. Relay node 105-*d* may set its timing advance ($TA_{RN}$) based on the relay node receive timing 1025.

Base station 105-*c* may configure relay node 105-*d* to measure an uplink signal (e.g., PRACH transmission 1010). UE 115-*b* may transmit PRACH transmission 1010 according to UE receive timing 1030. The relay node may receive PRACH transmission 1010 after propagation delay 1045, at an estimated or measured timing equal to ($T_{est}$). Relay node 105-*d* may attempt to determine the timing difference for UE 115-*b* based on PRACH 1010. However, UE 115-*b* may transmit PRACH 1010 with a timing advance value equal to zero (e.g., aligned with UE receive timing 1030). In such examples, relay node 105-*d* may not be able to determine whether UE 115-*b* is close enough based on the timing of PRACH 1010. For instance, if $T_{est} > TA_{RN}$, then the relay node may not be able to determine whether UE 115-*b* can be relayed because the relay node does not know the UE timing advance value for uplink data transmission and cannot estimate the propagation delay between the relay node and the UE 115. In some examples, as described in greater detail with respect to FIG. 11, UE 115-*b* may transmit a PRACH message with a timing advance value to allow relay node 105-*d* to determine whether UE 115-*b* can be relayed.

In some examples, a base station 105 may send the timing advance value for each served UE 115 to a relay node 105. The relay node 105 may compare the indicated timing advance values to determine the difference between each timing advance value and the timing advance value for the relay node 105. Alternatively, the relay node 105 may determine the timing advance value for a UE 15 may reading the random access response message from the base station 105 to the UE 115 in downlink signaling. Based on the measured $T_{est}$ from the PRACH, the relay node 105 may estimate the propagation delay between the relay node and the UE 115, and determine how closed the UE 115 is to the relay node 105. However, if a UE 115 is mobile or moving at a high velocity within the cell corresponding to the base station 105, then each of these techniques may rely on frequent updates of timing advance values for the mobile UEs 115. This may result in decreased efficiency, increased backhaul signaling overhead, system congestion, and decreased user experience. Instead, a UE 115 may send a PRACH transmission with a timing advance to the relay node 105, as described in greater detail with respect to FIG. 12, or may receive a relay reference signal from a relay node, as described in greater detail with respect to FIG. 13.

Figure 11:
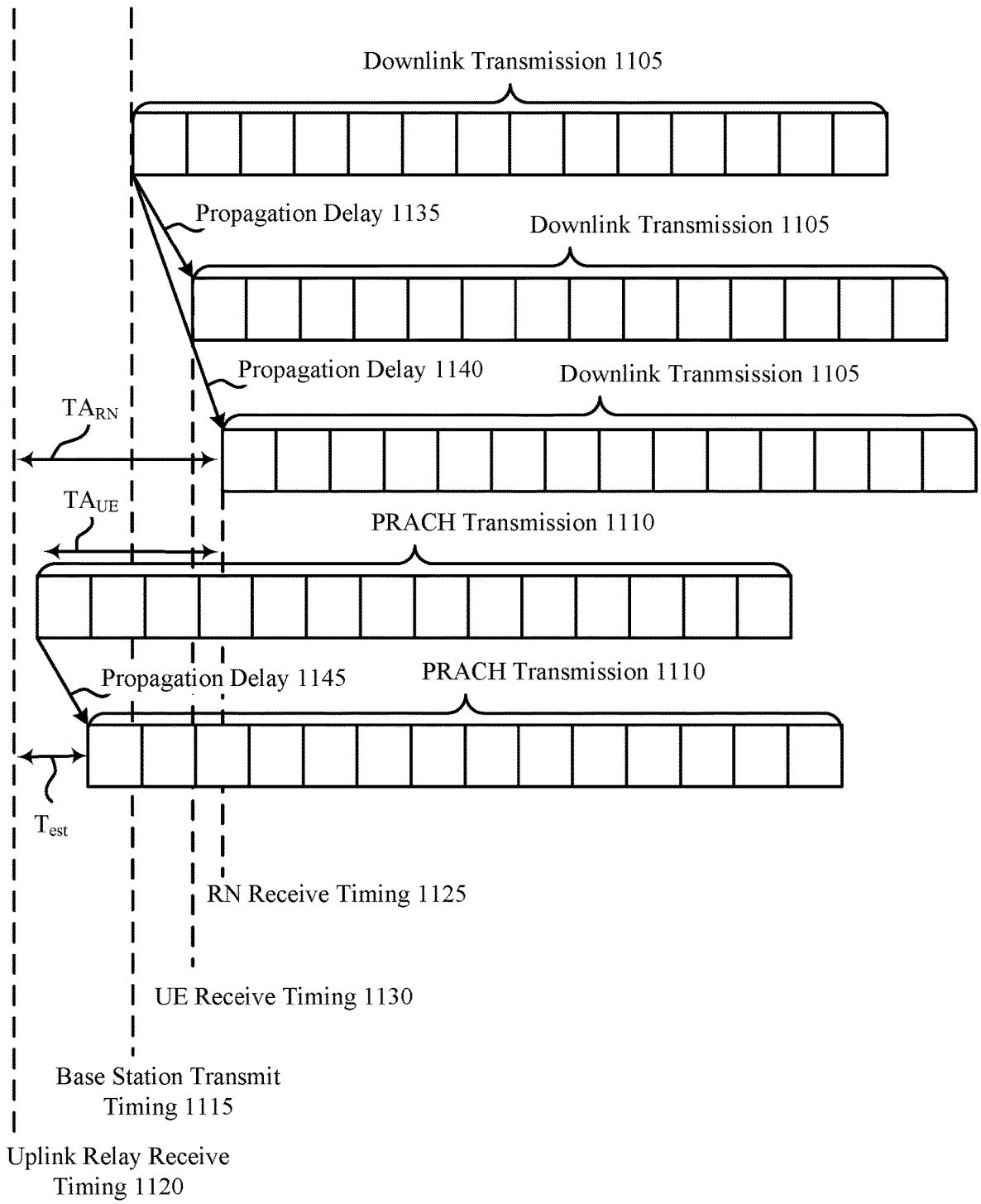
FIG. 11 illustrates an example of a timing scheme that supports a non-transparent inband relay node in a single frequency network in accordance with aspects of the present disclosure.

FIG. 11 illustrates an example of a timing scheme 1100 that supports a non-transparent inband relay node in a single frequency network in accordance with aspects of the present disclosure. In some examples, timing scheme 1100 may implement aspects of wireless communications systems 100 and 700.

Base station 105-*c* may transmit a downlink transmission 1105 according to base station transmit timing 1115. A UE 115 (e.g., UE 115-*b*) may be located closer to base station 105-*c* than relay node 105-*d*, and may receive downlink transmission 1105 at UE receive timing 930 after propagation delay 1135, before downlink transmission 1105 is received at relay node 105-*d*. After propagation delay 1140, relay node 105-*d* may receive downlink transmission 1105 at relay node receive timing 1125. Relay node 105-*d* may set its timing advance ($TA_{RN}$) based on the relay node receive timing 1125.

Base station 105-*c* may configure relay node 105-*d* to measure an uplink signal (e.g., PRACH transmission 1110). A UE 115 may transmit a PRACH transmission 1110 with an uplink timing advance value (e.g., using a PUSCH transmission timing). In some examples, base station 105 may configure a set of PRACH resources for normal uplink synchronization to the base station and another set of dedicated PRACH resources for monitoring by a relay node. A relay node 105 may monitoring the dedicated relay PRACH resources. The UE 115 may select the dedicated relay PRACH resources, and may send PRACH transmission 1110 according to the PUSCH timing advance value on the selected PRACH resources. Thus, one set of PRACH resources may be used for uplink synchronization transmitted without a timing advance, but the dedicated relay PRACH resources may be used to identify, by the relay node 105, whether the UE 115 can be relayed.

In some examples, the base station may explicitly indicate in a control message whether an uplink timing advance is to be applied for a PRACH transmission. For instance, base station 105 may provide a grant of PRACH resources, and in the grant may indicate that the UE 115 is to apply a timing advance to the PRACH transmission on the granted PRACH resources. In some examples, the control message may indicate that the timing advance value is to be applied via a 1-bit indicator included in a downlink control information (DCI) message for triggering contention free random access (CFRA) transmissions. The UE 115 may, based on the 1-bit indicator, apply the non-zero timing advance value to PRACH transmission 1110 and send PRACH transmission 1110 over the indicated PRACH resources.

The relay node 105-*d* may determine, based on the measured timing of PRACH 1110, the timing difference of the UE 115. In some cases, if the measured timing (e.g., $T_{est}$) for PRACH 1110 is less than a threshold (e.g., a cyclic prefix length), then relay node 105 may determine that the UE 115 can be relayed. Otherwise, if the measured timing (e.g., $T_{est}$) is greater than the threshold (e.g., the cyclic prefix length) then the relay node 105 may determine that the UE 115 cannot be relayed.

Figure 12:
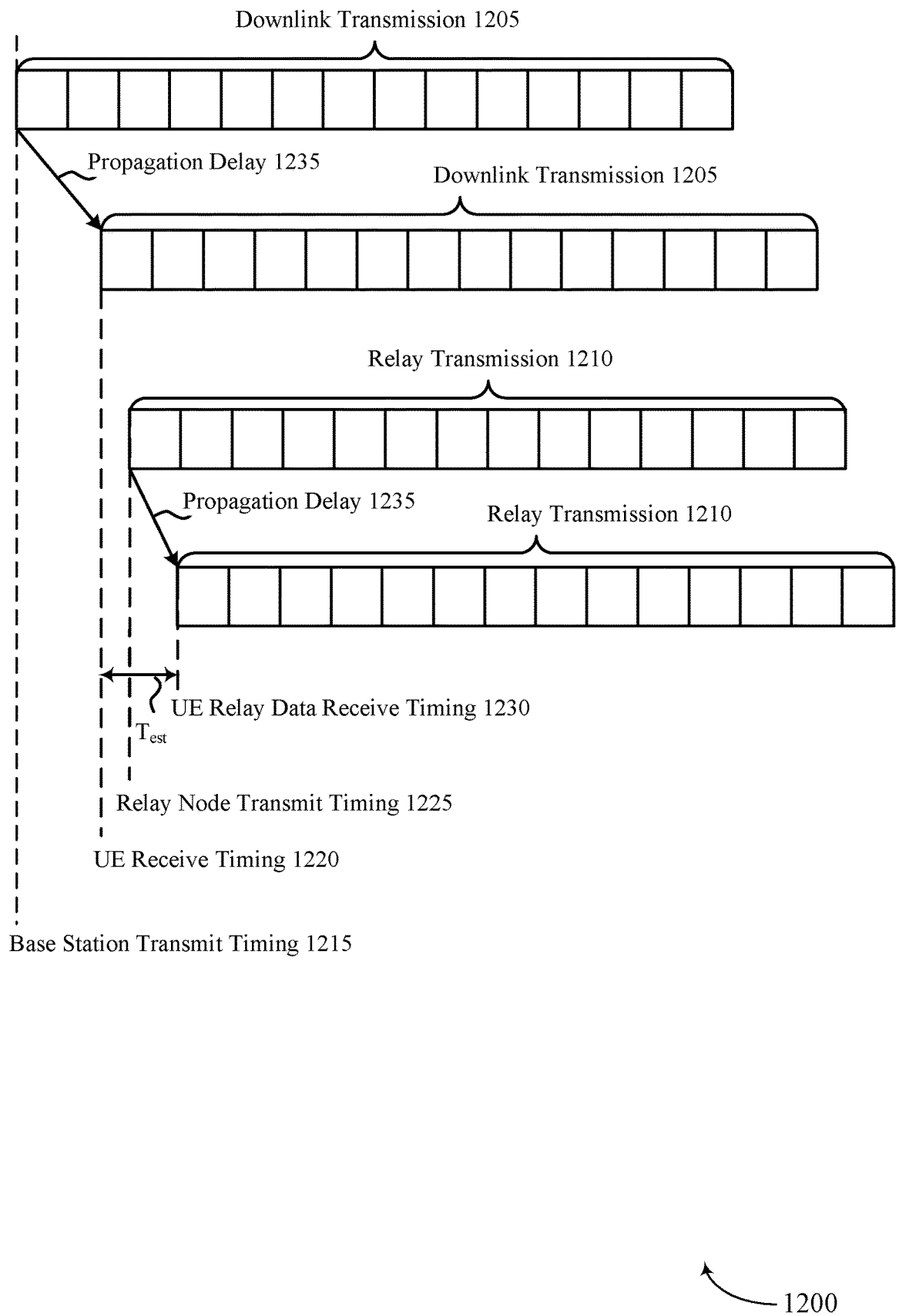
FIG. 12 illustrates an example of a timing scheme that supports a non-transparent inband relay node in a single frequency network in accordance with aspects of the present disclosure.

FIG. 12 illustrates an example of a timing scheme 1200 that supports a non-transparent inband relay node in a single frequency network in accordance with aspects of the present disclosure. In some examples, timing scheme 1200 may implement aspects of wireless communications systems 100 and 700.

In some examples, a base station 105 may send a downlink transmission 1205 according to base station transmit timing 1215. A relay node 105 may receive downlink transmission 1205 after propagation delay 1235, at UE receive timing 1220.

In some examples, the relay node 105 may transmit a relay transmission 1210 to a remote UE 115. The remote UE 115 may receive the relay transmission 1210 after propagation delay 1235. The relay node 105 may identify a measured timing (e.g., $T_{est}$) for the UE 115. The measured timing of the UE 115 may be the difference between the UE receive timing 1220 (which may be set equal to a relay node transmit timing) and the UE relay data receive timing 1230.

In some examples, the relay transmission 1210 may be a relay reference signal (e.g., a CSI-RS, or a synchronization signal). The UE 115 may receive the relay reference signal, and may perform one or more measurements on the relay reference signal. For instance, UE 115 may determine whether the measured timing is less than a timing threshold (e.g., a cyclic prefix length). The UE 115 may also determine whether the measured RSRP of the relay reference signal exceeds a power threshold. If the RSRP exceeds the power threshold and the timing less than the timing threshold, then UE 115 may determine that it can be relayed by the relay node 105. In such cases, the UE 115 may report to the base station 105 that it can be relayed by the relay node 105. In some examples, the UE 115 may indicate the index corresponding to the relay node 105, so that the base station 105 may initiate relay procedures via the identified relay node 105. Thus, based on downlink/uplink symmetry, if the downlink timing from the relay node 105 to the UE 115 is synchronized with an acceptable timing error (e.g., the measured timing is less than the threshold), then the uplink timing from the UE 115 to the relay node 105 can also be synchronized with an acceptable error.

Figure 13:
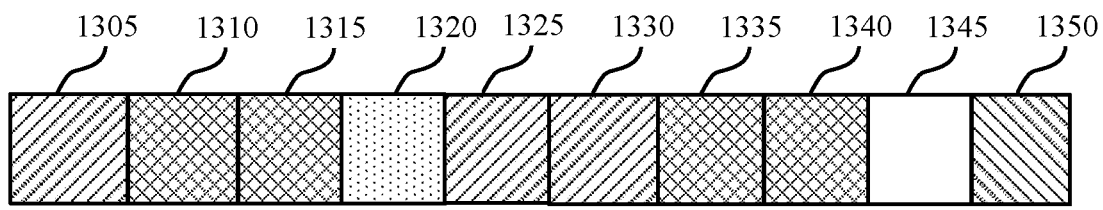
FIG. 13 illustrates an example of a subframe allocation that supports a non-transparent inband relay node in a single frequency network in accordance with aspects of the present disclosure.
Figure 13:
Figure 13:
Figure 13:
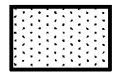
Figure 13:

FIG. 13 illustrates an example of a subframe allocation 1300 that supports a non-transparent inband relay node in a single frequency network in accordance with aspects of the present disclosure. In some examples, subframe allocation 1300 may implement aspects of wireless communications systems 100 and 700.

In some examples, as discussed above, a UE 115 may perform cross-subframe channel estimation. However, channel conditions may change quickly during relay procedures. That is, when relay transmissions are initiated or terminated during one subframe (e.g., a subframe when a channel estimation measurement is taken) and the channel conditions in subsequent subframes may be quite different than they were when the measurement was taken during the earlier subframe. Thus, cross-subframe channel estimation during relay communications may result in channel degradation. Techniques for addressing cross-subframe channel estimation during relay communications may be applied to relay communication procedures initiated via timing advanced PRACH transmissions (e.g., as described with respect to FIG. 11), relay reference signal transmissions (e.g., as described with respect to FIG. 12), or both.

To address the cross-subframe channel estimation issues, a UE 115 may identify different subsets of subframes, and perform cross-subframe channel estimation within the disparate sets of subframes. For example, the UE 115 may receive a configuration message (e.g., via higher layer signaling) from base station 105 indicating a set of subframes (e.g., subframe set 0 including subframe 1305, subframe 1325, subframe 1330, and subframe 1350) designated for downlink transmissions from the base station 105. The UE 115 may receive another configuration message from a relay node 105 indicating a set of subframes (e.g., subframe set 1 including subframe 1310, subframe 1315, subframe 1335, and subframe 1340) designated for downlink relay transmissions from the relay node 105. In some examples, the UE 115 may determine another set of subframes (e.g., subframe set 2 including subframe 1320) for receiving downlink transmissions from base station 105 and relay transmissions from the relay node 105. In some cases, UE 115 may determine subframe set 2 based on subframe set 0 and subframe set 1. For instance, a subframe that is included in subframe set 1 and subframe set 0 may be identified as a subframe for subframe set 2. That is, subframe 1320 may be included in subframe set 0 and in subframe set 1. Thus, UE 115 may identify subframe set 2 based on the overlap between subframe set 0 and subframe set 1. In some cases, UE 115 may receive an explicit or implicit indication of subframe set 2 from a base station 105 or a relay node 105. In some cases, some subframes (e.g., subframe 1345) may not be included in any subframe set (e.g., subframe set 3).

The UE 115 may monitor for downlink transmissions from the base station 105 during subframes of subframe set 0, may monitor for relay transmissions from the relay node 105 during subframe set 1, and may monitor for both downlink transmissions and relay transmissions during subframe set 2. UE 115 may perform cross-subframe channel estimation separately for each subframe set. UE 115 may make no channel coherence across subframe sets (e.g., between a subframe from subframe set 0 and subframe set 1). The UE 115 may also provide CSI reporting respectively for each subframe set, because both channel and interference characteristics may be different for different subframe sets. In some examples, as described below, the CSI report may also include beam management information (e.g., preferred transmit/receive beams). When a UE 115 receives signals during a subframe of subframe set 2, the UE 115 may receive a downlink transmission that is multiplexed (e.g., frequency division multiplexed (FDM)) with a relay transmission. Such multiplexed signals may support large channel bandwidths and may achieve frequency diversity gains.

In some examples, the UE 115 may receive one or more reference signals during different subframe sets. For instance, UE 115 may receive one or more reference signals from the base station during subframe set 0, subframe set 2, or both. The UE 115 may receive one or more reference signals from the relay node 105 during subframe set 1, subframe set 2, or both. The UE 115 may determine, based on the received reference signals, one or more transmit beams, receive beams, or both. In some examples, the UE 115 may include the determined transmit or receive beams or both in a CSI report. The CSI report may include both the cross-subframe channel estimation information described above with respect to each of the independent subframe sets and the beam management information, or the beam management information and channel estimation information may be included in separate CSI reports.

Similarly, a subframe pattern may be established for uplink transmissions. That is, a first set of uplink subframes may be configured for uplink transmissions from the UE 115 to the donor base station 105. A second set of uplink subframes may be configured for transmissions from the relay node 105 to the base station 105. A third set of subframes may be allocated for both uplink transmission from the UE 115 and uplink relay transmissions from the relay node 105 (e.g., the uplink transmission from the UE 115 may be multiplexed with the uplink relay transmission from the relay node 105 in a subframe of the third set of subframes).

Figure 14:
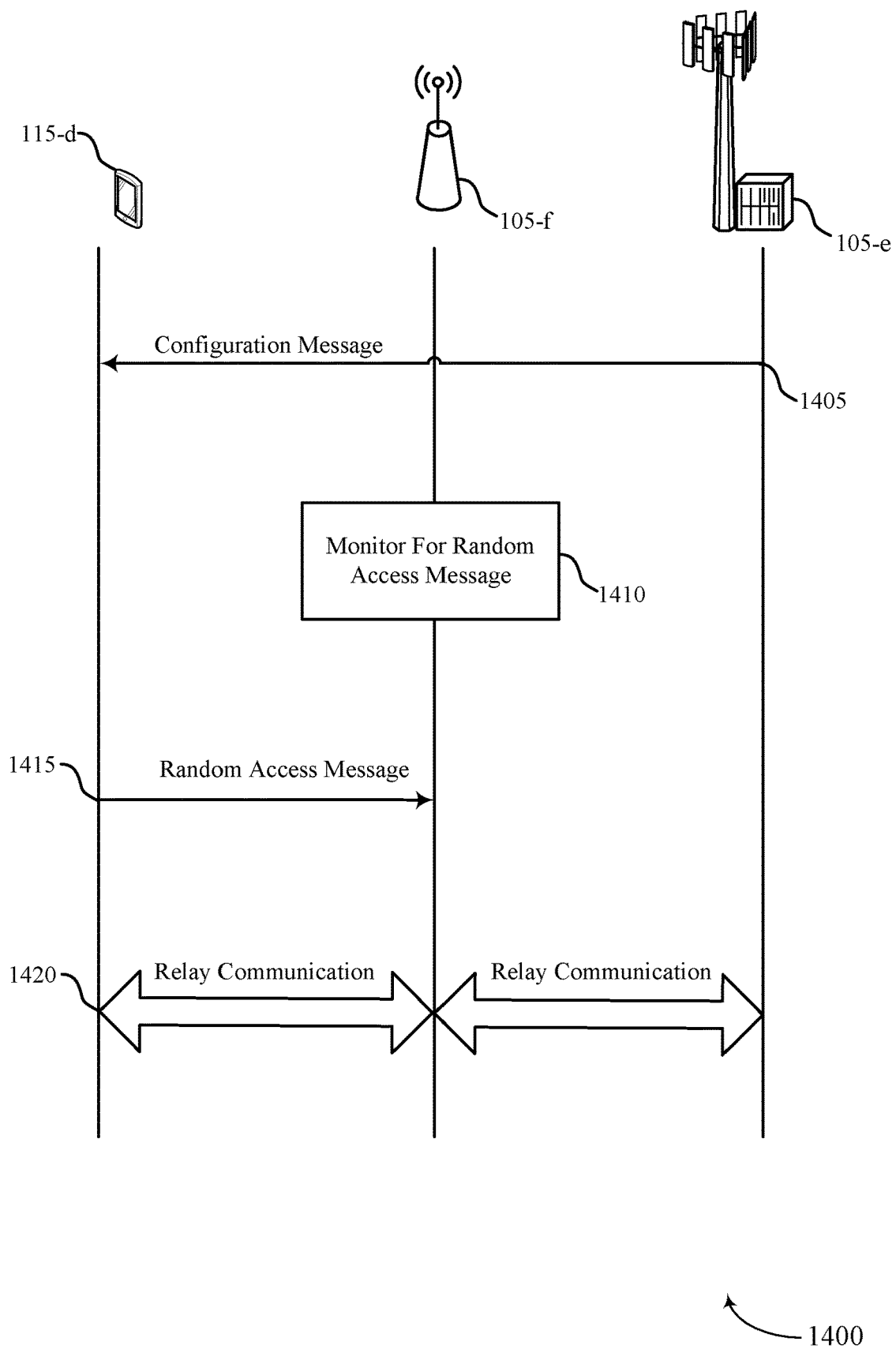
FIG. 14 illustrates an example of a process flow that supports a non-transparent inband relay node in a single frequency network in accordance with aspects of the present disclosure.

FIG. 14 illustrates an example of a process flow 1400 that supports a non-transparent inband relay node in a single frequency network in accordance with aspects of the present disclosure. In some examples, process flow 1400 may implement aspects of wireless communications systems 100, 200, and 700.

At 1405, base station 105-*e* may transmit a configuration message to UE 115-*d*. The configuration message may indicate a set of random access (e.g., PRACH) resources associated with monitoring by a relay node. In some examples, the configuration message may include an indication of a first set of random access resources associated with uplink synchronization and a second set of random access resources that are associated with monitoring by the relay node. In some examples, the configuration information may include a control message (e.g., a DCI message) indicating that the random access message is to be transmitted according to a timing advance value (e.g., according to a PUSCH timing). The control message (e.g., the DCI) may be for triggering contention free random access (CRFA) transmissions, and the DCI may include a one-bit indicator.

At 1410, relay node 105-f may monitor for a random access message from UE 115-d.

At 1415, UE 115-d may transmit a random access message to relay node 105-f UE 115-d may transmit the random access message using random access resources associated with monitoring by relay node 105-f The random access message may use a timing advance associated with uplink data transmissions (e.g., PUSCH timing) by UE 115-d.

In some examples, upon receiving the random access message, relay node 105-f may measure a timing of the random access message. Relay node 105-f may compare the measured timing of the random access message to a timing (e.g., an error) threshold (e.g., a cyclic prefix length), and may determine that the UE 115-d can be relayed based on the comparing.

At 1420, UE 115-d may perform relay communications, and may communicate with base station 105-e via relay node 105-f.

Figure 15:
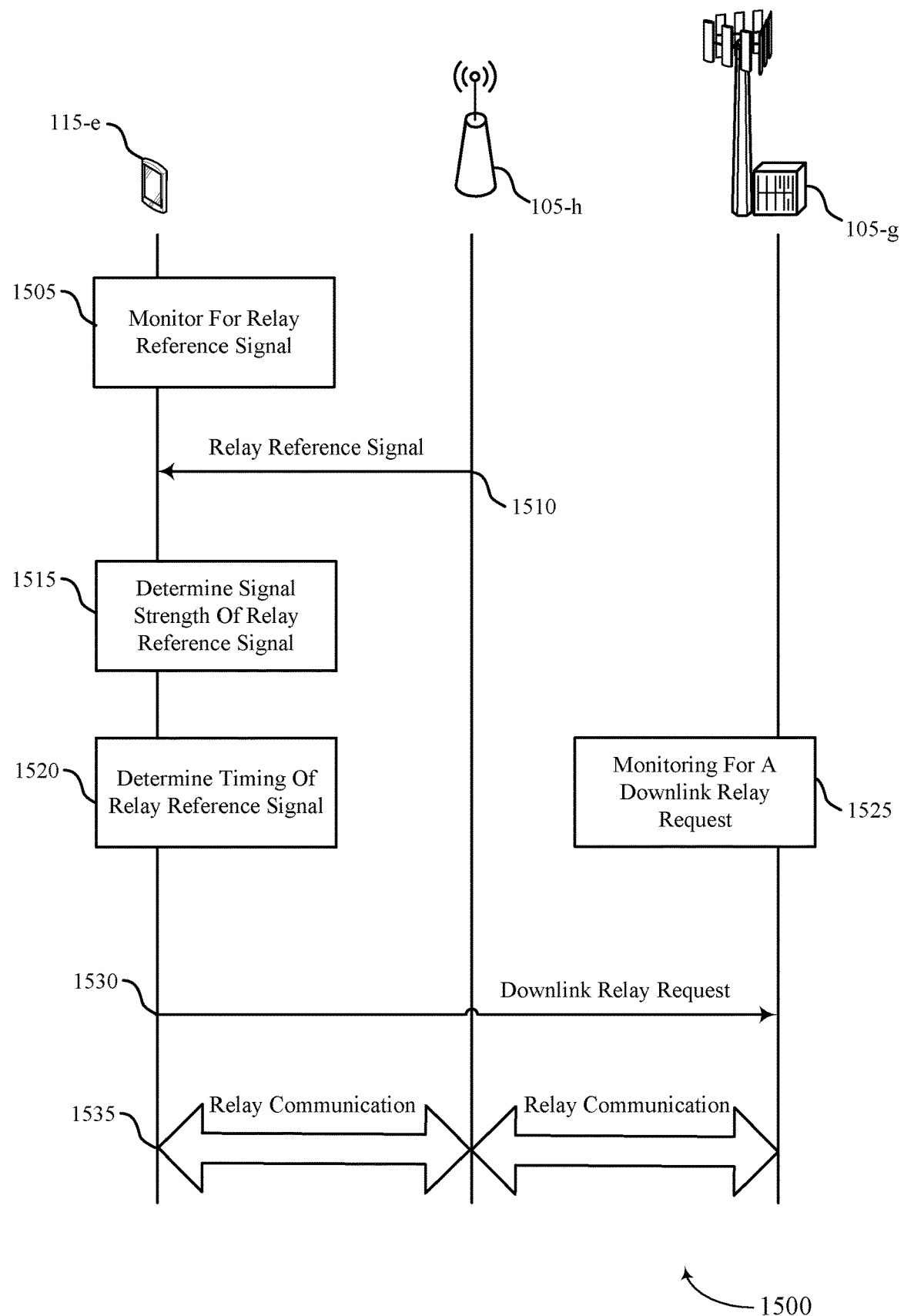
FIG. 15 illustrates an example of a process flow that supports a non-transparent inband relay node in a single frequency network in accordance with aspects of the present disclosure.

FIG. 15 illustrates an example of a process flow 1500 that supports a non-transparent inband relay node in a single frequency network in accordance with aspects of the present disclosure. In some examples, process flow 1500 may implement aspects of wireless communications systems 100, 200, and 700.

At 1505, UE 115-e may monitor for a relay reference signal from relay node 105-h.

At 1510, relay node 105-h may transmit a relay reference signal. The relay reference signal may be a CSI-RS or a synchronization signal not on the sync raster.

At 1515, UE 115-e may determine a signal strength of the relay reference signal. For instance, UE 115-e may perform one or more measurements on the CSI-RS. UE 115-e may determine whether the RSRP of the relay reference signal satisfies a power threshold.

At 1520, UE 115-e may determine a timing of the relay reference signal. UE 115-e may compare the timing of the relay reference signal to a threshold timing value (e.g., a cyclic prefix length), and may determine based on the comparing whether the timing relay reference satisfies the threshold.

At 1525, base station 105-g may monitor for a downlink relay request.

At 1530, UE 115-e may transmit a downlink relay request to base station 105-g. Base station 105-g may receive the downlink relay request based on the monitoring at 1525. Transmitting the downlink relay request may be based on determining that the timing of the relay reference signal satisfies the threshold at 1520 (e.g., is less than a cyclic prefix length) and determining that the RSRP of the relay reference signal satisfies a power threshold. The downlink relay request may indicate an index of relay node 105-h. Base station 105-g may determine, based on the relay communications, that UE 115-e can be relayed, and may initiate relay communications with the UE 115-e.

AT 1535, UE 115-e may perform relay communications, and may communicate with base station 105-g via relay node 105-h.

Figure 16:
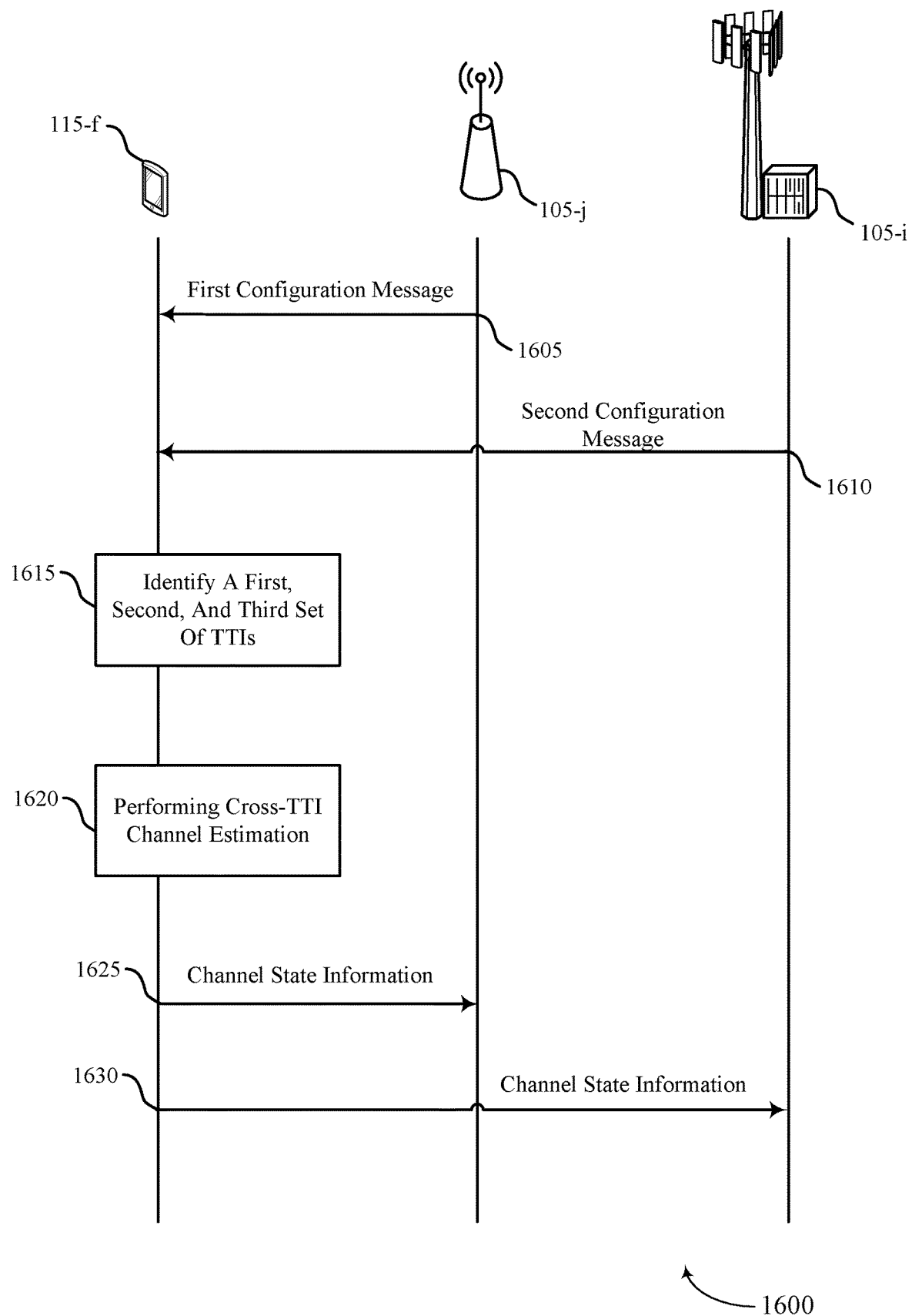
FIG. 16 illustrates an example of a process flow that supports a non-transparent inband relay node in a single frequency network in accordance with aspects of the present disclosure.

FIG. 16 illustrates an example of a process flow 1600 that supports a non-transparent inband relay node in a single frequency network in accordance with aspects of the present disclosure. In some examples, process flow 1600 may implement aspects of wireless communications systems 100, 200, and 700.

At 1605, relay node 105-j may transmit a first configuration message to UE 115-f The first configuration message may indicate a set of TTIs (e.g., a set of subframes) allocated for receiving downlink relay transmissions from relay node 105-j.

At 1610, base station 105-i may transmit a second configuration message to UE 115-f The second configuration message may indicate a second set of TTIs (e.g., subframes) allocated for receiving downlink transmissions from base station 105-i.

At 1615, UE 115-f may identify a first, second, and third set of TTIs (e.g., subframes, slots, mini-slots, or the like). UE 115-f may identify the first set of TTIs and the second set of TTIs based on the first and second configuration messages, respectfully. In some examples, UE 115-f may identify a third set of TTIs (e.g., subframes) based on the first and second sets of TTIs. For instance, any subframes included in both the first and second configuration messages may be included in the third set of subframes.

In some examples, UE 115-f may identify a first receive beam (e.g., a directional beam on which the first configuration message is transmitted) and a second receive beam (e.g., a directional beam on which the second configuration message is transmitted). In some examples, a beam report may be included in a channel state information report (e.g., at 1625 and 1630, respectively).

UE 115-f may monitor the first set of TTIs for downlink transmissions from relay node 105-j. UE 115-f may monitor the second set of TTIs for relay transmissions from relay node 105-i. UE 115-f may monitor the third set of TTIs for downlink transmissions from base station 105-j multiplexed (e.g., via FDM) with downlink relay transmissions from relay node 105-i.

At 1620, UE 115-f may perform cross-TTI channel estimation (e.g., cross-subframe channel estimation). UE 115-f may perform cross-TTI channel estimation for the first set of TTIs, the second set of TTIs, and the third set of TTIs. UE 115-f may refrain from performing any cross-TTI channel estimations across one or more of the sets of TTIs.

At 1625, UE 115-f may transmit first channel state information to relay node 105-j. First channel state information may apply to the first set of TTIs, the third set of TTIs, or both. In some examples, the first channel state information may also include a beam report indicating one or more preferred beams for subsequent downlink transmissions, uplink transmissions, or both.

At 1630, UE 115-f may transmit second channel state information to base station 105-i. The second channel state information may apply to the second set of TTIs, the third set of TTIs, or both. In some examples, the second channel state information may also include a beam report indicating one or more preferred beams for subsequent downlink transmissions, uplink transmissions, or both.

In some examples, UE 115-f may transmit uplink transmissions according to an uplink subframe allocation. For instance, a first set of uplink subframes may be allocated for uplink transmissions from UE 115-f; a second set of subframes may be allocated for uplink relay transmissions from relay node 105-*j*, and a third set of subframes may be allocated for uplink transmissions multiplexed with uplink relay transmissions. UE 115-*f* may send uplink transmissions during the first set of subframes, the third set of subframes (e.g., multiplexed with relay transmissions) or both. The relay node 105-*j* may send uplink relay transmissions during the second set of subframes, the third set of subframes (e.g., multiplexed with uplink transmissions from UE 115-*f*) or both.

Figure 17:
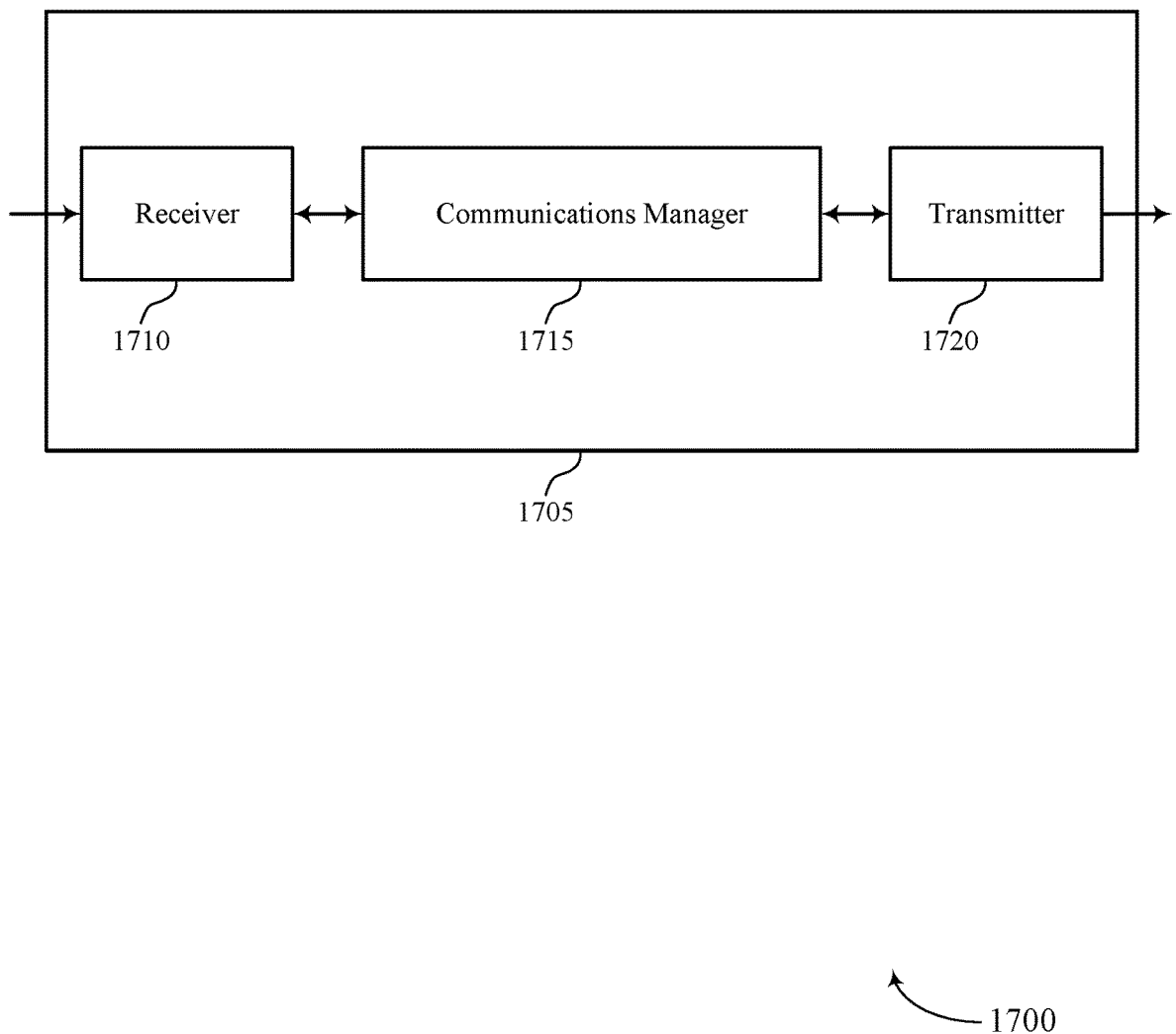
FIGS. 17 and 18 show block diagrams of devices that support a non-transparent inband relay node in a single frequency network in accordance with aspects of the present disclosure.

FIG. 17 shows a block diagram 1700 of a device 1705 that supports a non-transparent inband relay node in a single frequency network in accordance with aspects of the present disclosure. The device 1705 may be an example of aspects of a UE 115 as described herein. The device 1705 may include a receiver 1710, a communications manager 1715, and a transmitter 1720. The device 1705 may also include a processor. Each of these components may be in communication with one another (e.g., via one or more buses). In some examples, communications manager 1715 may be implemented by a modem. Communications manager 1715 may communicate with transmitter 1720 via a first interface. Communications manager 1715 may output signals for transmission via the first interface. Communications manager 1715 may interface with receiver 1710 via a second interface. Communications manager 1715 obtain signals via the second interface. In some examples, the modem may implement, via the first interface and the second interface, the techniques and methods described herein. Such techniques may result in power savings for a chipset, improved throughput, improved system efficiency, extended coverage, support of low power transmissions, and improved user experience.

The receiver 1710 may receive information such as packets, user data, or control information associated with various information channels (e.g., control channels, data channels, and information related to a non-transparent inband relay node in a single frequency network, etc.). Information may be passed on to other components of the device 1705. The receiver 1710 may be an example of aspects of the transceiver 2020 described with reference to FIG. 20. The receiver 1710 may utilize a single antenna or a set of antennas.

The communications manager 1715 may receive from a base station, a configuration message indicating a set of random access resources associated with monitoring by a relay node, transmit, based on the configuration, a random access message using the random access resources associated with monitoring by the relay node, where the random access message uses a timing advance associated with uplink data transmissions by the UE, and communicate with the base station via the relay node based on the random access message. The communications manager 1715 may also monitor a relay reference signal from a relay node, determine a signal strength of the relay reference signal and a timing of the relay reference signal based on the monitoring, and transmit, to a base station, a downlink relay request based on the determining. The communications manager 1715 may also receive a first configuration message indicating a first set of transmission time intervals (TTIs) allocated for receiving downlink relay transmissions from the relay node, receive a second configuration message indicating a second set of TTIs allocated for receiving downlink transmissions from the base station, identify, based on the first set of TTIs and the second set of TTIs, a third set of TTIs allocated for receiving downlink relay transmissions from the relay node, downlink transmissions from the base station, or both, and perform a cross-TTI channel estimation based on the identifying. The communications manager 1715 may be an example of aspects of the communications manager 2010 described herein.

The communications manager 1715, or its sub-components, may be implemented in hardware, software (e.g., executed by a processor), or any combination thereof. If implemented in code executed by a processor, the functions of the communications manager 1715, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1715, or its sub-components, may be physically located at various positions, including being distributed such that portions of functions are implemented at different physical locations by one or more physical components. In some examples, the communications manager 1715, or its sub-components, may be a separate and distinct component in accordance with various aspects of the present disclosure. In some examples, the communications manager 1715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1720 may transmit signals generated by other components of the device 1705. In some examples, the transmitter 1720 may be collocated with a receiver 1710 in a transceiver module. For example, the transmitter 1720 may be an example of aspects of the transceiver 2020 described with reference to FIG. 20. The transmitter 1720 may utilize a single antenna or a set of antennas.

Figure 18:
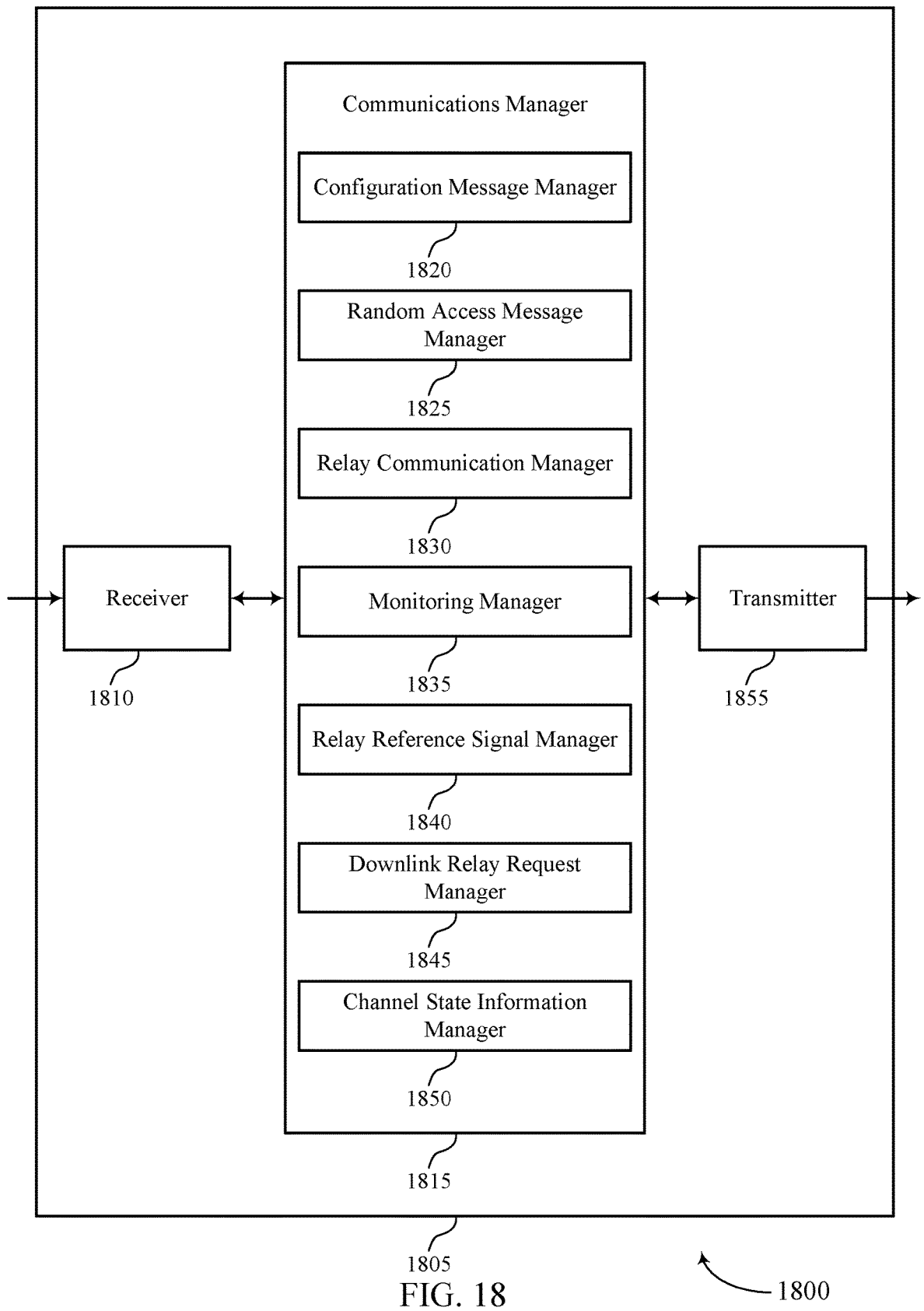

FIG. 18 shows a block diagram 1800 of a device 1805 that supports a non-transparent inband relay node in a single frequency network in accordance with aspects of the present disclosure. The device 1805 may be an example of aspects of a device 1705, or a UE 115 as described herein. The device 1805 may include a receiver 1810, a communications manager 1815, and a transmitter 1855. The device 1805 may also include a processor. Each of these components may be in communication with one another (e.g., via one or more buses).

The receiver 1810 may receive information such as packets, user data, or control information associated with various information channels (e.g., control channels, data channels, and information related to a non-transparent inband relay node in a single frequency network, etc.). Information may be passed on to other components of the device 1805. The receiver 1810 may be an example of aspects of the transceiver 2020 described with reference to FIG. 20. The receiver 1810 may utilize a single antenna or a set of antennas.

The communications manager 1815 may be an example of aspects of the communications manager 1715 as described herein. The communications manager 1815 may include a configuration message manager 1820, a random access message manager 1825, a relay communication manager 1830, a monitoring manager 1835, a relay reference signal manager 1840, a downlink relay request manager 1845, and a channel state information manager 1850. The communications manager 1815 may be an example of aspects of the communications manager 2010 described herein.

The configuration message manager 1820 may receive from a base station, a configuration message indicating a set of random access resources associated with monitoring by a relay node.

The random access message manager 1825 may transmit, based on the configuration, a random access message using the random access resources associated with monitoring by the relay node, where the random access message uses a timing advance associated with uplink data transmissions by the UE.

The relay communication manager 1830 may communicate with the base station via the relay node based on the random access message.

The monitoring manager 1835 may monitor a relay reference signal from a relay node.

The relay reference signal manager 1840 may determine a signal strength of the relay reference signal and a timing of the relay reference signal based on the monitoring.

The downlink relay request manager 1845 may transmit, to a base station, a downlink relay request based on the determining.

The configuration message manager 1820 may receive a first configuration message indicating a first set of transmission time intervals (TTIs) allocated for receiving downlink relay transmissions from the relay node and receive a second configuration message indicating a second set of TTIs allocated for receiving downlink transmissions from the base station.

The relay communication manager 1830 may identify, based on the first set of TTIs and the second set of TTIs, a third set of TTIs allocated for receiving downlink relay transmissions from the relay node, downlink transmissions from the base station, or both.

The channel state information manager 1850 may perform a cross-TTI channel estimation based on the identifying.

The transmitter 1855 may transmit signals generated by other components of the device 1805. In some examples, the transmitter 1855 may be collocated with a receiver 1810 in a transceiver module. For example, the transmitter 1855 may be an example of aspects of the transceiver 2020 described with reference to FIG. 20. The transmitter 1855 may utilize a single antenna or a set of antennas.

Figure 19:
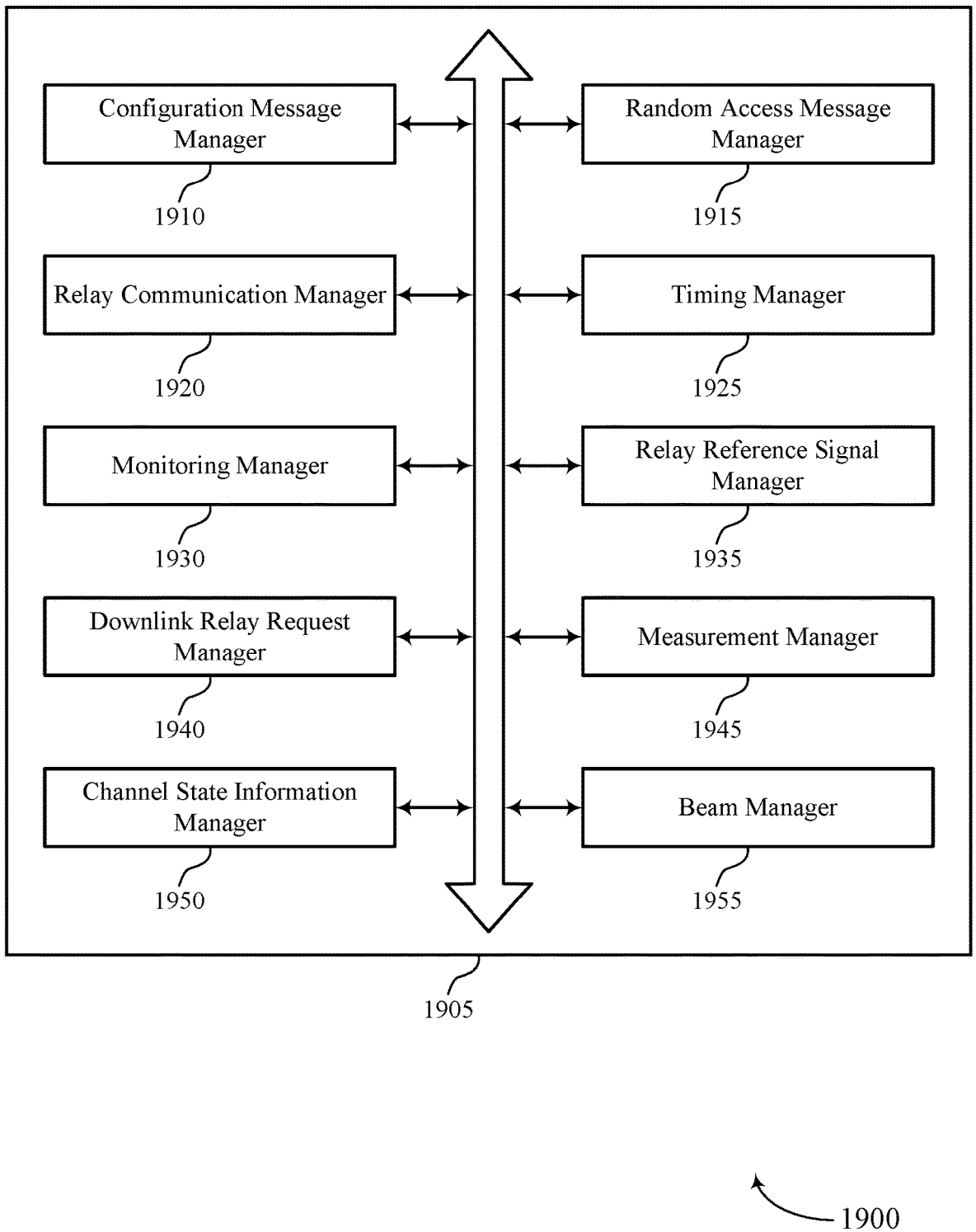
FIG. 19 shows a block diagram of a communications manager that supports a non-transparent inband relay node in a single frequency network in accordance with aspects of the present disclosure.

FIG. 19 shows a block diagram 1900 of a communications manager 1905 that supports a non-transparent inband relay node in a single frequency network in accordance with aspects of the present disclosure. The communications manager 1905 may be an example of aspects of a communications manager 1715, a communications manager 1815, or a communications manager 2010 described herein. The communications manager 1905 may include a configuration message manager 1910, a random access message manager 1915, a relay communication manager 1920, a timing manager 1925, a monitoring manager 1930, a relay reference signal manager 1935, a downlink relay request manager 1940, a measurement manager 1945, a channel state information manager 1950, and a beam manager 1955. Each of these modules may communicate, directly or indirectly, with one another (e.g., via one or more buses). In some examples, communications manager 1915 may be implemented by a modem. Communications manager 1915 may communicate with transmitter 1920 via a first interface. Communications manager 1915 may output signals for transmission via the first interface. Communications manager 1915 may interface with receiver 1910 via a second interface. Communications manager 1115 may obtain signals (e.g., transmitted from a UE 115) via the second interface. In some examples, the modem may implement, via the first interface and the second interface, the techniques and methods described herein. Such techniques may result in power savings for a chipset, improved throughput, improved system efficiency, extended coverage, support of low power transmissions, and improved user experience.

The configuration message manager 1910 may receive from a base station, a configuration message indicating a set of random access resources associated with monitoring by a relay node. In some examples, the configuration message manager 1910 may receive a first configuration message indicating a first set of transmission time intervals (TTIs) allocated for receiving downlink relay transmissions from the relay node. In some examples, the configuration message manager 1910 may receive a second configuration message indicating a second set of TTIs allocated for receiving downlink transmissions from the base station. In some examples, the configuration message manager 1910 may receive, from a relay node, a third configuration message indicating a fourth set of TTIs allocated for transmitting uplink transmissions to the base station. In some cases, the configuration message includes an indication of a first set of random access resources associated with uplink synchronization and a second set of random access resources including the set of random access resources associated with the monitoring by the relay node. In some cases, the configuration message includes a control message indicating that the random access message is to be transmitted according to a timing advance value. In some cases, the control message includes downlink control information for triggering CFRA transmission, the downlink control information including a one-bit indicator.

The random access message manager 1915 may transmit, based on the configuration, a random access message using the random access resources associated with monitoring by the relay node, where the random access message uses a timing advance associated with uplink data transmissions by the UE.

The relay communication manager 1920 may communicate with the base station via the relay node based on the random access message. In some examples, the relay communication manager 1920 may identify, based on the first set of TTIs and the second set of TTIs, a third set of TTIs allocated for receiving downlink relay transmissions from the relay node, downlink transmissions from the base station, or both. In some examples, the relay communication manager 1920 may determine, based on the comparing, whether the timing of the relay reference signal satisfies the threshold timing value, where transmitting the downlink relay request is based on determining that the timing of the relay reference signal satisfies the threshold timing value.

In some examples, the relay communication manager 1920 may receive, based on the monitoring, downlink relay transmissions from the relay node during the first set of TTIs, the third set of TTIs, or both, or downlink transmissions from the base station during the second set of TTIs, the third set of TTIs, or both, or a combination thereof. In some examples, the relay communication manager 1920 may receive, during the third set of TTIs, a downlink transmission from the base station and a downlink relay transmission from the relay node, where the downlink transmission and the downlink relay transmission are frequency division multiplexed.

In some examples, the relay communication manager 1920 may transmit one or more uplink transmissions during the fourth set of TTIs. In some examples, the relay communication manager 1920 may frequency division multiplexing an uplink transmission from the UE with a relay uplink transmission from the relay node during one or more TTIs of the fourth set of TTIs, where the one or more TTIs of the fourth set of TTIs are also allocated for relay transmissions from the relay node to the base station.

The monitoring manager 1930 may monitor a relay reference signal from a relay node. In some examples, the monitoring manager 1930 may monitor one or more of the first set of TTIs, the second set of TTIs, and the third set of TTIs, based on the identifying.

The relay reference signal manager 1935 may determine a signal strength of the relay reference signal and a timing of the relay reference signal based on the monitoring. In some examples, the relay reference signal manager 1935 may receive, based on the monitoring, the relay reference signal from the relay node. In some cases, the relay reference signal is a channel state information reference signal (CSI-RS). In some cases, the relay reference signal is a synchronization signal block (SSB) not on the sync raster.

The downlink relay request manager 1940 may transmit, to a base station, a downlink relay request based on the determining. In some cases, the downlink relay request includes an indication of the relay node.

The channel state information manager 1950 may perform a cross-TTI channel estimation based on the identifying. In some examples, the channel state information manager 1950 may perform a first cross-TTI channel estimation for the first set of TTIs, a second cross-TTI channel estimation for the second TTIs, a third cross-TTI channel estimation for the third set of TTIs, or a combination thereof.

In some examples, the channel state information manager 1950 may report, to the relay node, first channel state information corresponding to the first set of TTIs, the third set of TTIs, or both. In some examples, the channel state information manager 1950 may report, to the base station, second channel state information corresponding to the second set of TTIs, the third set of TTIs, or both.

The timing manager 1925 may determine an uplink timing advance value based on a transmission timing of a PUSCH. In some examples, the timing manager 1925 may apply the uplink timing advance value to the random access message, where transmitting the random access message is according to the uplink timing advance value. In some examples, the timing manager 1925 may compare the timing of the relay reference signal to a threshold timing value. In some cases, the threshold timing value is based on a cyclic prefix duration.

The measurement manager 1945 may perform one or more measurements on the relay reference signal. In some examples, the measurement manager 1945 may determine, based on the one or more measurements, whether a reference signal receive power (RSRP) of the relay reference signal satisfies a power threshold, where transmitting the downlink relay request is based on determining that the RSRP of the reference signal satisfies the power threshold.

The beam manager 1955 may identify a first receive beam, where receiving the first configuration message includes receiving the first configuration message via the first receive beam. In some examples, identifying a second receive beam, where receiving the second configuration message includes receiving the second configuration message via the second receive beam. In some examples, the beam manager 1955 may incorporate the beam report in the first channel state information, the second channel state information, or both.

Figure 20:
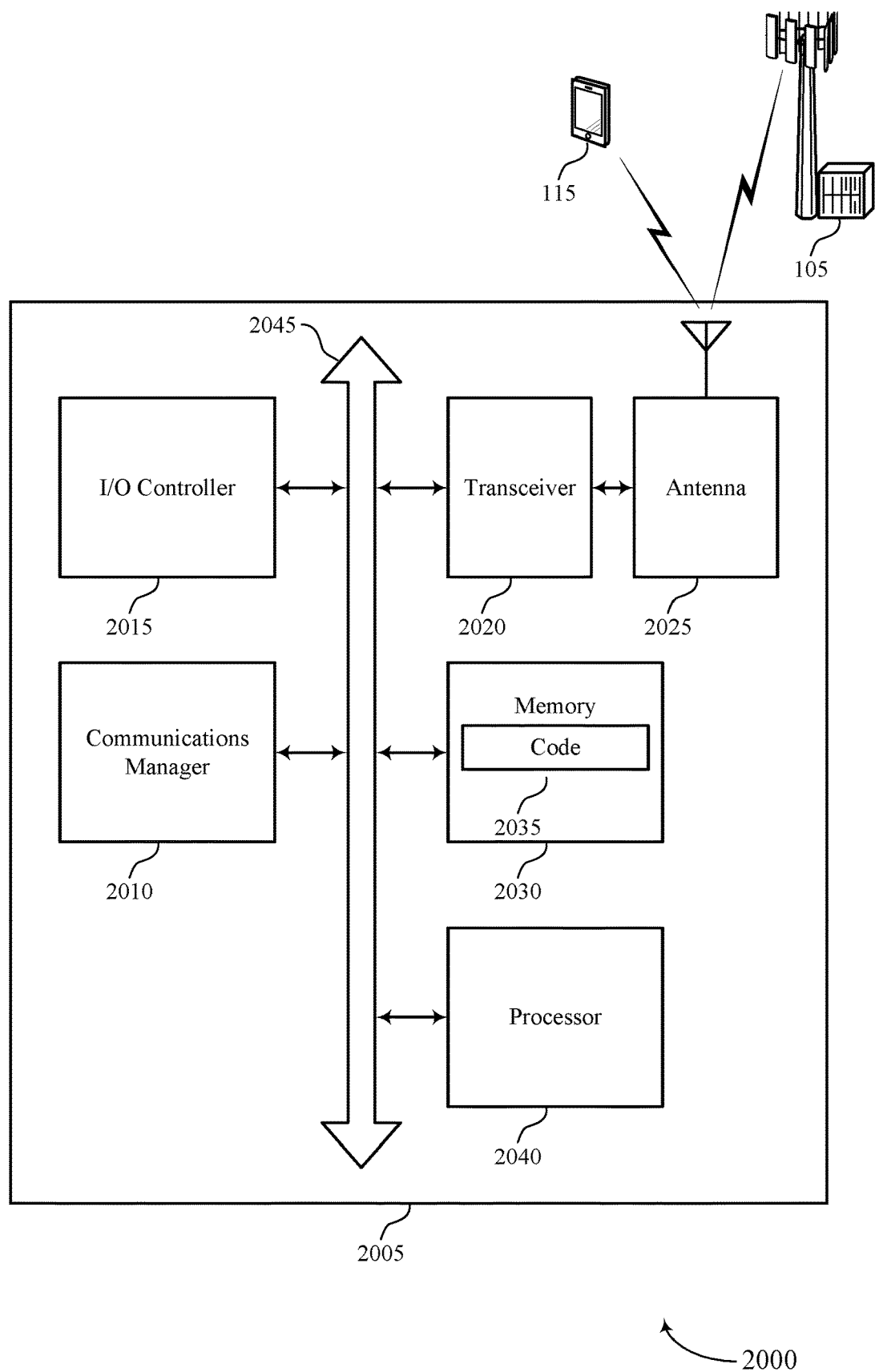
FIG. 20 shows a diagram of a system including a device that supports a non-transparent inband relay node in a single frequency network in accordance with aspects of the present disclosure.

FIG. 20 shows a diagram of a system 2000 including a device 2005 that supports a non-transparent inband relay node in a single frequency network in accordance with aspects of the present disclosure. The device 2005 may be an example of or include the components of device 1705, device 1805, or a UE 115 as described herein. The device 2005 may include components for bi-directional voice and data communications including components for transmitting and receiving communications, including a communications manager 2010, an I/O controller 2015, a transceiver 2020, an antenna 2025, memory 2030, and a processor 2040. These components may be in electronic communication via one or more buses (e.g., bus 2045).

The communications manager 2010 may receive from a base station, a configuration message indicating a set of random access resources associated with monitoring by a relay node, transmit, based on the configuration, a random access message using the random access resources associated with monitoring by the relay node, where the random access message uses a timing advance associated with uplink data transmissions by the UE, and communicate with the base station via the relay node based on the random access message. The communications manager 2010 may also monitor a relay reference signal from a relay node, determine a signal strength of the relay reference signal and a timing of the relay reference signal based on the monitoring, and transmit, to a base station, a downlink relay request based on the determining. The communications manager 2010 may also receive a first configuration message indicating a first set of transmission time intervals (TTIs) allocated for receiving downlink relay transmissions from the relay node, receive a second configuration message indicating a second set of TTIs allocated for receiving downlink transmissions from the base station, identify, based on the first set of TTIs and the second set of TTIs, a third set of TTIs allocated for receiving downlink relay transmissions from the relay node, downlink transmissions from the base station, or both, and perform a cross-TTI channel estimation based on the identifying.

The I/O controller 2015 may manage input and output signals for the device 2005. The I/O controller 2015 may also manage peripherals not integrated into the device 2005. In some cases, the I/O controller 2015 may represent a physical connection or port to an external peripheral. In some cases, the I/O controller 2015 may utilize an operating system such as iOS®, ANDROID®, MS-DOS®, MS-WINDOWS®, OS/2®), UNIX®, LINUX®, or another known operating system. In other cases, the I/O controller 2015 may represent or interact with a modem, a keyboard, a mouse, a touchscreen, or a similar device. In some cases, the I/O controller 2015 may be implemented as part of a processor. In some cases, a user may interact with the device 2005 via the I/O controller 2015 or via hardware components controlled by the I/O controller 2015.

The transceiver 2020 may communicate bi-directionally, via one or more antennas, wired, or wireless links as described above. For example, the transceiver 2020 may represent a wireless transceiver and may communicate bi-directionally with another wireless transceiver. The transceiver 2020 may also include a modem to modulate the packets and provide the modulated packets to the antennas for transmission, and to demodulate packets received from the antennas.

In some cases, the wireless device may include a single antenna 2025. However, in some cases the device may have more than one antenna 2025, which may be capable of concurrently transmitting or receiving multiple wireless transmissions.

The memory 2030 may include RAM and ROM. The memory 2030 may store computer-readable, computer-executable code 2035 including instructions that, when executed, cause the processor to perform various functions described herein. In some cases, the memory 2030 may contain, among other things, a BIOS which may control basic hardware or software operation such as the interaction with peripheral components or devices.

The processor 2040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 2040 may be configured to operate a memory array using a memory controller. In other cases, a memory controller may be integrated into the processor 2040. The processor 2040 may be configured to execute computer-readable instructions stored in a memory (e.g., the memory 2030) to cause the device 2005 to perform various functions (e.g., functions or tasks supporting a non-transparent inband relay node in a single frequency network).

The code 2035 may include instructions to implement aspects of the present disclosure, including instructions to support wireless communications. The code 2035 may be stored in a non-transitory computer-readable medium such as system memory or other type of memory. In some cases, the code 2035 may not be directly executable by the processor 2040 but may cause a computer (e.g., when compiled and executed) to perform functions described herein.

Figure 21:
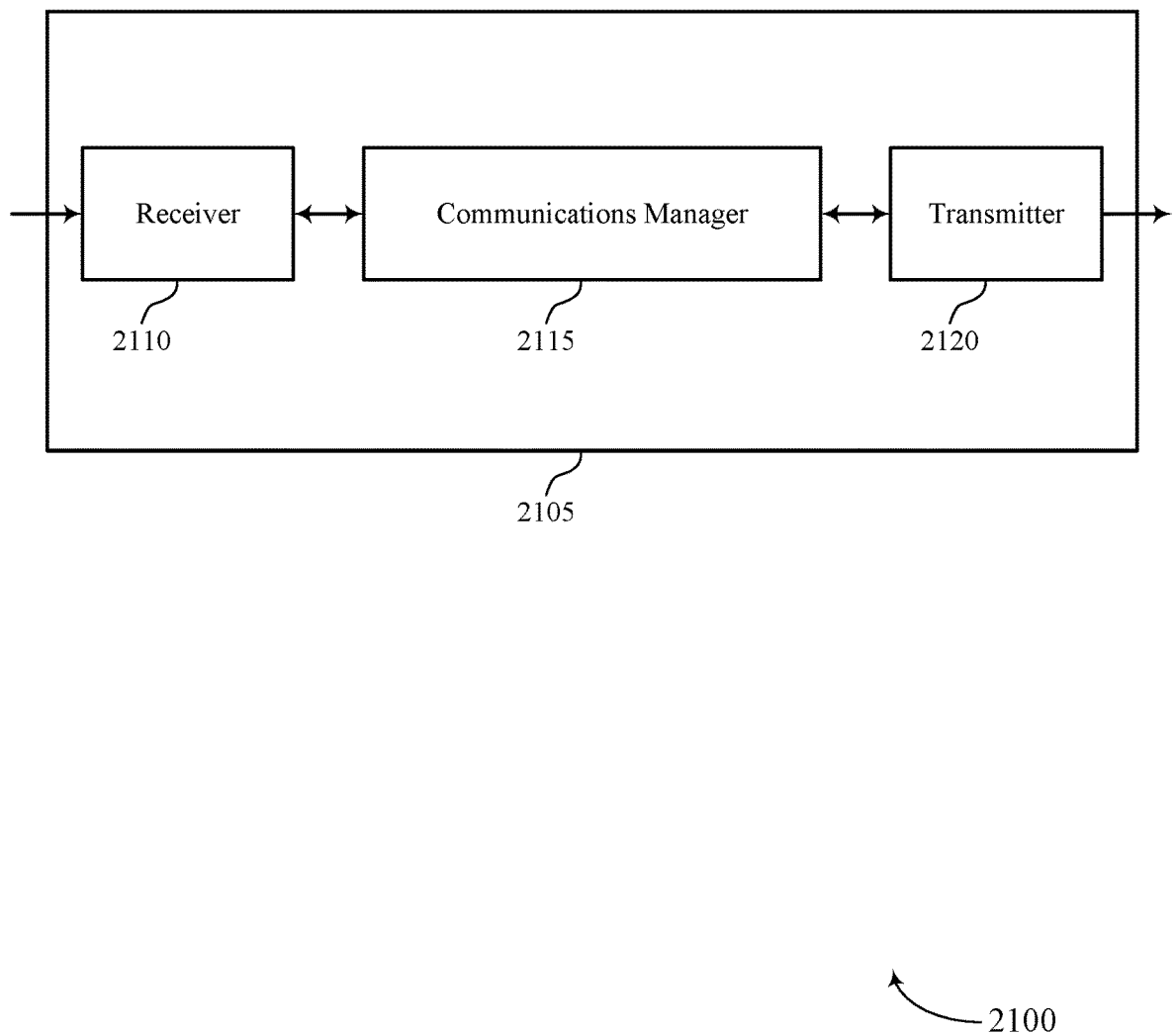
FIGS. 21 and 22 show block diagrams of devices that support a non-transparent inband relay node in a single frequency network in accordance with aspects of the present disclosure.

FIG. 21 shows a block diagram 2100 of a device 2105 that supports a non-transparent inband relay node in a single frequency network in accordance with aspects of the present disclosure. The device 2105 may be an example of aspects of a base station 105 as described herein. The device 2105 may include a receiver 2110, a communications manager 2115, and a transmitter 2120. The device 2105 may also include a processor. Each of these components may be in communication with one another (e.g., via one or more buses).

The receiver 2110 may receive information such as packets, user data, or control information associated with various information channels (e.g., control channels, data channels, and information related to a non-transparent inband relay node in a single frequency network, etc.). Information may be passed on to other components of the device 2105. The receiver 2110 may be an example of aspects of the transceiver 2420 described with reference to FIG. 24. The receiver 2110 may utilize a single antenna or a set of antennas.

The communications manager 2115 may transmit, to a UE, a configuration message indicating a set of random access resources associated with monitoring by a relay node, monitor for an uplink relay request from a relay node, receive, based on the monitoring, the uplink relay request includes an indication of a UE, and communicate with the UE via the relay node based on the uplink relay request. The communications manager 2115 may also monitor a set of one or more random access resources for a random access message from a UE, receive, based on the monitoring, a random access message over the set of random access resources, where the random access message uses a timing advance associated with uplink data transmissions by the UE, and perform relay operations to facilitate communication between the UE and the base station based on receiving the random access message. The communications manager 2115 may also monitor for a downlink relay request from a UE, receive, based on the monitoring, the downlink relay request includes an indication of a relay node, communicate, based on the downlink relay request, with the UE via the relay node, transmit, to a UE a relay reference signal, monitor for downlink signaling from a base station initiating relay communications with the UE based on the relay reference signal, and perform relay operations to facilitate communication between the UE and the base station based on the downlink signaling. The communications manager 2115 may also perform relay communications with a UE, via a relay node and transmit, to the UE, a first configuration message indicating a first set of transmission time intervals (TTIs) allocated for downlink transmissions from the base station to the UE, where a second set of TTIs is allocated for downlink relay transmissions from the relay node to the UE, and where a third set of TTIs is allocated for downlink transmissions from the base station to the UE, from the relay node to the UE, or both. The communications manager 2115 may also perform relay operations to facilitate communication between a UE and a base station and transmit, to the UE, a first configuration message indicating a first set of transmission time intervals (TTIs) allocated for downlink relay transmissions from the relay node to the UE, where a second set of TTIs is allocated for downlink transmissions from the base station to the UE, and where a third set of TTIs including a subset of the first set of TTIs is allocated for downlink transmissions from the base station to the UE, downlink relay transmissions from the relay node to the UE, or both. The communications manager 2115 may be an example of aspects of the communications manager 2410 described herein.

The communications manager 2115, or its sub-components, may be implemented in hardware, code (e.g., software or firmware) executed by a processor, or any combination thereof. If implemented in code executed by a processor, the functions of the communications manager 2115, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 2115, or its sub-components, may be physically located at various positions, including being distributed such that portions of functions are implemented at different physical locations by one or more physical components. In some examples, the communications manager 2115, or its sub-components, may be a separate and distinct component in accordance with various aspects of the present disclosure. In some examples, the communications manager 2115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 2120 may transmit signals generated by other components of the device 2105. In some examples, the transmitter 2120 may be collocated with a receiver 2110 in a transceiver module. For example, the transmitter 2120 may be an example of aspects of the transceiver 2420 described with reference to FIG. 24. The transmitter 2120 may utilize a single antenna or a set of antennas.

Figure 22:
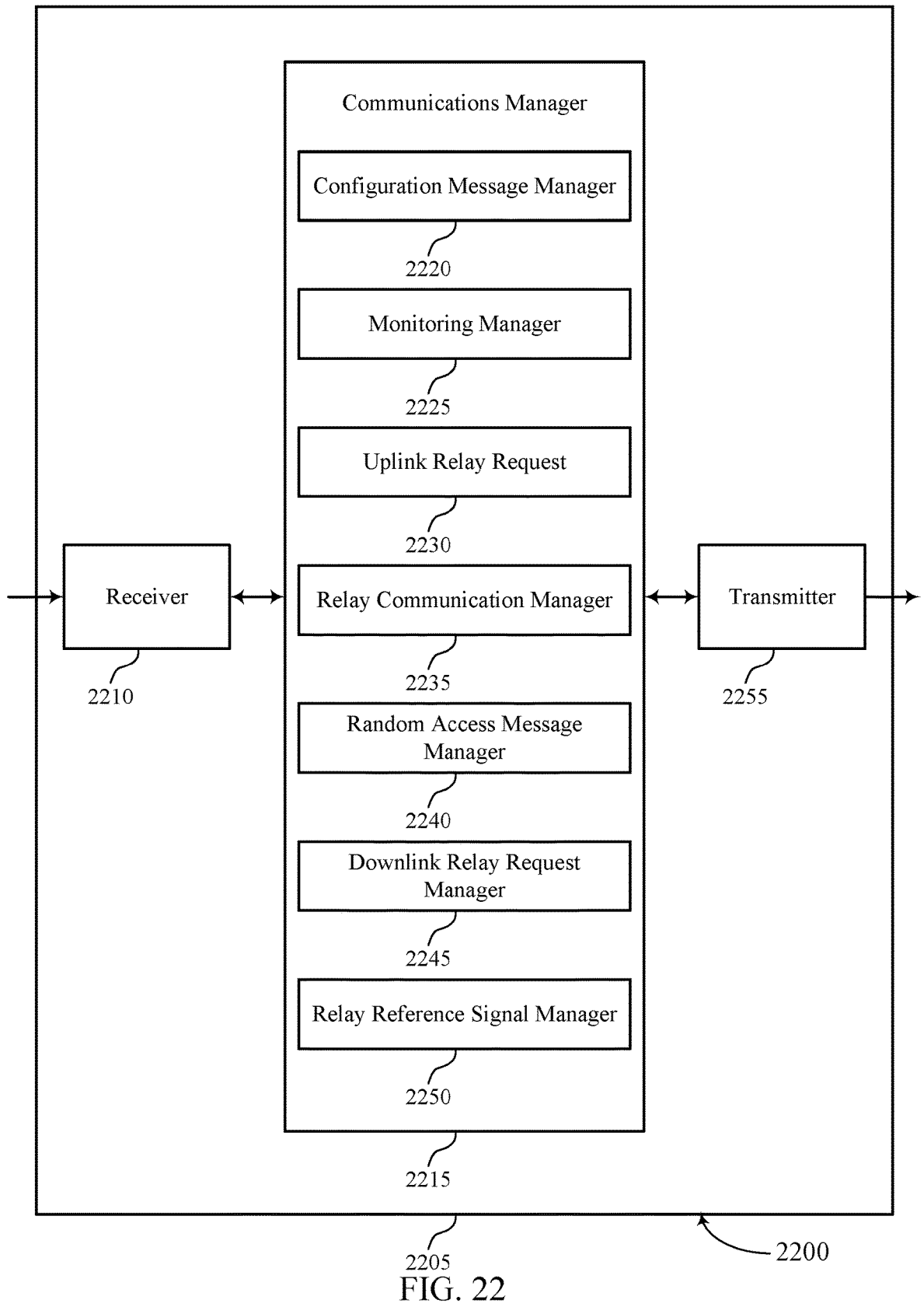

FIG. 22 shows a block diagram 2200 of a device 2205 that supports a non-transparent inband relay node in a single frequency network in accordance with aspects of the present disclosure. The device 2205 may be an example of aspects of a device 2105, or a base station 105 as described herein.

The device 2205 may include a receiver 2210, a communications manager 2215, and a transmitter 2255. The device 2205 may also include a processor. Each of these components may be in communication with one another (e.g., via one or more buses). Each of these components may be in communication with one another (e.g., via one or more buses). In some examples, communications manager 2215 may be implemented by a modem. Communications manager 2215 may communicate with transmitter 2220 via a first interface. Communications manager 2215 may output signals for transmission via the first interface. Communications manager 2215 may interface with receiver 2210 via a second interface. Communications manager 2215 may obtain signals (e.g., transmitted from a UE 115) via the second interface. In some examples, the modem may implement, via the first interface and the second interface, the techniques and methods described herein. Such techniques may result in power savings for a chipset, improved throughput, improved system efficiency, extended coverage, support of low power transmissions, and improved user experience.

The receiver 2210 may receive information such as packets, user data, or control information associated with various information channels (e.g., control channels, data channels, and information related to a non-transparent inband relay node in a single frequency network, etc.). Information may be passed on to other components of the device 2205. The receiver 2210 may be an example of aspects of the transceiver 2420 described with reference to FIG. 24. The receiver 2210 may utilize a single antenna or a set of antennas.

The communications manager 2215 may be an example of aspects of the communications manager 2115 as described herein. The communications manager 2215 may include a configuration message manager 2220, a monitoring manager 2225, an uplink relay request 2230, a relay communication manager 2235, a random access message manager 2240, a downlink relay request manager 2245, and a relay reference signal manager 2250. The communications manager 2215 may be an example of aspects of the communications manager 2410 described herein.

The configuration message manager 2220 may transmit, to a UE, a configuration message indicating a set of random access resources associated with monitoring by a relay node.

The monitoring manager 2225 may monitor for an uplink relay request from a relay node.

The uplink relay request 2230 may receive, based on the monitoring, the uplink relay request includes an indication of a UE.

The relay communication manager 2235 may communicate with the UE via the relay node based on the uplink relay request.

The monitoring manager 2225 may monitor a set of one or more random access resources for a random access message from a UE.

The random access message manager 2240 may receive, based on the monitoring, a random access message over the set of random access resources, where the random access message uses a timing advance associated with uplink data transmissions by the UE.

The relay communication manager 2235 may perform relay operations to facilitate communication between the UE and the base station based on receiving the random access message.

The downlink relay request manager 2245 may monitor for a downlink relay request from a UE and receive, based on the monitoring, the downlink relay request includes an indication of a relay node.

The relay communication manager 2235 may communicate, based on the downlink relay request, with the UE via the relay node.

The relay reference signal manager 2250 may transmit, to a UE a relay reference signal.

The relay communication manager 2235 may monitor for downlink signaling from a base station initiating relay communications with the UE based on the relay reference signal and perform relay operations to facilitate communication between the UE and the base station based on the downlink signaling.

The relay communication manager 2235 may perform relay communications with a UE, via a relay node.

The configuration message manager 2220 may transmit, to the UE, a first configuration message indicating a first set of transmission time intervals (TTIs) allocated for downlink transmissions from the base station to the UE, where a second set of TTIs is allocated for downlink relay transmissions from the relay node to the UE, and where a third set of TTIs is allocated for downlink transmissions from the base station to the UE, from the relay node to the UE, or both.

The relay communication manager 2235 may perform relay operations to facilitate communication between a UE and a base station.

The configuration message manager 2220 may transmit, to the UE, a first configuration message indicating a first set of transmission time intervals (TTIs) allocated for downlink relay transmissions from the relay node to the UE, where a second set of TTIs is allocated for downlink transmissions from the base station to the UE, and where a third set of TTIs including a subset of the first set of TTIs is allocated for downlink transmissions from the base station to the UE, downlink relay transmissions from the relay node to the UE, or both.

The transmitter 2255 may transmit signals generated by other components of the device 2205. In some examples, the transmitter 2255 may be collocated with a receiver 2210 in a transceiver module. For example, the transmitter 2255 may be an example of aspects of the transceiver 2420 described with reference to FIG. 24. The transmitter 2255 may utilize a single antenna or a set of antennas.

Figure 23:
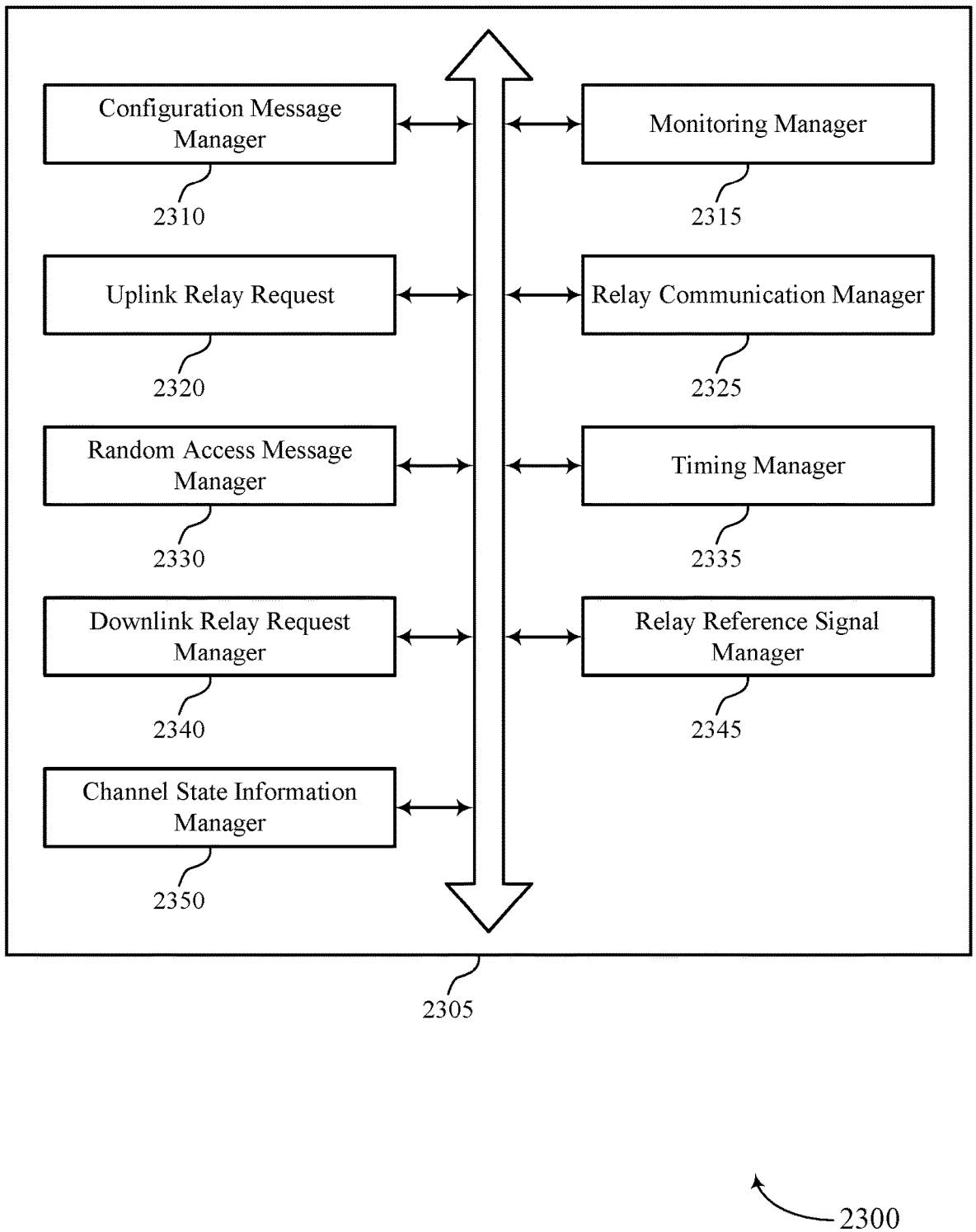
FIG. 23 shows a block diagram of a communications manager that supports a non-transparent inband relay node in a single frequency network in accordance with aspects of the present disclosure.

FIG. 23 shows a block diagram 2300 of a communications manager 2305 that supports a non-transparent inband relay node in a single frequency network in accordance with aspects of the present disclosure. The communications manager 2305 may be an example of aspects of a communications manager 2115, a communications manager 2215, or a communications manager 2410 described herein. The communications manager 2305 may include a configuration message manager 2310, a monitoring manager 2315, an uplink relay request 2320, a relay communication manager 2325, a random access message manager 2330, a timing manager 2335, a downlink relay request manager 2340, a relay reference signal manager 2345, and a channel state information manager 2350. Each of these modules may communicate, directly or indirectly, with one another (e.g., via one or more buses).

The configuration message manager 2310 may transmit, to a UE, a configuration message indicating a set of random access resources associated with monitoring by a relay node. In some examples, the configuration message manager 2310 may transmit, to the UE, a first configuration message indicating a first set of transmission time intervals (TTIs) allocated for downlink transmissions from the base station to the UE, where a second set of TTIs is allocated for downlink relay transmissions from the relay node to the UE, and where a third set of TTIs is allocated for downlink transmissions from the base station to the UE, from the relay node to the UE, or both. In some examples, the configuration message manager 2310 may transmit, to the UE, a first configuration message indicating a first set of transmission time intervals (TTIs) allocated for downlink relay transmissions from the relay node to the UE, where a second set of TTIs is allocated for downlink transmissions from the base station to the UE, and where a third set of TTIs including a subset of the first set of TTIs is allocated for downlink transmissions from the base station to the UE, downlink relay transmissions from the relay node to the UE, or both. In some examples, the configuration message manager 2310 may transmit, to the UE, a second configuration message indicating a fourth set of TTIs allocated for transmitting uplink transmissions from the UE to the base station.

In some examples, the configuration message manager 2310 may receive, from the base station, a second configuration message indicating a fourth set of TTIs allocated for transmitting uplink relay transmissions from the relay node to the base station. In some cases, the configuration message includes an indication of a first set of random access resources associated with uplink synchronization and a second set of random access resources including the set of random access resources associated with the monitoring by the relay node. In some cases, the configuration message includes a control message indicating that the random access message is to be transmitted according to a timing advance value. In some cases, the control message includes a one-bit indicator included in downlink control information for triggering CFRA transmission.

The monitoring manager 2315 may monitor for an uplink relay request from a relay node. In some examples, the monitoring manager 2315 may monitor a set of one or more random access resources for a random access message from a UE.

The uplink relay request 2320 may receive, based on the monitoring, the uplink relay request includes an indication of a UE.

The relay communication manager 2325 may communicate with the UE via the relay node based on the uplink relay request.

In some examples, the relay communication manager 2325 may perform relay operations to facilitate communication between the UE and the base station based on receiving the random access message. In some examples, the relay communication manager 2325 may communicate, based on the downlink relay request, with the UE via the relay node. In some examples, the relay communication manager 2325 may monitor for downlink signaling from a base station initiating relay communications with the UE based on the relay reference signal. In some examples, the relay communication manager 2325 may perform relay operations to facilitate communication between the UE and the base station based on the downlink signaling.

In some examples, the relay communication manager 2325 may perform relay communications with a UE, via a relay node. In some examples, the relay communication manager 2325 may perform relay operations to facilitate communication between a UE and a base station. In some examples, the relay communication manager 2325 may determine, based on comparing, whether the UE can be relayed by the relay node. In some examples, the relay communication manager 2325 may send one or more downlink transmissions to the UE during the first set of TTIs, the third set of TTIs, or both.

In some examples, the relay communication manager 2325 may receive uplink transmissions from the UE during the fourth set of TTIs. In some examples, the relay communication manager 2325 may receive an uplink transmission from the UE during one or more TTIs of the fourth set of TTIs, where the uplink transmission is frequency division multiplexed with a relay uplink transmission from the relay node to the base station. In some examples, the relay communication manager 2325 may send one or more downlink relay transmissions to the UE during the first set of TTIs, the third set of TTIs, or both. In some examples, the relay communication manager 2325 may transmit uplink relay transmissions to the base station during the fourth set of TTIs. In some examples, the relay communication manager 2325 may transmit an uplink relay transmission from the relay node to the base station during one or more TTIs of the fourth set of TTIs, where the uplink relay transmission is frequency division multiplexed with an uplink transmission from the UE to the base station.

The random access message manager 2330 may receive, based on the monitoring, a random access message over the set of random access resources, where the random access message uses a timing advance associated with uplink data transmissions by the UE.

The downlink relay request manager 2340 may monitor for a downlink relay request from a UE.

In some examples, receiving, based on the monitoring, the downlink relay request includes an indication of a relay node.

The relay reference signal manager 2345 may transmit, to a UE a relay reference signal.

In some cases, the relay reference signal is a channel state information reference signal (CSI-RS).

The timing manager 2335 may measure a timing of the random access message. In some examples, the timing manager 2335 may compare the measured timing of the random access message to a timing threshold.

The channel state information manager 2350 may receive, from the UE, a channel state information report corresponding to the first set of TTIs, the third set of TTIs, or both. In some examples, the channel state information manager 2350 may receive, from the UE, a channel state information report corresponding to the first set of TTIs, the third set of TTIs, or both.

Figure 24:
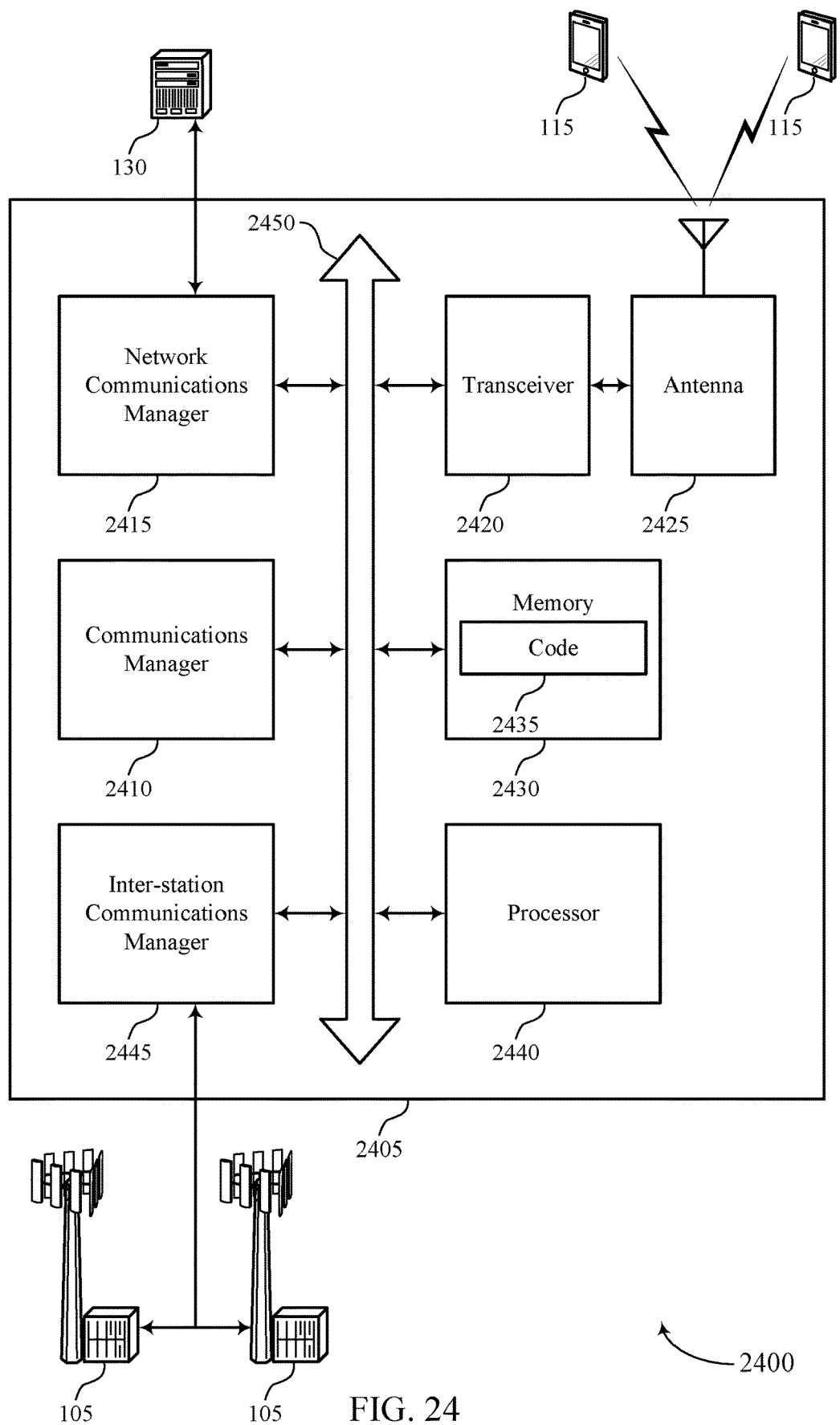
FIG. 24 shows a diagram of a system including a device that supports a non-transparent inband relay node in a single frequency network in accordance with aspects of the present disclosure.

FIG. 24 shows a diagram of a system 2400 including a device 2405 that supports a non-transparent inband relay node in a single frequency network in accordance with aspects of the present disclosure. The device 2405 may be an example of or include the components of device 2105, device 2205, or a base station 105 as described herein. The device 2405 may include components for bi-directional voice and data communications including components for transmitting and receiving communications, including a communications manager 2410, a network communications manager 2415, a transceiver 2420, an antenna 2425, memory 2430, a processor 2440, and an inter-station communications manager 2445. These components may be in electronic communication via one or more buses (e.g., bus 2450).

The communications manager 2410 may transmit, to a UE, a configuration message indicating a set of random access resources associated with monitoring by a relay node, monitor for an uplink relay request from a relay node, receive, based on the monitoring, the uplink relay request includes an indication of a UE, and communicate with the UE via the relay node based on the uplink relay request. The communications manager 2410 may also monitor a set of one or more random access resources for a random access message from a UE, receive, based on the monitoring, a random access message over the set of random access resources, where the random access message uses a timing advance associated with uplink data transmissions by the UE, and perform relay operations to facilitate communication between the UE and the base station based on receiving the random access message. The communications manager 2410 may also monitor for a downlink relay request from a UE, receive, based on the monitoring, the downlink relay request includes an indication of a relay node, communicate, based on the downlink relay request, with the UE via the relay node, transmit, to a UE a relay reference signal, monitor for downlink signaling from a base station initiating relay communications with the UE based on the relay reference signal, and perform relay operations to facilitate communication between the UE and the base station based on the downlink signaling. The communications manager 2410 may also perform relay communications with a UE, via a relay node and transmit, to the UE, a first configuration message indicating a first set of transmission time intervals (TTIs) allocated for downlink transmissions from the base station to the UE, where a second set of TTIs is allocated for downlink relay transmissions from the relay node to the UE, and where a third set of TTIs is allocated for downlink transmissions from the base station to the UE, from the relay node to the UE, or both. The communications manager 2410 may also perform relay operations to facilitate communication between a UE and a base station and transmit, to the UE, a first configuration message indicating a first set of transmission time intervals (TTIs) allocated for downlink relay transmissions from the relay node to the UE, where a second set of TTIs is allocated for downlink transmissions from the base station to the UE, and where a third set of TTIs including a subset of the first set of TTIs is allocated for downlink transmissions from the base station to the UE, downlink relay transmissions from the relay node to the UE, or both.

The network communications manager 2415 may manage communications with the core network (e.g., via one or more wired backhaul links). For example, the network communications manager 2415 may manage the transfer of data communications for client devices, such as one or more UEs 115.

The transceiver 2420 may communicate bi-directionally, via one or more antennas, wired, or wireless links as described above. For example, the transceiver 2420 may represent a wireless transceiver and may communicate bi-directionally with another wireless transceiver. The transceiver 2420 may also include a modem to modulate the packets and provide the modulated packets to the antennas for transmission, and to demodulate packets received from the antennas.

In some cases, the wireless device may include a single antenna 2425. However, in some cases the device may have more than one antenna 2425, which may be capable of concurrently transmitting or receiving multiple wireless transmissions.

The memory 2430 may include RAM, ROM, or a combination thereof. The memory 2430 may store computer-readable code 2435 including instructions that, when executed by a processor (e.g., the processor 2440) cause the device to perform various functions described herein. In some cases, the memory 2430 may contain, among other things, a BIOS which may control basic hardware or software operation such as the interaction with peripheral components or devices.

The processor 2440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 2440 may be configured to operate a memory array using a memory controller. In some cases, a memory controller may be integrated into processor 2440. The processor 2440 may be configured to execute computer-readable instructions stored in a memory (e.g., the memory 2430) to cause the device 2405 to perform various functions (e.g., functions or tasks supporting a non-transparent inband relay node in a single frequency network).

The inter-station communications manager 2445 may manage communications with other base station 105, and may include a controller or scheduler for controlling communications with UEs 115 in cooperation with other base stations 105. For example, the inter-station communications manager 2445 may coordinate scheduling for transmissions to UEs 115 for various interference mitigation techniques such as beamforming or joint transmission. In some examples, the inter-station communications manager 2445 may provide an X2 interface within an LTE/LTE-A wireless communication network technology to provide communication between base stations 105.

The code 2435 may include instructions to implement aspects of the present disclosure, including instructions to support wireless communications. The code 2435 may be stored in a non-transitory computer-readable medium such as system memory or other type of memory. In some cases, the code 2435 may not be directly executable by the processor 2440 but may cause a computer (e.g., when compiled and executed) to perform functions described herein.

Figure 25:
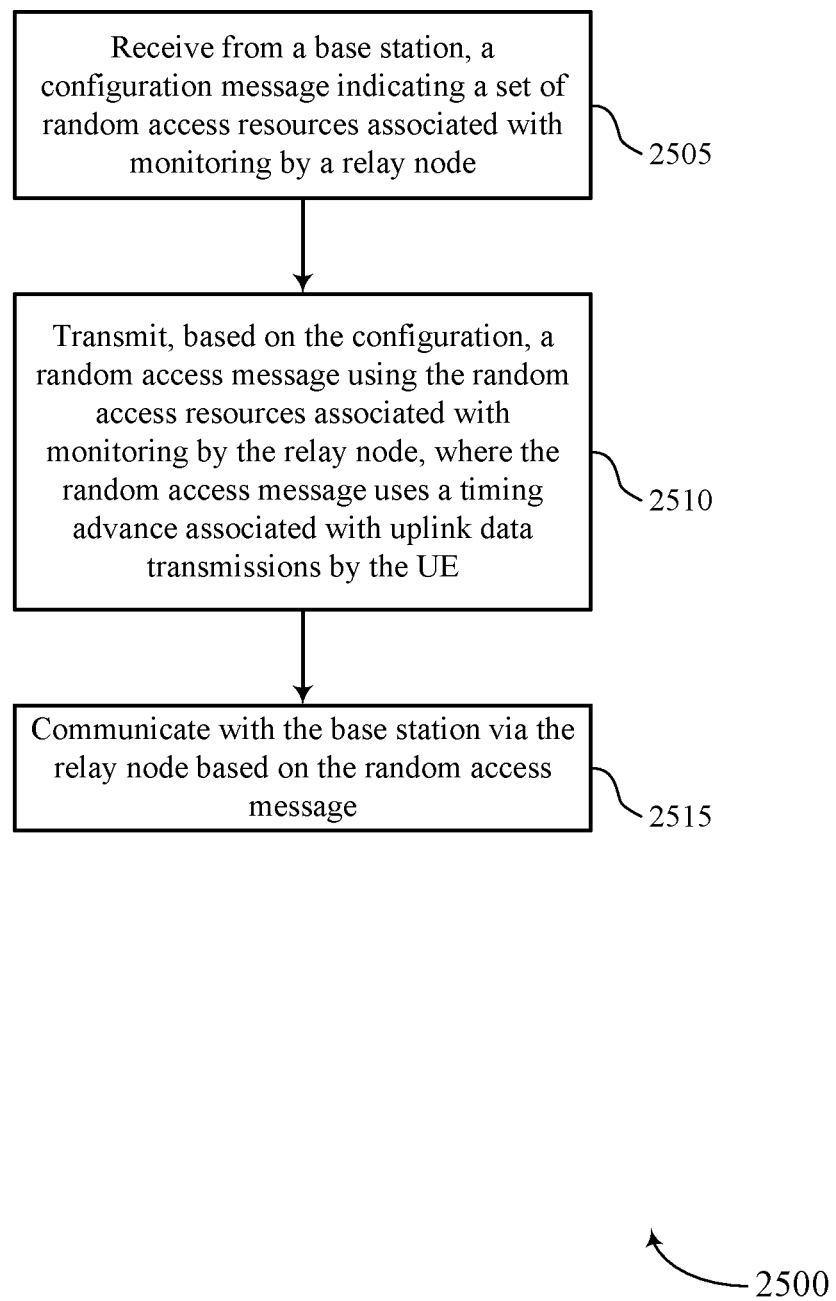
FIGS. 25 through 33 show flowcharts illustrating methods that support a non-transparent inband relay node in a single frequency network in accordance with aspects of the present disclosure.

FIG. 25 shows a flowchart illustrating a method 2500 that supports a non-transparent inband relay node in a single frequency network in accordance with aspects of the present disclosure. The operations of method 2500 may be implemented by a UE 115 or its components as described herein. For example, the operations of method 2500 may be performed by a communications manager as described with reference to FIGS. 17 through 20. In some examples, a UE may execute a set of instructions to control the functional elements of the UE to perform the functions described below. Additionally, or alternatively, a UE may perform aspects of the functions described below using special-purpose hardware.

At 2505, the UE may receive from a base station, a configuration message indicating a set of random access resources associated with monitoring by a relay node. The operations of 2505 may be performed according to the methods described herein. In some examples, aspects of the operations of 2505 may be performed by a configuration message manager as described with reference to FIGS. 17 through 20.

At 2510, the UE may transmit, based on the configuration, a random access message using the random access resources associated with monitoring by the relay node, where the random access message uses a timing advance associated with uplink data transmissions by the UE. The operations of 2510 may be performed according to the methods described herein. In some examples, aspects of the operations of 2510 may be performed by a random access message manager as described with reference to FIGS. 17 through 20.

At 2515, the UE may communicate with the base station via the relay node based on the random access message. The operations of 2515 may be performed according to the methods described herein. In some examples, aspects of the operations of 2515 may be performed by a relay communication manager as described with reference to FIGS. 17 through 20.

Figure 26:
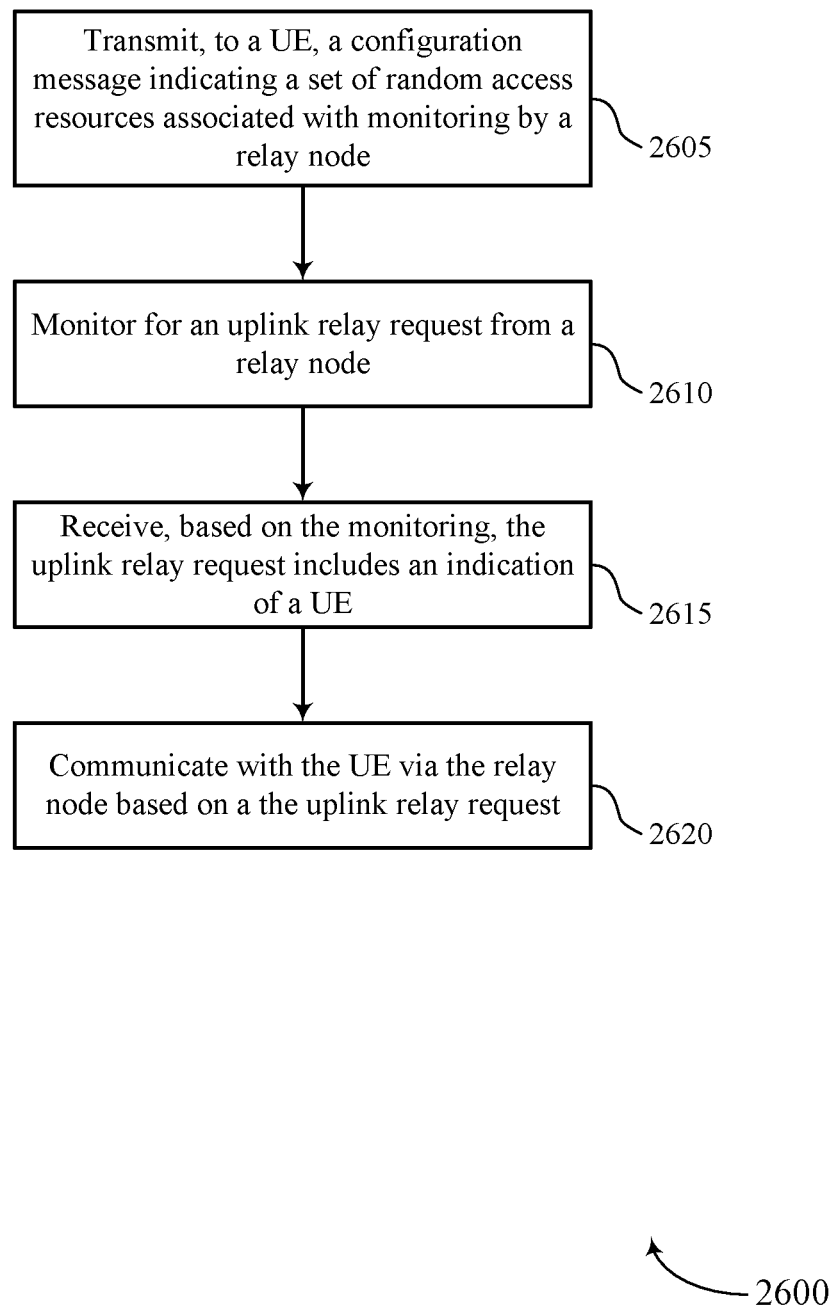

FIG. 26 shows a flowchart illustrating a method 2600 that supports a non-transparent inband relay node in a single frequency network in accordance with aspects of the present disclosure. The operations of method 2600 may be implemented by a base station 105 or its components as described herein. For example, the operations of method 2600 may be performed by a communications manager as described with reference to FIGS. 21 through 24. In some examples, a base station may execute a set of instructions to control the functional elements of the base station to perform the functions described below. Additionally, or alternatively, a base station may perform aspects of the functions described below using special-purpose hardware.

At 2605, the base station may transmit, to a UE, a configuration message indicating a set of random access resources associated with monitoring by a relay node. The operations of 2605 may be performed according to the methods described herein. In some examples, aspects of the operations of 2605 may be performed by a configuration message manager as described with reference to FIGS. 21 through 24.

At 2610, the base station may monitor for an uplink relay request from a relay node. The operations of 2610 may be performed according to the methods described herein. In some examples, aspects of the operations of 2610 may be performed by a monitoring manager as described with reference to FIGS. 21 through 24.

At 2615, the base station may receive, based on the monitoring, the uplink relay request includes an indication of a UE. The operations of 2615 may be performed according to the methods described herein. In some examples, aspects of the operations of 2615 may be performed by an uplink relay request as described with reference to FIGS. 21 through 24.

At 2620, the base station may communicate with the UE via the relay node based on the uplink relay request. The operations of 2620 may be performed according to the methods described herein. In some examples, aspects of the operations of 2620 may be performed by a relay communication manager as described with reference to FIGS. 21 through 24.

Figure 27:
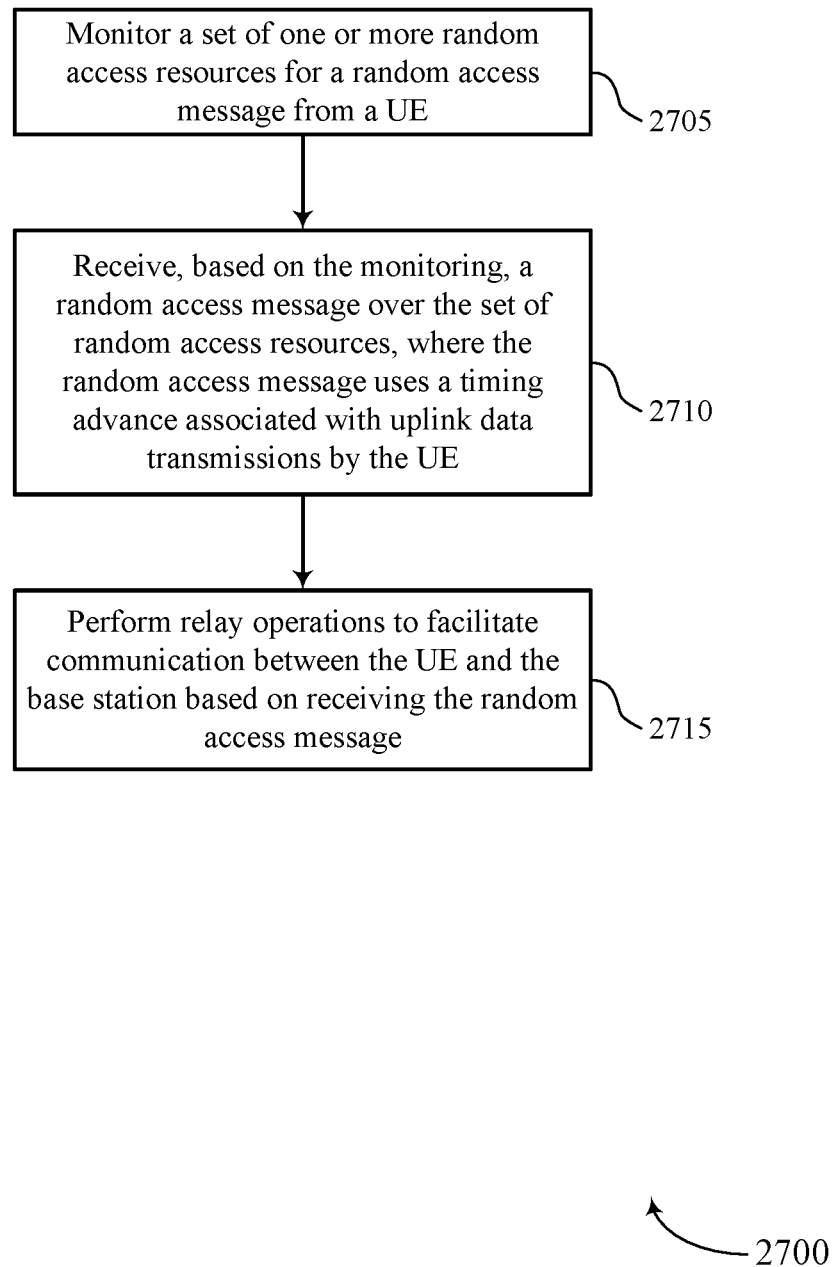

FIG. 27 shows a flowchart illustrating a method 2700 that supports a non-transparent inband relay node in a single frequency network in accordance with aspects of the present disclosure. The operations of method 2700 may be implemented by a base station 105 or its components as described herein. For example, the operations of method 2700 may be performed by a communications manager as described with reference to FIGS. 21 through 24. In some examples, a base station may execute a set of instructions to control the functional elements of the base station to perform the functions described below. Additionally, or alternatively, a base station may perform aspects of the functions described below using special-purpose hardware.

At 2705, the base station may monitor a set of one or more random access resources for a random access message from a UE. The operations of 2705 may be performed according to the methods described herein. In some examples, aspects of the operations of 2705 may be performed by a monitoring manager as described with reference to FIGS. 21 through 24.

At 2710, the base station may receive, based on the monitoring, a random access message over the set of random access resources, where the random access message uses a timing advance associated with uplink data transmissions by the UE. The operations of 2710 may be performed according to the methods described herein. In some examples, aspects of the operations of 2710 may be performed by a random access message manager as described with reference to FIGS. 21 through 24.

At 2715, the base station may perform relay operations to facilitate communication between the UE and the base station based on receiving the random access message. The operations of 2715 may be performed according to the methods described herein. In some examples, aspects of the operations of 2715 may be performed by a relay communication manager as described with reference to FIGS. 21 through 24.

Figure 28:
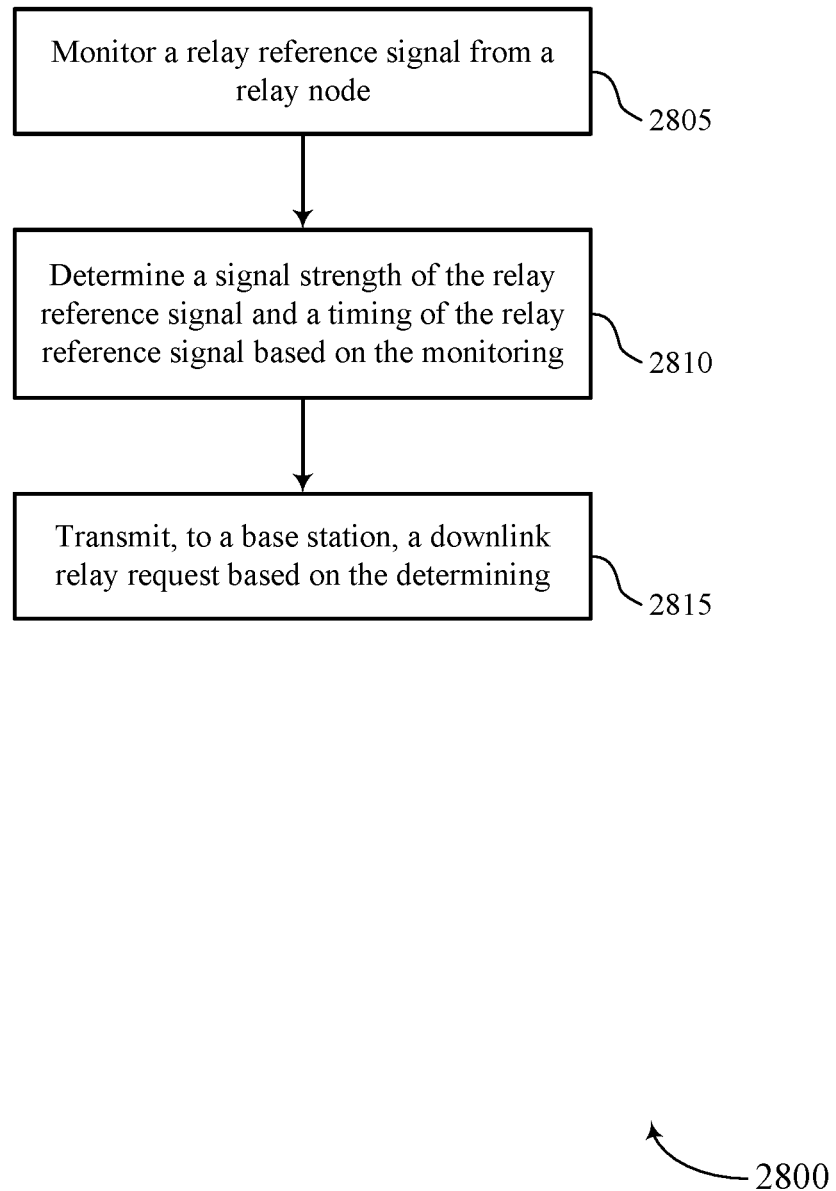

FIG. 28 shows a flowchart illustrating a method 2800 that supports a non-transparent inband relay node in a single frequency network in accordance with aspects of the present disclosure. The operations of method 2800 may be implemented by a UE 115 or its components as described herein. For example, the operations of method 2800 may be performed by a communications manager as described with reference to FIGS. 17 through 20. In some examples, a UE may execute a set of instructions to control the functional elements of the UE to perform the functions described below. Additionally, or alternatively, a UE may perform aspects of the functions described below using special-purpose hardware.

At 2805, the UE may monitor a relay reference signal from a relay node. The operations of 2805 may be performed according to the methods described herein. In some examples, aspects of the operations of 2805 may be performed by a monitoring manager as described with reference to FIGS. 17 through 20.

At 2810, the UE may determine a signal strength of the relay reference signal and a timing of the relay reference signal based on the monitoring. The operations of 2810 may be performed according to the methods described herein. In some examples, aspects of the operations of 2810 may be performed by a relay reference signal manager as described with reference to FIGS. 17 through 20.

At 2815, the UE may transmit, to a base station, a downlink relay request based on the determining. The operations of 2815 may be performed according to the methods described herein. In some examples, aspects of the operations of 2815 may be performed by a downlink relay request manager as described with reference to FIGS. 17 through 20.

Figure 29:
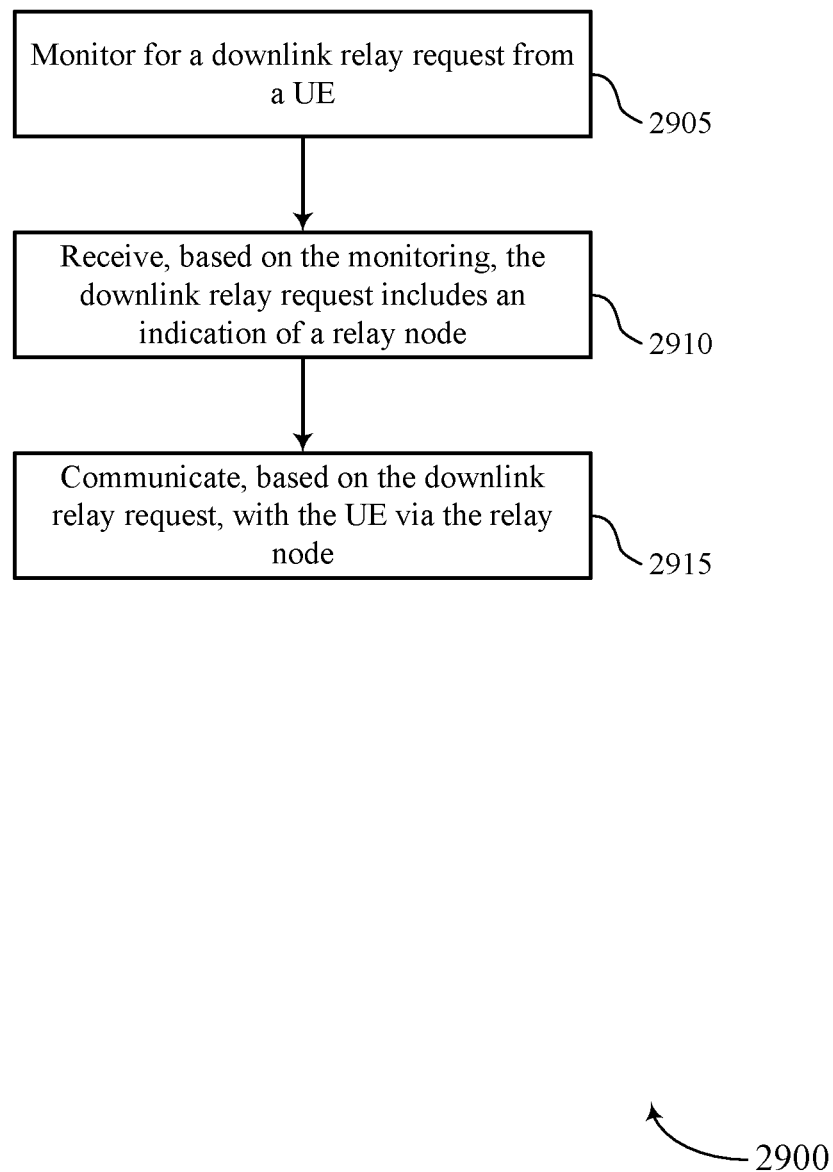

FIG. 29 shows a flowchart illustrating a method 2900 that supports a non-transparent inband relay node in a single frequency network in accordance with aspects of the present disclosure. The operations of method 2900 may be implemented by a base station 105 or its components as described herein. For example, the operations of method 2900 may be performed by a communications manager as described with reference to FIGS. 21 through 24. In some examples, a base station may execute a set of instructions to control the functional elements of the base station to perform the functions described below. Additionally, or alternatively, a base station may perform aspects of the functions described below using special-purpose hardware.

At 2905, the base station may monitor for a downlink relay request from a UE. The operations of 2905 may be performed according to the methods described herein. In some examples, aspects of the operations of 2905 may be performed by a downlink relay request manager as described with reference to FIGS. 21 through 24.

At 2910, the base station may receive, based on the monitoring, the downlink relay request includes an indication of a relay node. The operations of 2910 may be performed according to the methods described herein. In some examples, aspects of the operations of 2910 may be performed by a downlink relay request manager as described with reference to FIGS. 21 through 24.

At 2915, the base station may communicate, based on the downlink relay request, with the UE via the relay node. The operations of 2915 may be performed according to the methods described herein. In some examples, aspects of the operations of 2915 may be performed by a relay communication manager as described with reference to FIGS. 21 through 24.

Figure 30:
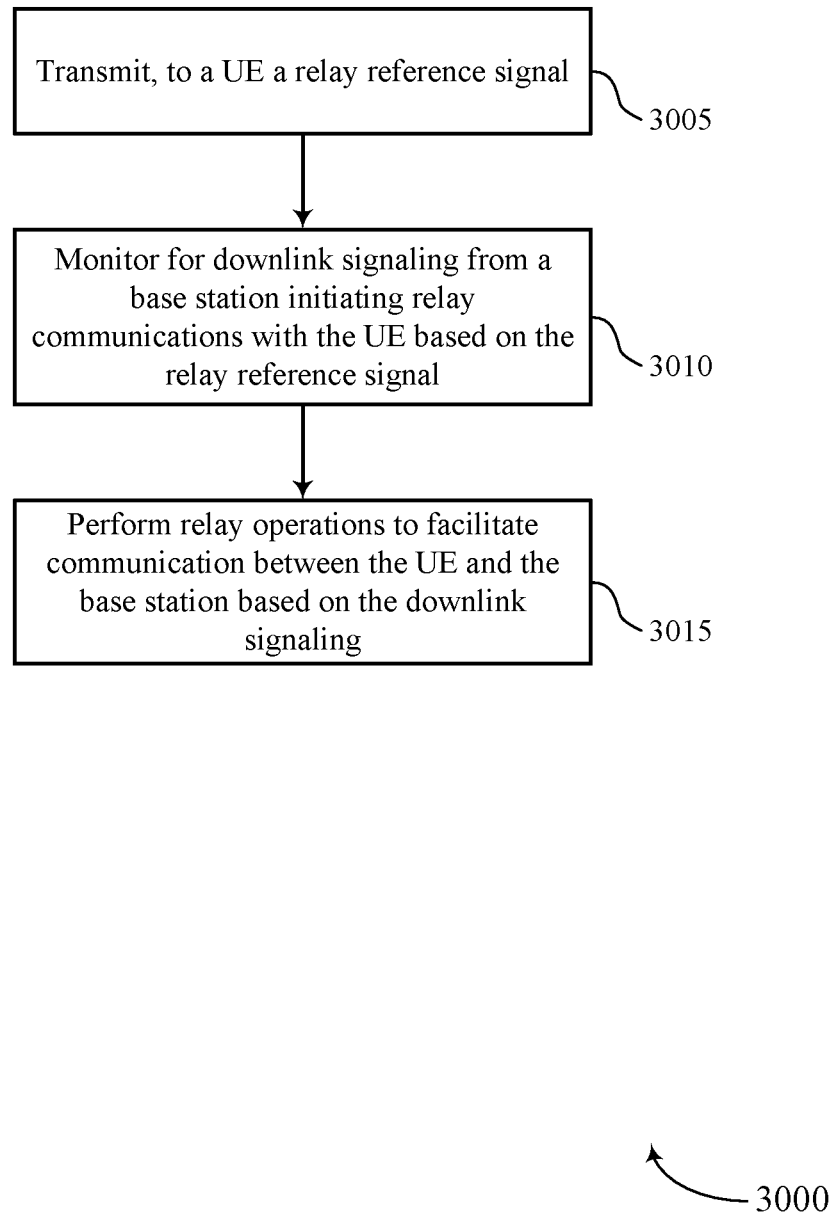

FIG. 30 shows a flowchart illustrating a method 3000 that supports a non-transparent inband relay node in a single frequency network in accordance with aspects of the present disclosure. The operations of method 3000 may be implemented by a base station 105 or its components as described herein. For example, the operations of method 3000 may be performed by a communications manager as described with reference to FIGS. 21 through 24. In some examples, a base station may execute a set of instructions to control the functional elements of the base station to perform the functions described below. Additionally, or alternatively, a base station may perform aspects of the functions described below using special-purpose hardware.

At 3005, the base station may transmit, to a UE a relay reference signal. The operations of 3005 may be performed according to the methods described herein. In some examples, aspects of the operations of 3005 may be performed by a relay reference signal manager as described with reference to FIGS. 21 through 24.

At 3010, the base station may monitor for downlink signaling from a base station initiating relay communications with the UE based on the relay reference signal. The operations of 3010 may be performed according to the methods described herein. In some examples, aspects of the operations of 3010 may be performed by a relay communication manager as described with reference to FIGS. 21 through 24.

At 3015, the base station may perform relay operations to facilitate communication between the UE and the base station based on the downlink signaling. The operations of 3015 may be performed according to the methods described herein. In some examples, aspects of the operations of 3015 may be performed by a relay communication manager as described with reference to FIGS. 21 through 24.

Figure 31:
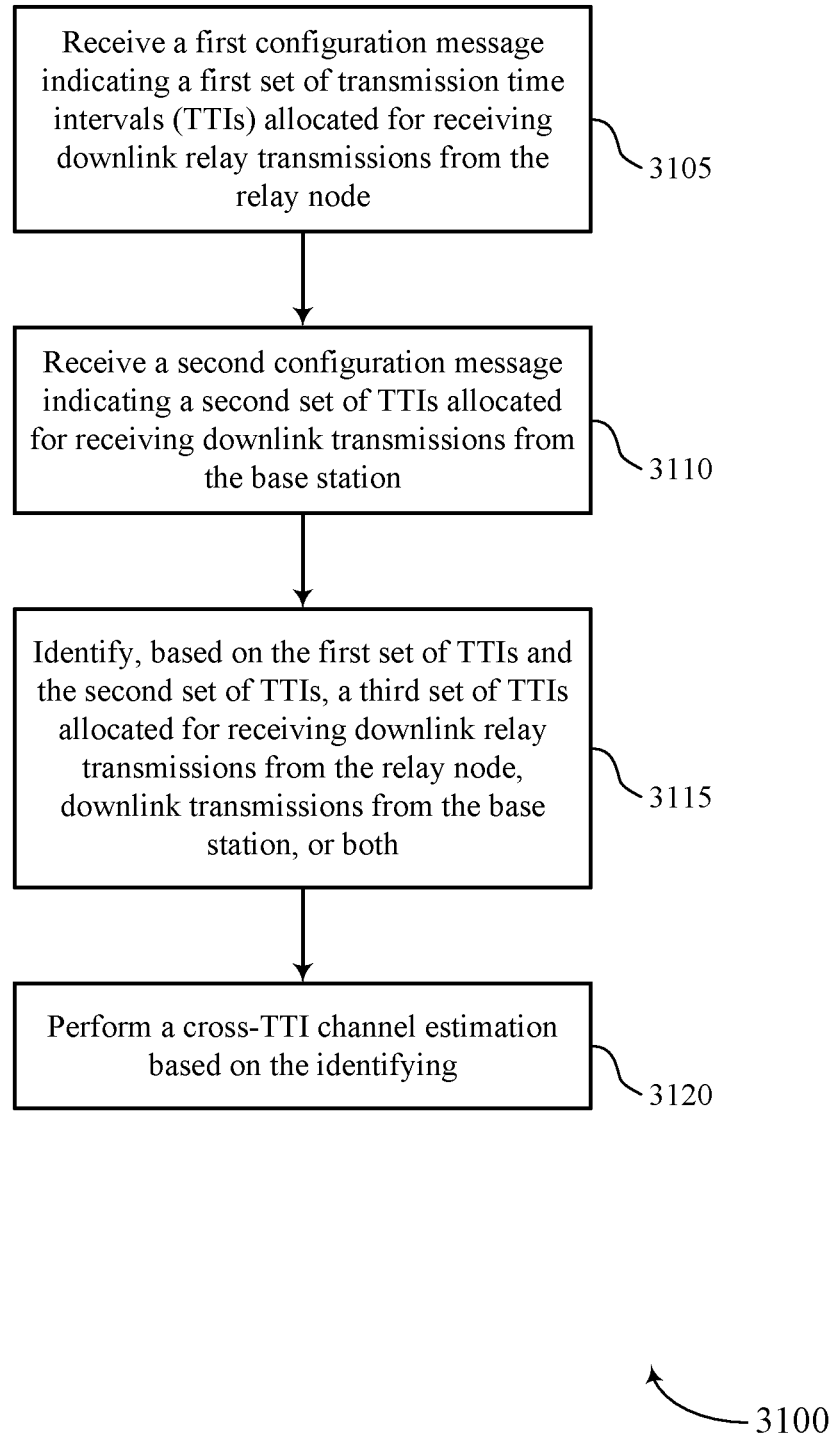

FIG. 31 shows a flowchart illustrating a method 3100 that supports a non-transparent inband relay node in a single frequency network in accordance with aspects of the present disclosure. The operations of method 3100 may be implemented by a UE 115 or its components as described herein. For example, the operations of method 3100 may be performed by a communications manager as described with reference to FIGS. 17 through 20. In some examples, a UE may execute a set of instructions to control the functional elements of the UE to perform the functions described below. Additionally, or alternatively, a UE may perform aspects of the functions described below using special-purpose hardware.

At 3105, the UE may receive a first configuration message indicating a first set of transmission time intervals (TTIs) allocated for receiving downlink relay transmissions from the relay node. The operations of 3105 may be performed according to the methods described herein. In some examples, aspects of the operations of 3105 may be performed by a configuration message manager as described with reference to FIGS. 17 through 20.

At 3110, the UE may receive a second configuration message indicating a second set of TTIs allocated for receiving downlink transmissions from the base station. The operations of 3110 may be performed according to the methods described herein. In some examples, aspects of the operations of 3110 may be performed by a configuration message manager as described with reference to FIGS. 17 through 20.

At 3115, the UE may identify, based on the first set of TTIs and the second set of TTIs, a third set of TTIs allocated for receiving downlink relay transmissions from the relay node, downlink transmissions from the base station, or both. The operations of 3115 may be performed according to the methods described herein. In some examples, aspects of the operations of 3115 may be performed by a relay communication manager as described with reference to FIGS. 17 through 20.

At 3120, the UE may perform a cross-TTI channel estimation based on the identifying. The operations of 3120 may be performed according to the methods described herein. In some examples, aspects of the operations of 3120 may be performed by a channel state information manager as described with reference to FIGS. 17 through 20.

Figure 32:
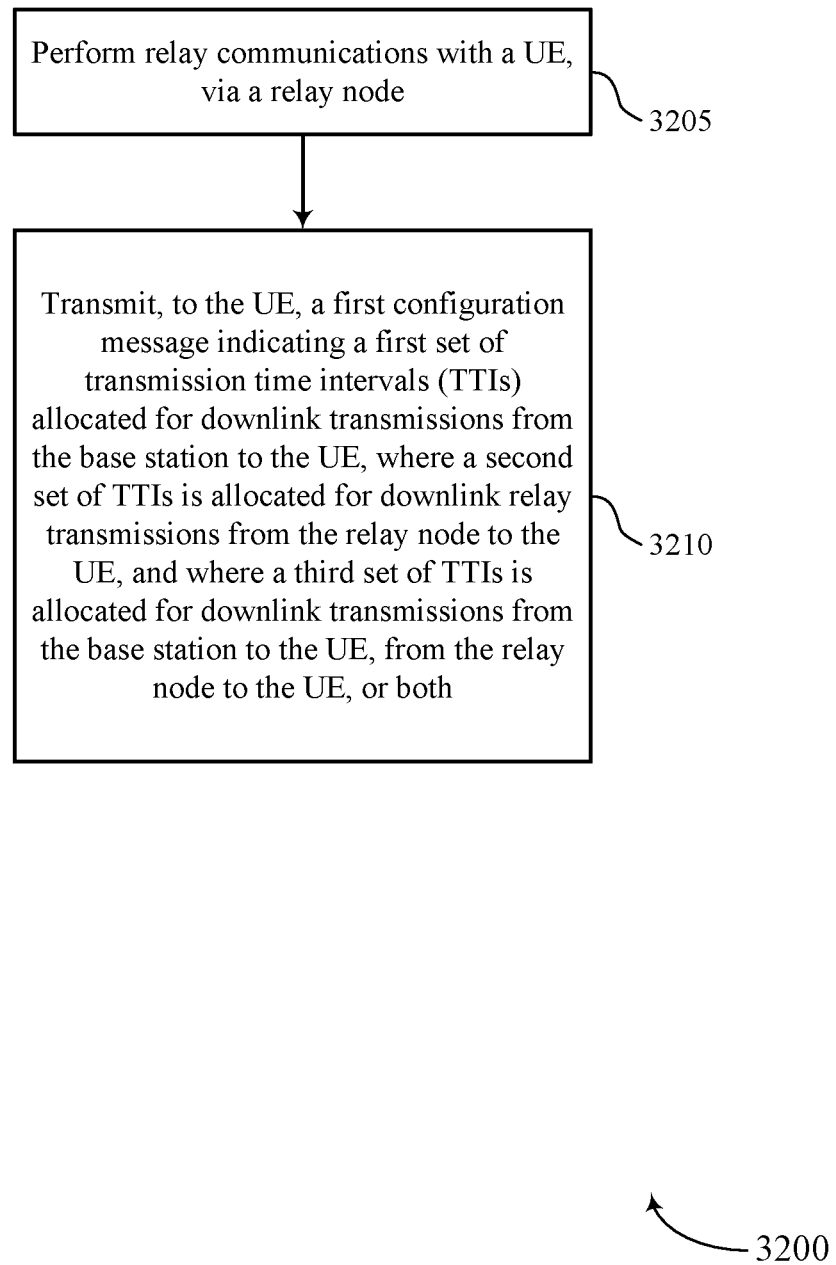

FIG. 32 shows a flowchart illustrating a method 3200 that supports a non-transparent inband relay node in a single frequency network in accordance with aspects of the present disclosure. The operations of method 3200 may be implemented by a base station 105 or its components as described herein. For example, the operations of method 3200 may be performed by a communications manager as described with reference to FIGS. 21 through 24. In some examples, a base station may execute a set of instructions to control the functional elements of the base station to perform the functions described below. Additionally, or alternatively, a base station may perform aspects of the functions described below using special-purpose hardware.

At 3205, the base station may perform relay communications with a UE, via a relay node. The operations of 3205 may be performed according to the methods described herein. In some examples, aspects of the operations of 3205 may be performed by a relay communication manager as described with reference to FIGS. 21 through 24.

At 3210, the base station may transmit, to the UE, a first configuration message indicating a first set of transmission time intervals (TTIs) allocated for downlink transmissions from the base station to the UE, where a second set of TTIs is allocated for downlink relay transmissions from the relay node to the UE, and where a third set of TTIs is allocated for downlink transmissions from the base station to the UE, from the relay node to the UE, or both. The operations of 3210 may be performed according to the methods described herein. In some examples, aspects of the operations of 3210 may be performed by a configuration message manager as described with reference to FIGS. 21 through 24.

Figure 33:
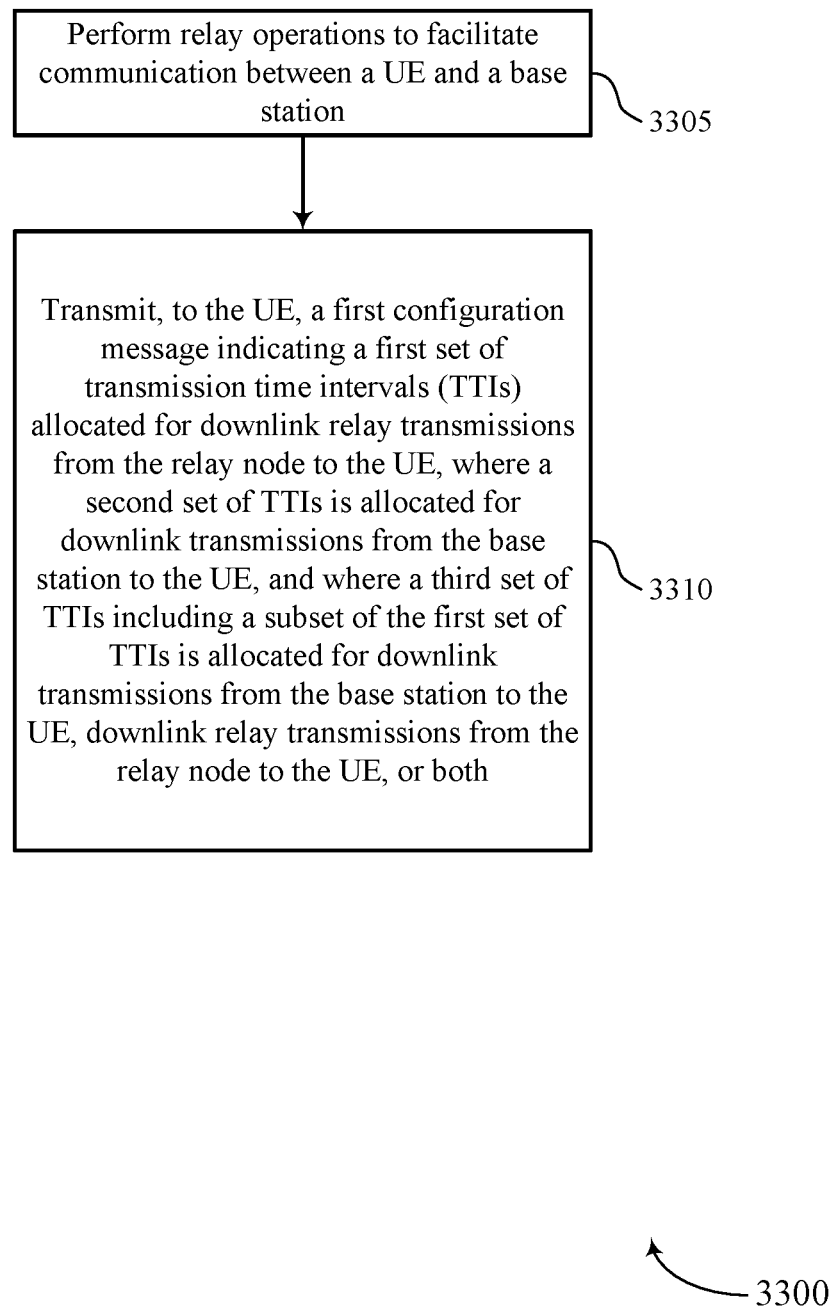

FIG. 33 shows a flowchart illustrating a method 3300 that supports a non-transparent inband relay node in a single frequency network in accordance with aspects of the present disclosure. The operations of method 3300 may be implemented by a base station 105 or its components as described herein. For example, the operations of method 3300 may be performed by a communications manager as described with reference to FIGS. 21 through 24. In some examples, a base station may execute a set of instructions to control the functional elements of the base station to perform the functions described below. Additionally, or alternatively, a base station may perform aspects of the functions described below using special-purpose hardware.

At 3305, the base station may perform relay operations to facilitate communication between a UE and a base station. The operations of 3305 may be performed according to the methods described herein. In some examples, aspects of the operations of 3305 may be performed by a relay communication manager as described with reference to FIGS. 21 through 24.

At 3310, the base station may transmit, to the UE, a first configuration message indicating a first set of transmission time intervals (TTIs) allocated for downlink relay transmissions from the relay node to the UE, where a second set of TTIs is allocated for downlink transmissions from the base station to the UE, and where a third set of TTIs including a subset of the first set of TTIs is allocated for downlink transmissions from the base station to the UE, downlink relay transmissions from the relay node to the UE, or both. The operations of 3310 may be performed according to the methods described herein. In some examples, aspects of the operations of 3310 may be performed by a configuration message manager as described with reference to FIGS. 21 through 24.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station, or a home base station. A base station may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   receiving, from a network entity, a configuration message indicating a set of random access resources associated with monitoring by a relay node;
   transmitting, based at least in part on the configuration message, a random access message using the set of random access resources associated with monitoring by the relay node, wherein the random access message uses a timing advance associated with uplink data transmissions by the UE, wherein a transmission timing between the UE and the relay node is based at least in part on the timing advance; and
   communicating with the network entity via the relay node based at least in part on the random access message and based at least in part on the transmission timing satisfying a threshold.

2. The method of claim 1, further comprising:
   determining an uplink timing advance value based at least in part on a second transmission timing of a physical uplink shared channel (PUSCH); and
   applying the uplink timing advance value to the random access message, wherein transmitting the random access message is according to the uplink timing advance value.

3. The method of claim 1, wherein the configuration message comprises a control message indicating that the random access message is to be transmitted according to a timing advance value.

4. The method of claim 3, wherein the control message comprises downlink control information for triggering contention free random access (CFRA) transmission, the downlink control information comprising a one-bit indicator.

5. A method for wireless communications at a user equipment (UE), comprising:
   monitoring a relay reference signal from a relay node;
   determining a signal strength of the relay reference signal and a timing of the relay reference signal based at least in part on the monitoring; and
   transmitting, to a network entity, a downlink relay request based at least in part on the timing of the relay reference signal satisfying a threshold timing value.

6. The method of claim 5, wherein determining a signal strength of the relay reference signal comprises:
   receiving, based at least in part on the monitoring, the relay reference signal from the relay node;
   performing one or more measurements on the relay reference signal; and determining, based at least in part on the one or more measurements, whether a reference signal receive power (RSRP) of the relay reference signal satisfies a power threshold, wherein transmitting the downlink relay request is based at least in part on determining that the RSRP of the relay reference signal satisfies the power threshold.

7. The method of claim 5, wherein determining the timing of the relay reference signal comprises:
receiving, based at least in part on the monitoring, the relay reference signal from the relay node;
comparing the timing of the relay reference signal to the threshold timing value; and
determining, based at least in part on the comparing, whether the timing of the relay reference signal satisfies the threshold timing value, wherein transmitting the downlink relay request is based at least in part on determining that the timing of the relay reference signal satisfies the threshold timing value.

8. The method of claim 5, wherein the downlink relay request includes an indication of the relay node.

9. The method of claim 5, wherein the relay reference signal is a channel state information reference signal (CSI-RS).

10. The method of claim 5, wherein the relay reference signal is a synchronization signal block (SSB) not on a sync raster.

11. The method of claim 5, further comprising:
receiving a first configuration message indicating a first set of transmission time intervals (TTIs) allocated for receiving downlink relay transmissions from the relay node;
receiving a second configuration message indicating a second set of TTIs allocated for receiving downlink transmissions from the network entity;
identifying, based at least in part on the first set of TTIs and the second set of TTIs, a third set of TTIs allocated for receiving downlink relay transmissions from the relay node, downlink transmissions from the network entity, or both; and
performing a cross-TTI channel estimation based at least in part on the identifying.

12. The method of claim 11, further comprising:
identifying a first receive beam, wherein receiving the first configuration message comprises receiving the first configuration message via the first receive beam; and
identifying a second receive beam, wherein receiving the second configuration message comprises receiving the second configuration message via the second receive beam.

13. The method of claim 11, further comprising:
monitoring one or more of the first set of TTIs, the second set of TTIs, and the third set of TTIs, based at least in part on the identifying; and
receiving, based at least in part on the monitoring, downlink relay transmissions from the relay node during the first set of TTIs, the third set of TTIs, or both, or downlink transmissions from the network entity during the second set of TTIs, the third set of TTIs, or both, or a combination thereof.

14. The method of claim 11, further comprising:
receiving, during the third set of TTIs, a downlink transmission from the network entity and a downlink relay transmission from the relay node, wherein the downlink transmission and the downlink relay transmission are frequency division multiplexed.

15. The method of claim 11, wherein performing the cross-TTI channel estimation comprises:
performing a first cross-TTI channel estimation for the first set of TTIs, a second cross-TTI channel estimation for the second set of TTIs, a third cross-TTI channel estimation for the third set of TTIs, or a combination thereof.

16. The method of claim 11, further comprising:
reporting, to the relay node, first channel state information corresponding to the first set of TTIs, the third set of TTIs, or both; and
reporting, to the network entity, second channel state information corresponding to the second set of TTIs, the third set of TTIs, or both.

17. The method of claim 16, further comprising:
generating a beam report for subsequent communications; and
incorporating the beam report in the first channel state information, the second channel state information, or both.

18. An apparatus for wireless communications at a user equipment (UE), comprising:
a processor,
memory coupled with the processor; and
instructions stored in the memory and executable by the processor to cause the apparatus to:
receive, from a network entity, a configuration message indicating a set of random access resources associated with monitoring by a relay node;
transmit, based at least in part on the configuration message, a random access message using the set of random access resources associated with monitoring by the relay node, wherein the random access message uses a timing advance associated with uplink data transmissions by the UE, wherein a transmission timing between the UE and the relay node is based at least in part on the timing advance; and
communicate with the network entity via the relay node based at least in part on the random access message and based at least in part on the transmission timing satisfying a threshold.

19. The apparatus of claim 18, wherein the instructions are further executable by the processor to cause the apparatus to:
determine an uplink timing advance value based at least in part on a second transmission timing of a physical uplink shared channel (PUSCH); and
apply the uplink timing advance value to the random access message, wherein transmitting the random access message is according to the uplink timing advance value.

20. The apparatus of claim 18, wherein the configuration message comprises a control message indicating that the random access message is to be transmitted according to a timing advance value.

21. The apparatus of claim 20, wherein the control message comprises downlink control information for triggering contention free random access (CFRA) transmission, the downlink control information comprising a one-bit indicator.

22. An apparatus for wireless communications at a user equipment (UE), comprising:
a processor,
memory coupled with the processor; and
instructions stored in the memory and executable by the processor to cause the apparatus to:
monitor a relay reference signal from a relay node;

determine a signal strength of the relay reference signal and a timing of the relay reference signal based at least in part on the monitoring; and transmit, to a network entity, a downlink relay request based at least in part on the timing of the relay reference signal satisfying a threshold timing value.

23. The apparatus of claim 22, wherein the instructions to determine the signal strength of the relay reference signal are executable by the processor to cause the apparatus to:

receive, based at least in part on the monitoring, the relay reference signal from the relay node;

perform one or more measurements on the relay reference signal; and determine, based at least in part on the one or more measurements, whether a reference signal receive power (RSRP) of the relay reference signal satisfies a power threshold, wherein transmitting the downlink relay request is based at least in part on determining that the RSRP of the relay reference signal satisfies the power threshold.

24. The apparatus of claim 22, wherein the instructions to determine the timing of the relay reference signal are executable by the processor to cause the apparatus to:

receive, based at least in part on the monitoring, the relay reference signal from the relay node;

compare the timing of the relay reference signal to the threshold timing value; and determine, based at least in part on the comparing, whether the timing of the relay reference signal satisfies the threshold timing value, wherein transmitting the downlink relay request is based at least in part on determining that the timing of the relay reference signal satisfies the threshold timing value.

25. The apparatus of claim 22, wherein the instructions are further executable by the processor to cause the apparatus to:

receive a first configuration message indicating a first set of transmission time intervals (TTIs) allocated for receiving downlink relay transmissions from the relay node;

receive a second configuration message indicating a second set of TTIs allocated for receiving downlink transmissions from the network entity;

identify, based at least in part on the first set of TTIs and the second set of TTIs, a third set of TTIs allocated for receiving downlink relay transmissions from the relay node, downlink transmissions from the network entity, or both; and perform a cross-TTI channel estimation based at least in part on the identifying.

26. The apparatus of claim 25, wherein the instructions are further executable by the processor to cause the apparatus to:

identify a first receive beam, wherein receiving the first configuration message are executable by the processor to cause the apparatus to receive the first configuration message via the first receive beam; and identify a second receive beam, wherein receiving the second configuration message are executable by the processor to cause the apparatus to receive the second configuration message via the second receive beam.

27. The apparatus of claim 25, wherein the instructions are further executable by the processor to cause the apparatus to:

monitor one or more of the first set of TTIs, the second set of TTIs, and the third set of TTIs, based at least in part on the identifying; and receive, based at least in part on the monitoring, downlink relay transmissions from the relay node during the first set of TTIs, the third set of TTIs, or both, or downlink transmissions from the network entity during the second set of TTIs, the third set of TTIs, or both, or a combination thereof.

28. The apparatus of claim 25, wherein the instructions are further executable by the processor to cause the apparatus to:

receive, during the third set of TTIs, a downlink transmission from the network entity and a downlink relay transmission from the relay node, wherein the downlink transmission and the downlink relay transmission are frequency division multiplexed.

29. The apparatus of claim 25, wherein the instructions to perform the cross-TTI channel estimation are executable by the processor to cause the apparatus to:

perform a first cross-TTI channel estimation for the first set of TTIs, a second cross-TTI channel estimation for the second set of TTIs, a third cross-TTI channel estimation for the third set of TTIs, or a combination thereof.

30. The apparatus of claim 25, wherein the instructions are further executable by the processor to cause the apparatus to:

report, to the relay node, first channel state information corresponding to the first set of TTIs, the third set of TTIs, or both; and report, to the network entity, second channel state information corresponding to the second set of TTIs, the third set of TTIs, or both.

* * * * *